US006532454B1

(12) United States Patent
Werbos

(10) Patent No.: US 6,532,454 B1
(45) Date of Patent: Mar. 11, 2003

(54) STABLE ADAPTIVE CONTROL USING CRITIC DESIGNS

(76) Inventor: Paul J. Werbos, 5304 N. First Pl., Arlington, VA (US) 22203

( * ) Notice: Subject to any disclaimer, the term of this patent is extended or adjusted under 35 U.S.C. 154(b) by 0 days.

(21) Appl. No.: 09/404,197

(22) Filed: Sep. 23, 1999

Related U.S. Application Data

(60) Provisional application No. 60/101,680, filed on Sep. 24, 1998.

(51) Int. Cl.[7] .............................................. G06F 15/18
(52) U.S. Cl. .............................. 706/14; 706/21; 706/23
(58) Field of Search .............................. 706/14, 21, 23, 706/19, 25

(56) References Cited

PUBLICATIONS

Danil V. Prokhorov et al; Adaptive Critic Designs; Sep. 1997; IEEE; S 1045–9227(97)05243–0; 997—1563.*
Bernard Widrow et al; 30 Years of Adaptive Neural Networks: Perceptron, Madaline, and Backpropagation; Sep. 1990; IEEE; Proceedings of the IEEE, vol. 78, No. 9; 1415–1442.*
Danil V. Prokhorov et al; Primative Adaptive Critics; 1997; IEEE; 0–7803–4122–8/97; 2263–2267.*
Danil Prokhorov et al; Adaptive Critic Design in Learning to Play Game of Go; 1997; IEEE; 0–78903–4122–8/97; 1–4.*

\* cited by examiner

Primary Examiner—John A. Follansbee
Assistant Examiner—Joseph P. Hirl
(74) Attorney, Agent, or Firm—Oblon, Spivak, McClelland, Maier & Neustadt, P.C.

(57) ABSTRACT

Classical adaptive control proves total-system stability for control of linear plants, but only for plants meeting very restrictive assumptions. Approximate Dynamic Programming (ADP) has the potential, in principle, to ensure stability without such tight restrictions. It also offers nonlinear and neural extensions for optimal control, with empirically supported links to what is seen in the brain. However, the relevant ADP methods in use today—TD, HDP, DHP, GDHP—and the Galerkin-based versions of these all have serious limitations when used here as parallel distributed real-time learning systems. Either they do not possess quadratic unconditional stability or they lead to incorrect results in the stochastic case. (ADAC or Q-learning designs do not help.) The present invention describes new ADP designs which overcome these limitations. It also addresses the Generalized Moving Target problem, a common family of static optimization problems, and describes a way to stabilize large-scale economic equilibrium models, such as the old long-term energy model of DOE.

5 Claims, 4 Drawing Sheets

STABLE ADAPTIVE CONTROL USING CRITIC DESIGNS

CROSS-REFERENCE TO CO-PENDING APPLICATIONS

The present application is related to and claims priority to U.S. provisional application serial No. 60/101,680, entitled "Stable Adaptive Control Using New Critic Designs," filed on Sept. 24, 1998, naming Paul J. Werbos as the sole inventor. (The contents of that application are incorporated herein by reference.) The present application is related to U.S. Pat. No. 6,424,056 and co-pending U.S. applications Ser. No. 09/147,338, filed May 10, 1999, and Ser. No. 60/127,952, filed Apr. 6, 1999, all naming Paul J. Werbos as sole inventor. The present application is related to a U.S. Provisional application serial No. 60/152,167 filed Sep. 4. 1999, entitled "NEURAL NETWORKS FOR INTELLIGENT CONTROL," also naming Paul J. Werbos as sole inventor. The contents of those co-pending applications are incorporated herein by reference.

BACKGROUND OF THE INVENTION

1. Field of the Invention

The present invention is directed to a method of providing stable control of a system (e.g., an electrical power grid, a factory, and a financial prediction system) using a neural network-based design, and more particularly, to a neural network-based control system and method using critics.

2. Discussion of the Background

The field of intelligent control is an expansive area that has attempted to solve many complex problems. Significant research has previously been performed in the areas of classical control theory [1–6] and biologically-inspired intelligent control [7–15]. As an outgrowth of that and other research, researchers have attempted to solve the Generalized Moving Target (GMT) problem [16,17], which is defined as follows: for a function $E(\underline{v}, \underline{w})$, find two vectors $\underline{v}$ and $\underline{w}$ such that the following two conditions are met: (1) E is minimized with respect to $\underline{v}$ for $\underline{w}$ fixed; (2) $\underline{w}=\underline{v}$.

Other research includes two additional classes of control design. The first class is "adaptive control," in the tradition of Narendra, which includes both linear (multiple-input multiple-output, MIMO) designs [1] and nonlinear or neural extensions [18,19]. The second class is learning-based Approximate Dynamic Programming (ADP) [7–15], which has sometimes been presented as a form of "reinforcement learning" [20–22], sometimes called "adaptive critics" [23] and sometimes called "neuro-dynamic programming" [24].

Previous forms of adaptive control discussed by Narendra, had difficulty in ensuring stability even in the linear-quadratic case. Those designs appear very similar to a particular ADP design, HDP+BAC[8,22,25], that was developed back in 1971, and reported in Werbos' Ph.D. proposal[26]. In fact, when HDP+BAC is applied to the linear-quadratic case, it reduces down to a standard indirect adaptive control (IAC) design, except that there is a provision for adapting one extra matrix which, in principle, should permit much stronger stability guarantees. Roughly speaking, ordinary LAC designs are based on the minimization of tracking error, which is sometimes just:

$$\sum_i \left(x_i^{(ref)}(t+1) - x_i(t+1)\right)^2 = \underline{e}(t+1)^T \underline{e}(t+1), \quad (1)$$

where the vector $\underline{x}^{(ref)}(t)$ represents the desired state of the plant or external environment at time t, where $\underline{x}(t)$ represents the actual state, and $\underline{e}(t)$ represents the gap or error between the two. In the same situation, HDP+BAC reduces to the same overall design, except that:

$$\hat{J}(t+1) = e(t+1)^T C e(t+1), \quad (2)$$

is minimized, where C is a matrix of "Critic weights" to be adapted by HDP. In the nonlinear case, equation (2) is replaced by an artificial neural network (ANN), in order to allow $\hat{J}$ to approximate any nonlinear function. (In HDP and GDHP, it is possible to supplement the training of the Action network, to include some stochastic search (particularly in the offline mode) to help keep the system out of local minima [46]. Barto, Thrun and others have discussed other approaches to adding noise to the Action network or controller [8,21].)

In theory, if the critic weights C or the Critic network converged to the right values (the values which satisfy the Hamilton-Jacobi-Bellman equation [4,5,24,28]), then the function $\hat{J}$ would serve as a Liapunov function guaranteed to stabilize the overall system, if the system is controllable. However, none of the established methods for adapting a Critic possess quadratic unconditional stability, even in the linear deterministic case. The variations of these methods based on the Galerkin approach to solving differential equations do possess unconditional stability in that case, but they converge to the wrong weights almost always in the linear stochastic case.

The notation herein generally tracks the sources upon which it draws. However two biased selections have been made herein. Herein, "C", "$\underline{b}$" and W are used for the estimated values of certain sets of parameters or weights, and "C*" or "$\underline{b}$*" are used for their true values. On the contrary, for the functions J and $\underline{\lambda}$, the usual three-fold convention of using the "J" and "$\underline{\lambda}$" for the true values, "J*" and "$\underline{\lambda}$*" for target values used in adaptation, and "$\hat{J}$" and "$\hat{\underline{e}}$" for the estimated values are used. The state vector is identified as "$\partial_t \underline{x}$" in linear adaptive control, rather than the usual x-dot. The notation "$\partial_t$" has long been part of the standard notation in physics.

In principle, the ideal feedback control system should try to optimize some mix of stability and performance, in the face of three general types of uncertainty:

(1) High-bandwidth random disturbances, which are usually represented as a stochastic process, based on random noise [4,5,26,29], but are sometimes represented as bounded disturbances of unknown structure [1];

(2) Drifting values (and occasional abrupt changes) in familiar process parameters such as friction, viscosity and mass, often due to the aging of a plant or the changes in general environmental conditions:

(3) Uncertainty about the fundamental structure of the plant or environment (sometimes due to catastrophic events, like a wing being shot off of an airplane), and shifts of parameters in ways that could not be anticipated or simulated even as possibilities at the time when the controller is developed.

This three-fold distinction is difficult to formalize, in mathematical terms, but it has great practical importance. Roughly speaking, the ability to respond to the first type of disturbance or uncertainty may be called "stochastic feedback control." The ability to respond to the second type may be called "adaptation," and the ability to respond to the third type is called "learning." The practical tradeoffs here are discussed at some length in the introductory review in [7], and in other papers cited in [7].

"Adaptive control" [1–3] has often been viewed as a tool for addressing the second type of uncertainty—uncertainty about drifting plant parameters. The most classical designs in adaptive control are intended to control plants $\underline{x}(t)$ governed by the equations:

$$\partial_t \underline{x} = A\underline{x} + B\underline{u},  \quad (3)$$

or:

$$\underline{x}(t+1) = A\underline{x}(t) + B\underline{u}(t), \quad (4)$$

where $\underline{u}$ is a vector of controls, where A and B are unknown matrices representing the parameters of the plant, and where $\partial_t$ represents differentiation with respect to time. In the simplest case, the state vector $\underline{x}$ is directly observable. The key idea is to develop control designs which estimate the matrices A and B, explicitly or implicitly, as the process unrolls in real time, and converge "on the fly" to a good control strategy:

$$\underline{u}(t) = K(t)\underline{x}(t), \quad (5)$$

despite the ignorance about A and B. In the general case, it is assumed that $\underline{x}(t)$ is not directly observable. Instead, a vector $\underline{v}$ governed by:

$$\underline{v}(t) = H\underline{x}(t) \quad (6)$$

is observed. Roughly speaking, this requires the use of a more complex control strategy like:

$$\underline{u}(t) = K_{1,1}\underline{v}(t-1) + K_{1,2}\underline{v}(t-2) + \ldots + K_{1,k}\underline{v}(t-k) + K_{2,1}\underline{u}(t-1) + \ldots + K_{2,k}\underline{u}(t-k), \quad (7)$$

for some integer k. (See [1, p.411].) There exists a huge body of stability theorems for adaptive control, both in the original linear versions [1–3] and in a variety of nonlinear and neural extensions (e.g., [18,19]).

In practice, however, all of these stability theorems require very strong assumptions about the plant or environment to be controlled. Ordinary adaptive control and neural adaptive control have often exhibited problems with stability and with slow response to transient disturbances, particularly in real-world plants containing delays and deadzones and reversal phenomena, etc.

Because of these problems, the most powerful approaches available today to cope with type-two uncertainty in real engineering applications are:

(1) Adaptive-predictive control [2], in the form which explicitly minimizes tracking error over multiple time periods ahead into the future. This involves a substantial increase in computational complexity, for computations that must be performed in real time.

(2) A two step design process, performed offline before the controller is actually used on the real commercial plant. In the first step, one designs a controller containing very strong feedback loops and/or observers, able to estimate (explicitly or implicitly) the specific plant parameters that are expected to drift. These loops take over the role which the estimates of "A" and "B" would play in an adaptive control approach. In the second step, one exploits prior knowledge about the specific plant, including knowledge about its uncertainties, in order to tune or train this controller. The controller is tuned or trained for optimal performance over multiple time periods, in some kind of offline training process.

Optimization may be done by using (1) an n-period lookahead method, analogous to model-predictive control [2.8], or (2) dynamic programming. The second approach often has very good response to transient disturbances, because of how it exploits prior knowledge about the plant. The first approach, however, appears to have had very limited success. Astrom's work in general [2] is well-respected for the many industrial applications it has led to.

Athans and Baras [6] have been very strong spokesmen for the second approach, within the nonlinear robust control community. Athans, in particular, has worked with many aerospace applications, where freezing the dynamics of a controller prior to actual flight can simplify the process of obtaining government approval. Robust control theorists have shown that type-one disturbances convert the problem of controller design into a problem of stochastic optimization. (This is true no matter how the disturbances are represented—either as stochastic noise or as "worst case noise" in the spirit of Tsypkin.) Nonlinear stochastic optimization problems require the use of dynamic programming, rather than a simple n-step lookahead. In order to find numerical solutions to such stochastic optimization problems, one can simply use learning-based ADP, applied in an offline learning mode.

In the neural network field, the second approach was first proposed in 1990 [30] and called "learning offline to be adaptive online." In one embodiment, a Time-Lagged Recurrent Network (TLRN) is used as a controller [8,ch10; 26.ch.8] with feedback loops in the control network. Additional inputs can be fed to the controller, by including the intermediate outputs of TLRNs trained to perform system identification of the plant. Such intermediate outputs serve as neural observers. Learning offline to be adaptive online is the foundation of Ford's "multistreaming approach" [7,31], which underlies the most successful and impressive success of neural networks to date in real-world control applications. Most of the Ford work has used n-step lookahead optimization, using backpropagation through time (BTT) to minimize the computational costs. With BTT and special chips, Fold expects to be able to extend this work to include adaptation on the fly, so as to upgrade the initial controller developed offline. BTT [26] can be used to reduce the cost of computing exact derivatives through any feedforward differentiable system, not just neural networks. (For systems which are not feedforward, see the review in [32]. See www.nd.com for some tools to implement BTT and various special cases of TLRN.)

Many researchers have been overwhelmed by the sheer complexity of biological brains. Particularly in the cerebral cortex of mammals, there is a bewildering array of cells that perform a wide variety of tasks: Many people have despaired of finding any universal principles of information processing at work there, which could be understood in mathematical terms. However, studies of mass action in the cerebral cortex have demonstrated that cells in one part of the cortex can learn to take over the functions of other cells, when there is a need to do so (and when the required data inputs are not cut off). (See the work of Lashley, Pribram and Freeman and [9–11,26].) However, the problem lies in developing the right kind of mathematics. Since the overall function of a biological brain is to compute actions or decisions, learning-based intelligent control may someday provide the required mathematics. (See [9–11] for more specific links between ADP designs and the brain.)

Nevertheless, the role of real-time learning should not be overstated, even in biology. Since the time of Freud at least, it has been well known that organisms remember past experiences, and adapt their general models or expectations about their environment based on some combination of present experience and memories. Back in 1977 [25], a simple learning scheme was proposed based on the more general idea of "syncretism," an interpretation of Freud's vision of the interplay between memory and generalization. Syncretism promises substantial practical benefits for neural network adaptation [34: 8,ch.3]. Early successes of "memory-based learning" [35]'support this general approach. More recently, McClelland and others have promulgated theories of the interplay between memory and generalization that also embody a form of this idea [36], although the inventor has previously predicted that this interplay mainly occurs within the cerebral cortex and the hippocampus, rather than between them, as suggested by McClelland. Recent arguments by Pribram,. Alkon and others tend to support the former view [36]. But in any case, the psychological evidence for the phenomenon as such appears very convincing. Within the world of artificial intelligence, researchers such as Rosalind Picard of MIT have developed learning methods that also embody this general approach.

In an ideal world, in the linear deterministic case, a universal adaptive controller would exist with the following properties. First, the design and the adaptation rule would produce the output the vector $\underline{u}(t)$ at each time t, based only on knowledge about $\underline{u}(\tau)$ and $\underline{v}(\tau)$ at previous times $\tau<t$. It would not require knowledge about A, B or H, except for the dimensionality of $\underline{u}$ and $\underline{v}$ (and perhaps $\underline{x}$). It should be guaranteed to send tracking error to zero, asymptotically, at an exponential rate, for all combinations of A, B and H and reference model for which this would be possible with a fixed controller, (The "reference model" is the process—generally considered linear here—which outputs the desired observed state $\underline{v}^*(t)$.) In other words, the ideal adaptive controller should possess the same kinds of strong stability guarantees that exist for more familiar kinds of control, such as fixed-stricture LQG optimal control [4,5].

Simplistic adaptive control designs available today fill far short of this ideal. (Certain hybrid designs of Astrom[2] are more complex and are discussed later.) The bulk of the existing theory for linear adaptive control focuses on the Single-Input Single-Output (SISO) special case—the case where y and u are scalars. Yet even in that case, stability is normally guaranteed only under three restrictions (in addition to restrictions on the reference model). Those restrictions are: (1) information must be available to choose the integer "k" in equation 7; (2) the plant must be "minimum phase"; and (3) the sign of the high-frequency gain must be known Narendra and Annaswamy go on to state [1,p.359]: " . . . it was realized that these assumptions were too restrictive, since in practice they are violated by most plants, even under fairly benign conditions."

The problem with the sign of the gain may be illustrated by a simplified, commonsense example. A fisherman has complete control over the big lake in which he fishes. The "reference model" is simply a certain quota (in weight) of fish that must be caught every year. One month the quota is not met The lake is usually capable of producing enough fish to meet the quota, in the long term, but an unknown disturbance has caused the fish population to go through a minor dieback. Following the usual policy of minimizing tracking error at time t+1, the fisherman increases his catch to arrive back at the quota. However, by fishing at a higher level. the fish population is reduced still further. This dips into the smaller fish that could have provided more growth in the future. Thus to meet the quota in the following month, even more fish are caught. In the end, the entire fish population dies off. That is, things go nonlinear, resulting in a catastrophic instability. This example leads to a host of further implications. But the key point is that policies that reduce tracking error (or maximize utility) in the short term may have undesirable or even catastrophic effects in the more distant future. Knowing the signs of the gains is crucial to avoiding those kinds of problems in adaptive control designs that do not look beyond time t+1. (The "minimum phase" assumption has similar, related pervasive implications, discussed at length by many researchers, including Widrow [37].)

Narendra and Annaswamy discuss methods that avoid the need to know the sign of the high-frequency gain, for the SISO case. However, those methods use a very special-purpose trick, the Nussbaum gain, which does not appear to carry over to the general, MIMO case in a serious way. The requirements for prior knowledge in the MIMO case [1, ch. 10] are far more complex and demanding than in the SISO case. After all, in the SISO case, there are only two possibilities for the sign of the high-frequency gain, which is a scalar—plus or minus. In the MIMO case, there are an infinite number of possible directions or modes of instability, and the requirements are very complex. Narendra has recently found another way to avoid having to know the sign of the gain, by using multiple models [38,39] in the SISO case. However, the minimum phase assumption is still required, and a universal MIMO controller developed in this way would be extremely complicated, if possible.

Difficulties with these restrictions probably explain why Lyle Ungar, of the University of Pennsylvania, found unstable results when he tested the most advanced direct, indirect and hybrid direct-indirect adaptive control designs on the bioreactor benchmark test problem given in [22]. There may even be an analogy between the harvesting of cells from a bioreactor and the harvesting of fish from a lake. This same problem was later solved directly and efficiently, both by neural model-predictive-control (based on BTT) and by ADP methods, in papers from Texas Tech [14] and from Ford Motor Company [34].

Narendra and Annaswamy [1] discuss both direct and indirect adaptive control designs for the linear case. However, in, 1990, Narendra [22,p. 135] stated that until "direct control methods are developed, adaptive control of nonlinear dynamical systems has to be carried out using indirect control methods." In 1992, he stated [8,p.168] that "unless further assumptions concerning the input-output characteristics of the plant are made, direct adaptive control is not possible."

FIG. 1 is essentially identical to the nonlinear adaptive control design discussed by Narendra in [22,p. 135], [8,p.168], [41,p. 166] and elsewhere. (In the neural network context, this application uses the capital letter, $\underline{X}$, rather than $\underline{v}$, to indicate the vector of observables. $\underline{R}$ is used to indicate the estimated state vector (or "representation of reality," usually based on recurrent neurons). Moreover, the phrase "Model network" is used to describe what Narendra calls the identification network, $N^i$. The phrase term "Action network" is used to describe what he calls the controller network, $N^c$. Both Narendra and this application assume that the Model network may be adapted in real time, by an adaptation rule independent from what is used to adapt the Action network. However, in his flowcharts, Narendra adds a few arrows (labeled "$e_i$") to give a hint of how the Model network might be adapted.

Numerous implementations of the design in FIG. 1 have been reported in journal articles all over the world. Two points must, however, be known:

(1) How to adapt the Model network. Numerous ways [8,32] of doing this have been suggested with varying degrees of robustness. For linear adaptive control, simple least mean squares (LMS) learning may be adequate. (For example, see [1,p.402], [42].)

(2) How to adapt the Action network. Narendra proposes the weights $W_{ij}$ in the Action network be adapted in proportion to the derivatives of tracking error with respect to the weights. This may be written:

$$W_{ij}(t+1) = W_{ij}(t) - \alpha \frac{\partial}{\partial W_{ij}}(E(t+1)), \tag{8}$$

where:

$$E(t+1) = (\underline{e}(t+1))^2 = (\underline{X}^*(t+1) - \underline{X}(t+1))^2 \tag{9}$$

is the tracking error at time t+1 and α is some arbitrary (small, positive) learning rate. Narendra describes calculating the derivatives in equation 8 by "backpropagating through the Model network." How to do this is described at length both in Narendra's work and—for a broader class of possible network structures (neural or nonneural)—in other references. [8.26]. The broken arrows in FIGS. 1 and 2 represent the backwards calculations used to obtain the required derivatives at minimum computational cost. Additional literature discusses (1) alternative ways to choose the learning rate and (2) alternative gradient-based learning rules.

FIG. 1 has many limitations, as discussed herein and in other references [41]. Applied to the case of a fully observable linear plant, equation 8 reduces to:

$$K(t+1) = K(t) - \alpha B^T \underline{e}(t+1)\underline{x}^T(t), \tag{10}$$

where the weights in the Action network are now just the matrix K of equation 5. "Backpropagating through a network" (like the Model network, which reduces to equation 4 in the linear deterministic case) is simply a low-cost way to multiply a vector by the transpose of the Jacobian of that network; it reduces costs by exploiting the internal structure of the network, and working backwards.

FIG. 2 is very similar to FIG. 1, in a mechanical sense, but it has vastly different properties. In FIG. 2, the terms "HDP+BAC" refer to Heuristic Dynamic Programming (HDP) and the Backpropagated Adaptive Critic (BAC). HDP is a technique for adapting the Critic network, developed in 1968–1972. BAC is the method used to adapt the Action network. HDP+BAC is an architecture for optimal control, which is structurally almost identical to IAC. HDP+BAC can be used in a variety of configurations, involving a combination of real-time learning, offline learning, prior information, etc. In order to implement a full, real-time learning version of HDP+BAC, three networks must be adapted (i.e., the Critic, Model and Action networks must be adapted).

Note that the design here is identical to the IAC design in FIG. 1, except that tracking the error (E) has been replaced by the Critic network. The Model network can be adapted by using any of the various methods previously proposed and used for that task. The Action network can be adapted by replacing equation 8 by:

$$W_{ij}(t+1) = W_{ij}(t) - \alpha \frac{\partial}{\partial W_{ij}}(\hat{J}(t+1)), \tag{11}$$

where the derivatives are again calculated by backpropagation, in exactly the same way. (To initialize the backpropagation, however, the derivatives of $\hat{J}$ are first calculated with respect to its inputs, $\underline{R}(t+1,)$. Those derivatives can be calculated quite easily by backpropagating through the Critic network. In the deterministic case, the distinction between $\underline{R}$ and $\hat{\underline{R}}$ is not so important as it is in the stochastic case [8].) Strictly speaking, FIG. 2 represents a special case of HDP+BAC applicable to the tracking problem. In other words, to implement FIG. 2, the same computer code can be used to implement FIG. 1, except that "E" is replaced by "$\hat{J}$."

HDP attempts to adapt the Critic network in such a way that its output, $\hat{J}$, converges to a good approximate solution to the Bellman equation of dynamic programming. This equation may be written fairly generally [8] as:

$$J(\underline{R}(t)) = \underset{\underline{u}(t)}{\text{Max}}\{U(\underline{R}(t), \underline{u}(t)) + (1/(1+r))\langle J(\underline{R}(t+1))\rangle\} - U_0, \tag{12}$$

where U is the utility or cost function to be maximized or minimized in the long term, where r is an interest rate parameter used to discount the value of fixture utility, where the angle brackets < > indicate expectation value, and where $U_0$ is a parameter introduced by Howard [28] to extend dynamic programming to the case of an infinite time horizon with r=0. (Of course, for a minimization task, "Max" is replaced by "Min" in equation 12.) When this method is applied to pure tracking problems, as in classical adaptive control, U is chosen to be the tracking error E, and the reference model is treated as a fixed augmentation of the Model network.

Karl Astrom has perhaps been the world's number one leader in stimulating real-world applications of adaptive control. He has done this in part by developing sophisticated hybrid designs, in order to meet the demanding requirements of these applications. For example, he played a pioneering role in building a link between linear/quadratic optimization and adaptive control. In [8,ch.2], he and McAvoy give a broad overview of efforts by themselves and others to address the general subject of intelligent control. The latest edition of his classic text on adaptive control [45] contains many references to new work in these directions.

The original, classic text by Astrom and Wittenmark [2] discusses three types of adaptive control which overcome many of the restrictive assumptions discussed by Narendra: (1) multiperiod adaptive-predictive control; (2) adaptive pole placement; and (3) linear-quadratic Self-Tuning Regulators (STRs). (Astrom also has previously provided insight to the minimum phase problem. He pointed towards the adaptive pole placement and LQG/STR approach as the most important ways to overcome this problem.)

The future plans by Ford Motor Company to consider using multiperiod optimization in real time, along with real-time system identification, could be viewed as a possible future application of multi-period adaptive-predictive control. There are many other links, to the most successful applications of artificial neural networks [7]. Methods of this family are of great practical utility, but they (and adaptive pole placement methods) are not "true" adaptive control designs as discussed herein. They are also not plausible as a theory of how the brain actually implements intelligent control. Also, it is hard to imagine a nonlinear stochastic generalization of that design. The discussion in [2] describes the method as an SISO method.

On the other hand, the discussion of linear-quadratic STRs [2] has many close links to the present invention. One version, based on spectral factorization, does not appear relevant to the goals described herein. But the other version—Indirect STR based on Riccati equation—is extremely close. This version is called Algorithm 5.7 in [2], and Algorithm 4.4 in [45]. The new edition of the text is almost identical to the old version in this section. The matrix S(t) in Astrom's equation 5.47 resemble the matrix of Critic weights C discussed herein. The methods used by Astrom and others to update the estimate of S(t) could be viewed as specialized Critic adaptation methods, for use in the linear/quadratic case. Unfortunately, the most reliable update methods—based on solving a Riccati equation or performing a spectral factorization—are not true adaptive control methods as defined above. Astrom hints that there have been serious stability problems when other update methods have been attempted. However, he also hints that D. W. Clarke of Oxford and M. Karny of Prague have been more central to this work in recent years. Karny has certainly made significant contributions to the larger area of intelligent systems [46].

Landelius' method of implementing HDP was motivated in part by the most recent work in this literature [47], which he also cites and discusses.

As an another approach, Liapunov stability theory in general has influenced huge sections of control theory, physics, and many other disciplines. More narrowly, within the disciplines of control theory and robotics, many researchers have tried to stabilize complex systems by first deriving Liapunov functions for those systems. In some cases, the Liapunov functions have been derived analytically by solving the multi-period optimization problem in an analytic fashion.

Having derived an application-specific Liapunov function, one can then use the design of FIGS. 1 and 2, in which the Liapunov function replaces the square tracking error or J. Theoretically, by replacing the square tracking error with some other pre-specified error measure, new stability properties and new restrictions on the plant are created.

The Liapunov function approach has been particularly useful in the field of robotics [48], where many robot arms obey nonlinear but rigid dynamics. Robert Sanner of the University of Maryland and John Doyle of CalTech are often mentioned in discussions about the successes of this approach. Nevertheless, none of these analytically derived fixed Liapunov functions can be regarded as a universal adaptive controller, as discussed above, any more than IAC itself can.

From a practical point of view, it becomes increasingly difficult to derive such Liapunov functions analytically, as the complexity of the nonlinear systems (e.g., elastic, lightweight and flexible robot arms) increases. (See [7] for an explanation of some of Hirzinger's success in working with such robots. Some of the unpublished work of Fukuda has been even more useful.) The difficulties here are analogous to the difficulty of trying to solve simple algebraic equations analytically. As the order of equations increases, eventually a point is reached where closed-form analytic methods simply cannot provide the solution.

Hundreds of papers have been published by now on various forms of approximate dynamic programming (ADP), adaptive critics and/or reinforcement learning. However, only three of the established, standard methods for adapting Critic networks are directly relevant to the goals herein: (1) Heuristic Dynamic Programming (HDP); (2) Dual Heuristic Programming (DHP); and (3) Globalized DHP (GDHP). The classic "Temporal Difference" (TD) method is essentially a special case of HDP. The recent "two-sample" method [24,50,51] is also relevant, but is discussed later.

As discussed above, the present invention focuses on achieving stability for methods of adapting Critic networks, not for entire adaptive critic control systems. Accordingly, a complete review of the larger question of how to adapt a complete ADP control system is not provided herein. For the concurrent adaptation of Model networks, Action networks and Critic networks, and for practical experience, see [8,14, 15,33,52–56].

The only existing, working control designs which meet criteria/definition for "Model-Based Adaptive Critics" (MBAC) or "brain-like intelligent control" [33] described herein are those based on FIG. 2, or the equivalent of FIG. 2 for DHP, GDHP and their variations. MBAC has been successfully implemented by at least three companies (Ford Motor Co., Accurate Automation Corp., Scientific Cybernetics Inc.), four professors working with graduate students (Wunsch, S. Balakrishnan, Lendaris, W.Tang), and three other individuals (Jameson, Landelius and Otwell). Since the first early implementations in 1993, MBAC has outperformed other modern control and neurocontrol methods in a variety of difficult simulated problems, ranging from missile interception (Balakrishnan) to preventing cars from skidding when driving over unexpected patches of ice (Lendaris). The one physical implementation published to date was also highly successful (Wunsch's solution of Zadeh's "fuzzy ball and beam" challenge). Balakrishnan has performed work on a larger physical implementation (a cantilever plate). The one alternative method which still seems competitive with MBAC, in terms of performance, in these tests, is neural model-predictive control based on BTT.

Roughly speaking, the adaptive critic field of research is a single new research field (albeit still divided into factions) which emerged around 1988–1990 through the unification of several previously separate strands of research. The origins of the field up to that time are summarized in FIG. 3. Within the field itself, the terns "reinforcement learning," "adaptive critics." "approximate dynamic programming" and "neurodynamic programming" are normally viewed as approximate synonyms. Nevertheless, the choice of terms also reflects different goals for research within the field and different patterns of interest in related research outside of the field. FIG. 3 only represents the flow of key ideas in this topic prior to 1988–1990: it does not represent patterns of personal association, ideas in other areas, or important recent ideas that will be mentioned later.

The psychologist B. F. Skinner is well-known for the idea that rewards and punishments ("primary reinforcement signals") determine the behavior of animals including humans. Many of the ADP designs used today in engineering or computer science are also being used as empirical models of animal behavior. Harry Klopf was a major pioneer of that tradition. Klopf; in turn, was responsible for recruiting and funding Barto to explore this strand of research. Barto has continued this tradition through ongoing collaborations with psychologists and neuroscientists.

Widrow never pursued these kinds of connections, but his seminal 1973 paper on adaptive critics [23] was clearly influenced by Skinner's notion of reward and punishment.

Skinner's notion of a "secondary reinforcement system" can be viewed as one way of talking about a Critic network.

Von Neumann and Morgenstern [57] invented the concept of cardinal utility function, which underlies the ADP approach. This work also made possible many new directions in economic theory, ranging from game theory to decision analysis and Bayesian utilitarianism. Working with Richard Bellman, Von Neumann also helped to inspire the development of dynamic programming. In criticizing the neuron models of McCulloch and Pitts, Von Neumann [58,p.451] made two major points: (1) that neuronal signals may be more accurately modeled as continuous variables rather than binary signals in many cases; (2) that study of mechanisms like learning and memory are more important than efforts to understand how particular static, learned functions can be represented in fixed neural networks. The successful revival of the neural network field in the past decade was based, in large part, on researchers finally embracing these two crucial insights.

On a philosophical level, Skinner and Von Neumann were extremely far apart. Skinner's words about molding and controlling human beings certainly gave encouragement (even if unintentionally) to a variety of ideologies in the spirit of fascism and Communism. The revival of the neural network field in the 1980's was motivated in part by a rejection of Skinner's approach and the resulting search for new paradigms in psychology [59]. Von Neumann, on the other hand, encouraged a higher level of respect for human intelligence, autonomous human decision-making and human potential, from the very beginning. Despite these differences, tie most basic views and insights of both men have been fully incorporated into the ongoing research in this field. Different researchers have different attitudes about the deeper philosophical implications [12], even as they use the same mathematics.

The concept of reinforcement learning as a pathway to the construction of intelligent systems has often been credited to the great pioneers of artificial intelligence (AI)—Newell, Shaw and Simon—and to Marvin Minsky [60]. They proposed the development of machines that learn over time to maximize some measure of reward or reinforcement. They proposed that such a machine, simply by learning through experience, could gradually develop higher-order intelligence as a kind of emergent phenomenon. The earliest attempts to implement this idea were based more on brute-force stochastic search rather than optimization theory, and the results were somewhat disappointing. Samuels' classic checkers-playing program [60] has been interpreted, in retrospect, as a kind of adaptive critic system. His adaptive "static position evaluator" served as a kind of Critic. More recently, Tesauro's master-class backgammon program [24, 55] has clearly demonstrated that reinforcement learning systems can generate intelligent behavior.

In 1968, it was argued [20] that reinforcement learning could be used as a foundation for understanding intelligence in the brain. The concept of reinforcement learning (illustrated in FIG. 4) in the modern way was described. In this concept, a system learns a strategy of action that tries to maximize the long-term future expected value of utility, following the concepts of Von Neumann. For the first time, it was pointed out that a machine could be built to perform reinforcement learning simply by trying to approximate dynamic programming as formulated by Howard [28].

In 1972, the Werbos Harvard Ph.D. thesis proposal included a flowchart virtually identical to FIG. 2, with a detailed discussion of how to adapt the components of the system. However, the actual thesis focuses on a rigorous, generalized formulation of backpropagation as such, along with a demonstration of its effectiveness in system identification and political forecasting and a minimal discussion of neural networks [26,61]. (The thesis is reprinted in its entirety in [26].) Originally there were concerns about the learning speed of HDP, as one scales up to larger problems [8,22]. From 1977 to 1981, the ideas of HDP and of two more sophisticated methods—DHP and GDHP—were published addressing these scaling problems [25,62,63]. In particular. [63] discussed the idea of using a neural network trained by backpropagation in order to approximate the J function of dynamic programming.

In the meantime, on a totally independent basis, Bernie Widrow [23] published the first working, successful implementation of an adaptive critic, using a neural network as a Critic network. His 1973 paper is the original source of the term "Critic." However, the Critic adaptation method that he used was not a true real-time learning method and has not been used elsewhere. In 1983, Barto, Sutton and Anderson [21] published a classic paper which became extremely famous in the 1990's. They implemented an adaptive critic system consisting of two adaptive elements or neurons. One element was a Critic, trained by a method which Sutton calls a Temporal Difference (TD) method. This method was developed on the basis of intuitive arguments about how to improve upon Widrow's algorithm. The method used in that paper was a very narrow special case of HDP. Later, in a famous 1988 paper [64], Sutton [64] expanded the concept of temporal difference methods to include "TD($\lambda$)" for $\lambda$ in the interval [0,1]. TD(1) essentially reproduces die old Widrow method, and TD(0) a generalization of the method in [21]. Very few papers actually use TD($\lambda$) for $\lambda$ other than zero (see 15,24,55). The other element of the system in [21] was a kind of Action network, trained by an associative reward/punishment algorithm called Arp, which is not a method for adapting Critics as such.

In January 1987 [65], a paper on ADP, GDHP, potential engineering applications and links to neuroscience was published, once again emphasizing the connection between reinforcement learning and dynamic programming. This paper led to major efforts by Barto and Sutton to follow up on this new connection to dynamic programming. Barto encouraged the early efforts in this area by Bertsekas [24], who, along with Tsitsiklis, has substantially enlarged the concept of TD. The theory behind TD his been expanded considerably by these and other efforts; however, the method itself remains a special case or subset (proper or otherwise) of HDP.

Offline simulation or "dreaming" has also been discussed as a way of improving the performance of ADP systems (as previously discussed in [65]). (Current evidence from psychology is consistent with this as a partial interpretation of dreams in human beings as well [66].) This was the basis of the "Dyna" architecture first presented by Sutton in [22]. This kind of offline learning is extremely important; however, the present invention is more suited to real-time systems.

The discussions of 1987 also contributed to the arrangement of an NSF workshop on neurocontrol, held in New Hampshire in 1988, which resulted in [22]. That workshop and book helped to bring together neurocontrol and adaptive critics as organized fields of research. FIG. 3.1 of that book illustrated the modem concept of reinforcement learning in a more picturesque way, equivalent to FIG. 4 above. Earlier forms of "reinforcement learning" that did not address the mathematical problem of maximizing utility (or minimizing cost) over time [67] did not help to carry through the control strategy given above with reference to equation (12).

More recently, "Action-Dependent Adaptive Critics" (ADAC) have been discussed. This generally includes Q-learning, ADHDP, ADDHP and ADGDHP [8,14], all of which are closely related. In fact, many of the "new" designs for "extended" or "modified" or "policy" Q-learning are actually implementations of ADHDP, which was reviewed at length in 1992 [14]. That book also reported a successful implementation at McDonnell-Douglas in the manufacturing of composite parts. It reported a successful simulated application to the control of damaged aircraft, which later led to a large related pro gram at NASA Ames. All of those methods use Critic networks which input not only $\underline{R}(t)$ but also $\underline{u}(t)$. Instead of approximating the J function of dynamic programming, they approximate a related function. When adapting a Critic where the controller or Action network is held fixed, the action-dependent methods for Critic adaptation reduce to their older, action-independent equivalents.

Another family of reinforcement learning methods called Alopex has also receievd attention. The most effective version of Alopex appeals to have been developed by Tzanakou of Rutgers. In that version, the Critic network is an action-dependent system, adapted by a procedure quite similar to ADHDP or Q-learning. Most of Klopf's final designs, in collaboration with Leemon Baird, have the same property. Although Q-learning and ADHDP appear less relevant, the two-sample method [50] discussed later is a significant exception.

In certain special cases, the same mathematics that underlie FIG. 2 can be implemented without a Model network as such. For example, in a plant with a single state variable, it is enough to know the sin of $(\partial R(t+1)/\partial u(t))$ in order to compute the derivatives of $\hat{J}(t+1)$ with respect to the weights, to within a scalar factor which effectively just modifies the learning rate $\alpha$. This kind of effect has permitted the development of architectures similar to FIG. 2, but simpler, with comparable performance in certain special cases. (For example, see Lewis [68] and by Berenji [69].)

More recently, Error Critics and a multiple-model hierarchical decision system, both motivated by recent findings from neuroscience [8–10,13,32,46], have been discussed. The hierarchical decision system is a higher-level learning design, which essentially requires ordinary Critic networks as subsystems.

Issues of stability and convergence have been a major concern of the adaptive critic community for a long time. Nevertheless, formal results about MBAC systems have been relatively sparse. There have been the Ph.D. theses of Prokhorov [15] and of Landelius [43], and unpublished results from Richard Saeks of Accurate Automation. Sacks' work focuses on whole-system stability issues, rather than Critic adaptation as such. Whole-systems stability is the major concern in [15] and [43], but they also consider Critic adaptation as such. Landelius mainly proves stability and convergence for his own Critic implementations. Prokhorov [15] proves a whole-systems stability result for an offline learning version of HDPG+BAC in the deterministic case. He also reports considerable empirical testing of many approaches, as will be discussed below.

Tsitsiklis and Van Roy [73] have reviewed a large number of papers from the literature on lookup-table Critics, showing many specific examples where TD—a special case of HDP—becomes unstable. However, they prove that TD with lookup tables is stable, under certain restrictive assumptions. The key assumption is that the training examples $\underline{x}(t)$ must be taken from the probability distribution implied by the Markhov chain being studied. Stability against arbitrary training sequences is not guaranteed, even in the case of lookup table Critics.

In addition to these important but sparse theoretical results, considerable practical energy has gone into the effort to make these methods converge, for a variety of different test problems. This has been a very important practical issue, even in the context of offline learning. Some of this empirical work focused on the interplay between Action networks, Model networks and Critics. Narendra in [41] addresses related issues. But this paper focuses on Critic networks as such.

Among the tricks that are relevant to Critics as such, which have proven to be very useful in obtaining convergence, are:

(1) "Shaping," [7,8,453]. In shaping, one first adapts a network to solve one class of control problems, and then uses the resulting weights as the initial values of the weights of a network trained to solve similar but more difficult problems. When this method is applied over and over again, it provides a way of doing "step-by-step learning" (not the same as real-time or incremental learning!) analogous to the way that humans really learn to perform difficult tasks.

(2) Interest rate management. In this approach, one starts out with very large values of r, and then one gradually decreases r to zero. (Usually r=0 represents our true values, if the utility function is properly articulated [12,74].) Strictly speaking, this is just a special case of shaping, because different values of r represent different optimization problems. Large values of r represent shorter-term optimization problems, which are usually easier to solve than the long-term problems.

(3) Utility function management. This can also be viewed as a form of shaping, in a way. In some cases, the choice of utility functions has even been used as way of cheating, of injecting prior knowledge about the desired controller into the adaptive system. However, for complex reasons [10,11,674], it does make sense to think of a hybrid man-machine control system, in which the human (as the upper controller) passes on something like his learned J function to the lower controller (the machine), which treats those inputs as its fundamental values (U). As a practical example—when using gradient-based MBAC methods to search for optimal energy-saving "chaos controllers," it makes sense to use a relatively flat cost function U, representing energy consumption, in some large acceptable region of state space, and then to add a gradually rising penalty function (e.g., quadratic) for points in some "buffer zone" between that region and regions which are truly dangerous.

These three tricks have been successful in a very wide range of studies. Also, many researchers in ADP for discrete state space reported similar results, in discussions organized by Sridhar Mahadevan of the University of South Florida, in connection with an NSF workshop in April 1996 on reinforcement learning oriented towards A1.

SUMMARY OF THE INVENTION

It is an object of the present invention to provide a more stable control system design than previously available in the prior art.

This and other objects of the present invention are achieved by providing a new adaptive control system, implemented in either hardware or software (or as a hybrid of both). The control system (and its corresponding method) is designed to enhance the stability of the response of a controlled application (e.g., a factory, an airplane, a missile interception system. or a financial system).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
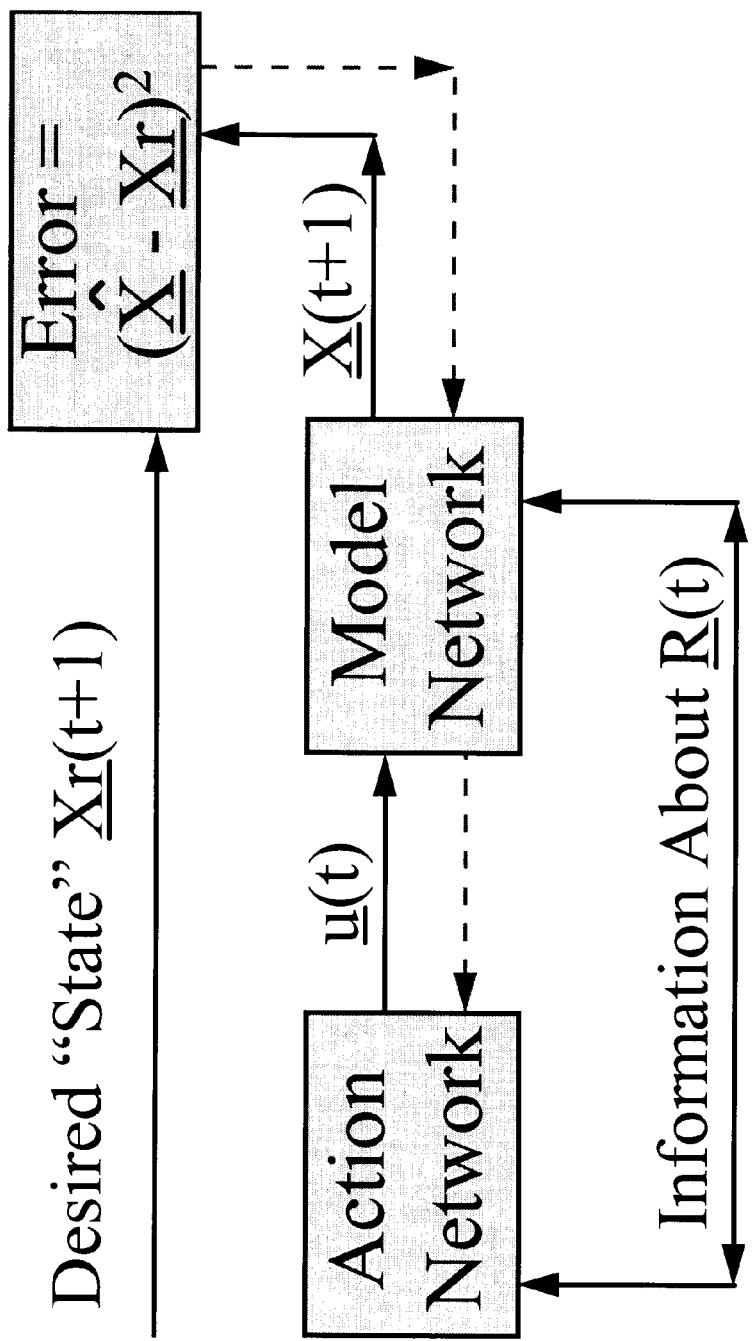
FIG. 1 is a block diagram of an Indirect Adaptive Control System.

A computer implements the method of the present invention. A computer housing houses a motherboard which contains a CPU, memory (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer also includes plural input devices, (e.g., a keyboard and mouse), and a display card for controlling monitor. In addition, the computer system further includes a floppy disk drive; other removable media devices (e.g., compact disc, tape, and removable magneto-optical media; and a hard disk, or other fixed, high density media drives, connected using an appropriate device bus (e.g., a SCSI bus, an Enhanced IDE bus, or a Ultra DMA bus). Also connected to the same device bus or another device bus, the computer may additionally include a compact disc reader, a compact disc reader/writer unit or a compact disc jukebox. The compact disc may be housed in a caddy or inserted directly into CD-ROM drives which do not require caddies. In addition, a printer also provides printed listings of control parameters (matrices and weights) used to implement the system.

As stated above, the system includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools. Such computer readable media further includes the computer program product of the present invention for implementing a stablized controller. The computer code devices of the present invention can be any interpreted or executable code mechanism, including but not limited to scripts, interpreters, dynamic link libraries, Java classes, Active X components, and complete executable programs.

Given this state of the art, many control engineers have questioned the practical value of adaptive control and real-time learning in general. However, extension of prior methods has practical engineering importance, for at least three reasons:

(1) Even when the stochastic optimization problem is solved offline, improved convergence can be of great practical value. A fully converged solution for J already implies a stability guarantee for the resulting feedback controller; however, the designers of such controllers would benefit from having tools which are more certain to provide these kinds of solution.

(2) Adaptation of parameters or networks "on the fly"—beyond the scope of substantive prior knowledge or models—is essentially the only tool available to address type-three uncertainty. Like biological brains, learning on the fly should be combinable together with application-specific feedback loops (which can also be tuned in real time), in order to get the best of both worlds.

(3) The extensions of adaptive control may improve stability and performance over time, and thereby enable this class of designs to become more competitive in some practical applications. These methods have inherent advantages over explicit multi-period optimization, such as reduced computational cost and correct treatment of noise in the nonlinear case. It is also possible to combine the two approaches, by using the ADP methods to estimate future costs or payoffs beyond the horizon of the n-step lookahead [15,33]. (Note that this kind of combination is quite different from the "rollout" methods discussed by Bertsekas [24], which use search trees rather than derivative-based methods like BTT.)

Thus, the present invention is directed to better approximate a true adaptive, control design that meets the ideal requirements for a universal controller as discussed above. The present invention is then extended to nonlinear, stochastic learning controllers that are applied to linear plants. The present invention draws upon the close parallels between a standard Indirect Adaptive Control (IAC) design, illustrated in FIG. 1, and the HDP+BAC design illustrated in FIG. 2. The design has three advantages. First, in linear quadratic optimization problems, it is well known that the solution to Bellman's equation is simply quadratic in the state of the system. Therefore, by choosing the "Critic network" to be a general quadratic function of the state, some set of weights will yield an exact solution of the Bellman equation. (This set must be verified empirically.)

Second, if a deterministic plant of this sort is controllable at all, then there will always exist some control law that sends the tracking error to zero, at an exponential rate. This guarantees that there exists a strategy or policy of action (control rule) for which the sum of future cost will be finite, even with $r=U_0=0$. Furthermore, dynamic programming always yields the strategy of action of minimum total future costs, when a minimum exists. That is, if a minimum does exist, the dynamic programming solution will do as well or better.

Third, Landelius [43] has already proven whole-system stability results for a particular implementation of HDP+BAC and for other methods to be discussed in greater detail below. Unfortunately, his new ways of implementing these methods—while very reasonable from a practical point of view—are technically not parallel, distributed systems. They are not true adaptive control designs in the spirit of Narendra, because they do not meet the tight constraints on computational cost and structure that are required for neural networks. Nevertheless, they are an important achievement. They go far beyond the earlier, similar work of Bradtke [44] in addressing total-system stability issues and indicate that this line of research can be successful.

In summary, if a parallel distributed version of HDP does in fact make the Critic converge to the dynamic programming solution, then some corresponding form of HDP+BAC is expected to provide a universal adaptive controller for the linear case. Such a structure would be a true adaptive control design, in the spirit of Narendra, because all of the concurrent adaptation laws are low-cost, single-pass adaptation laws. That is consistent with the local, parallel computing found in the brain—a style of computing which also makes it possible to build very high throughput dedicated chips.

Even for the fully observable linear deterministic case, it will take substantial effort to prove total system stability for this class of design, accounting for the coupled dynamics of all four parts of the overall system—the plant, the Action network, the Model network and the Critic. It took many years before Narendra and others [1–3] proved restrictive theorems about total system stability even for the SISO state, for systems with only three major components (i.e plant, Model. Action).

The first, most critical step in this process is to prove stability for the Critic adaptation as such, holding the rest as fixed, for a Critic adaptation rule that is also applicable to the nonlinear, stochastic case. However, none of the previously existing Critic adaptation rules were able to pass that test, for the definition of stability discussed below. The present invention provides new adaptation rules that do.

Critic adaptation methods are a way to derive Liapunov functions in a computer-based numerical fashion. The J function of dynamic programming is guaranteed to be a Liapunov function, at least for deterministic systems. This connection points towards another new direction for possible research [49]. One way of implementing this connection would be to use analytically-derived Liapunov functions as initial values for Critic networks. For example, a Liapunov function developed for rigid-body robotics could be tuned further, adaptively, using a method like HDP, in order to derive a more accurate Liapunov function for a somewhat flexible robot. By successive tuning, one could derive Critics suitable for the control of much more flexible robots.

In summary, HDP, DHP and GDHP are the three Critic adaptation methods relevant to the objects discussed herein. TD, as a subset (proper or improper) of HDP, is automatically included in this analysis. (The two-sample method is also discussed herein.) HDP and GDHP are methods for adapting either neural networks or other parametrized systems $\hat{J}(\underline{R}(t), W)$—with an array $W$ of parameters or weights—so as to approximate the J function of dynamic programming. The J function of dynamic programming satisfies the extended Bellman equation (equation 12).

Figure 2:
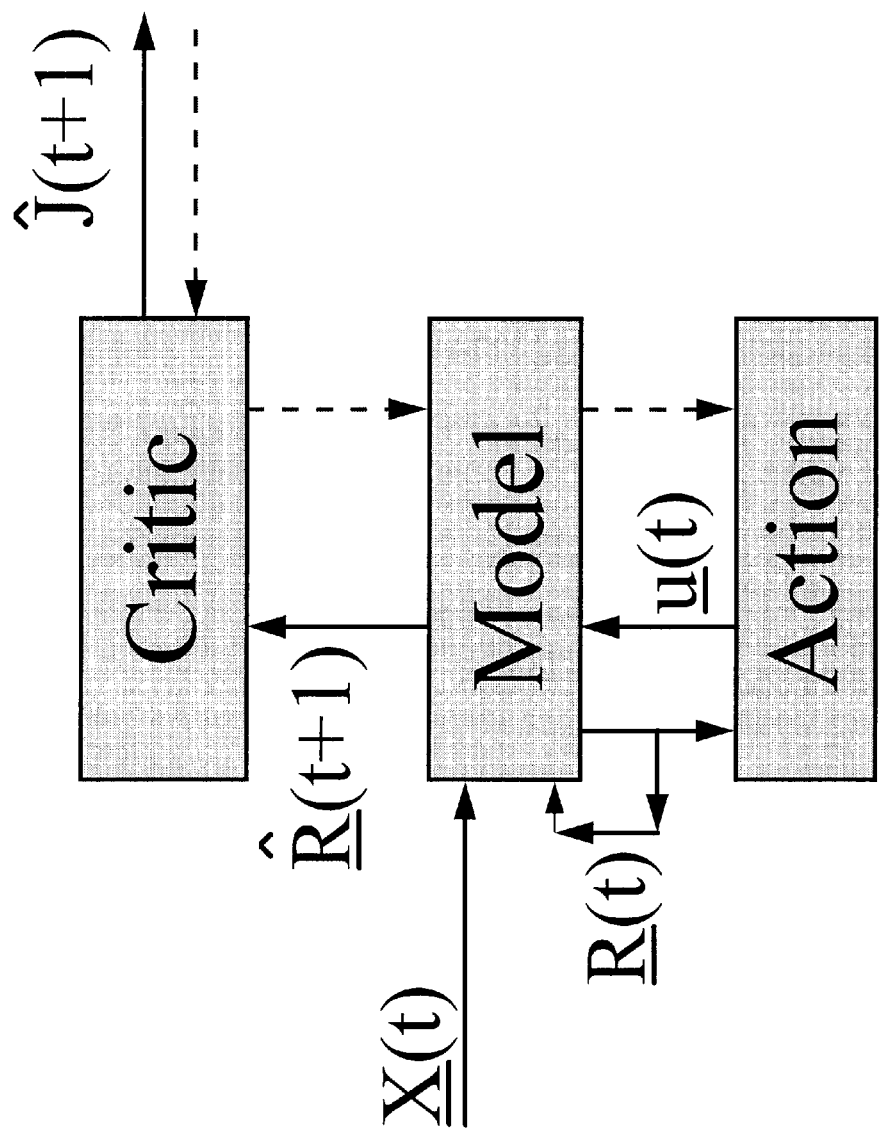
FIG. 2 is a block diagram of a combined HDP and BAC control system.
Figure 3:
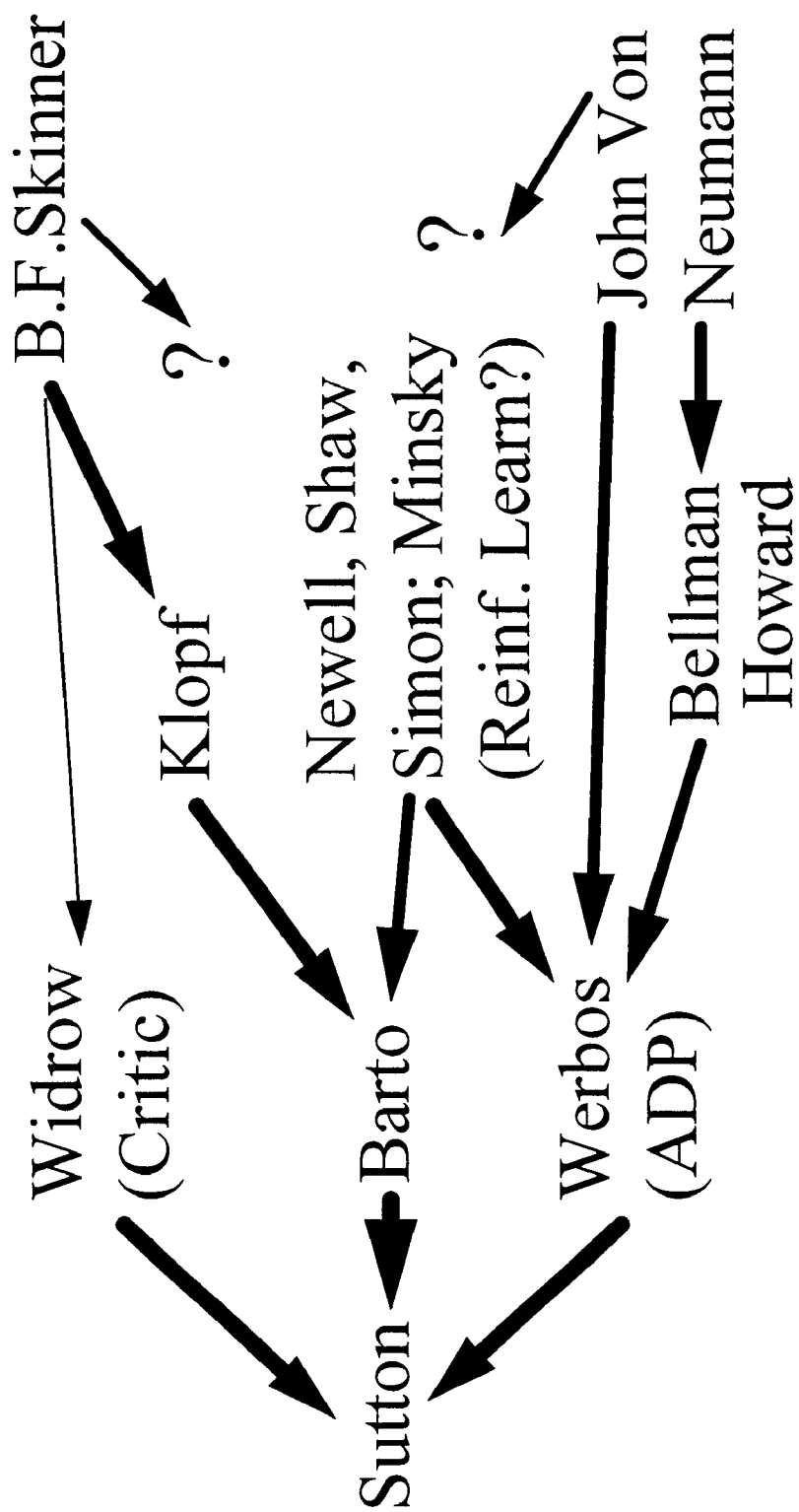
FIG. 3 is a hierarchy showing the early origins of the adaptive critic field.
Figure 4:
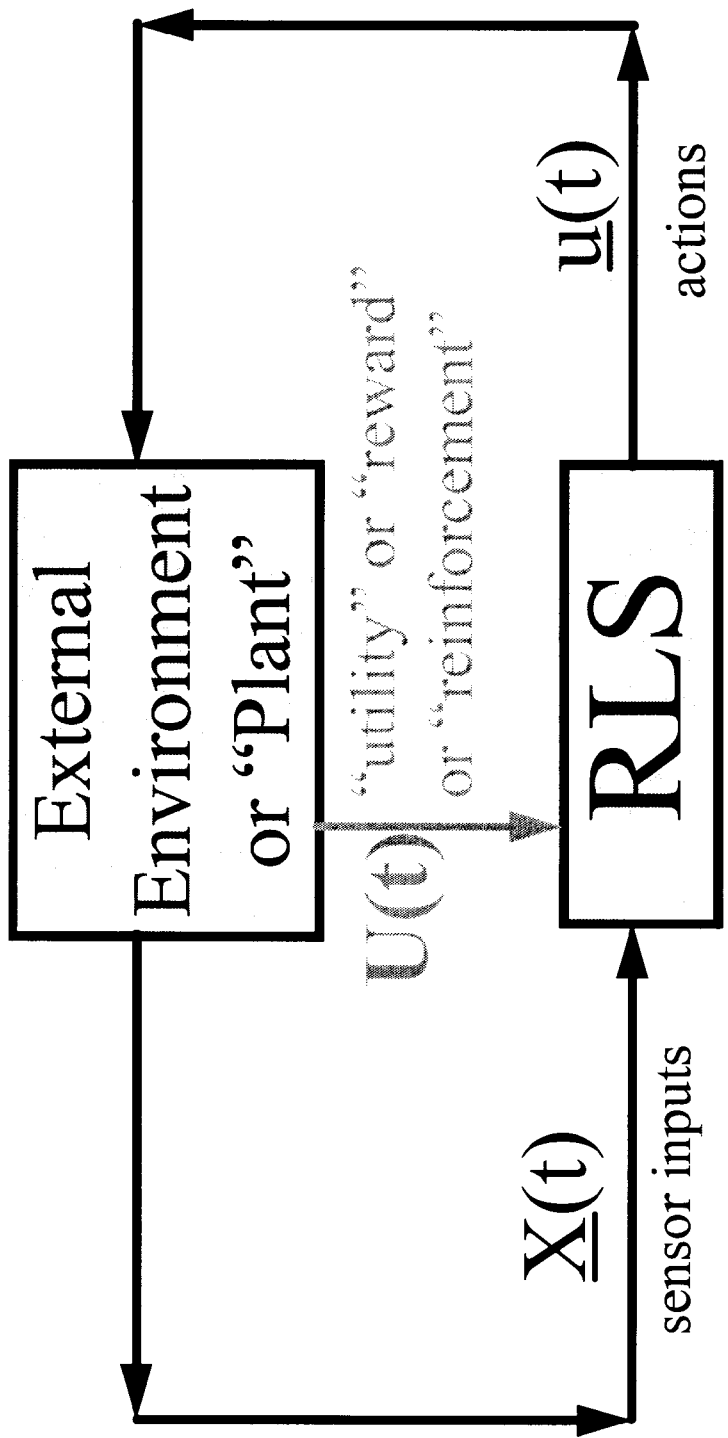
FIG. 4 is a block diagram of a reinforcement learning system.

In FIG. 2, the Action network or controller implements a mathematical function $\underline{u}(\underline{R}(t))$. In the language of dynamic programming [24], this function is called a "policy" ($\pi$) or a strategy of action. The key theorem of dynamic programming is that the choice of actions $\underline{u}$ implied by equation 12 represents the best policy of action. In other words, for the case where $U_0=0$, it yields the policy $\pi$ such that:

$$J(\underline{R}(t)) = \operatorname*{Max}_{\pi} J^{\pi}(\underline{R}(t)), \tag{13}$$

where $J^\pi$ is the expected value under policy $\pi$:

$$\left\langle \sum_{k=0}^{\infty} U(\underline{R}(t+k), \underline{u}(t+k))/(1+r)^k \right\rangle \tag{14}$$

For a fixed policy of action $\pi$, simple algebraic manipulations [24,44] yield an equation parallel to equation 12:

$$J^\pi(\underline{R}(t)) = U(\underline{R}(t), \underline{u}^\pi(t)) + (1/(1+r))\langle J^\pi(\underline{R}(t+1))\rangle - U_0^\pi, \tag{15}$$

where $U_0^\pi$ is the expected value of U across all future times under policy $\pi$. In finite-horizon problems with r=0, the best policy is the one which maximizes $U_0^\pi$. In the absence of "crossroads phenomena," it can be obtained by choosing $\underline{u}(t)$ as in equation 12 for the maximal $U_0^\pi$. [28].

DHP attempts to adapt a network $\hat{\underline{e}}(\underline{R}(t), W)$ so as to approximate the vector:

$$\underline{\lambda}(t) = \nabla_{\underline{R}} J(\underline{R}(t)), \tag{16}$$

i.e., $$\lambda_i(t) = \frac{\partial}{\partial R_i} J(\underline{R}(t)) \tag{17}$$

These $\lambda_i$ variables correspond to Lagrange multipliers [4,5] in deterministic optimal control, and to the "costate variables" in Pontryagin's approach. In economics, such Lagrange multipliers are associated with price signals, or, more precisely, with "shadow prices." Thus, from an economist's viewpoint, DHP may be regarded as a distributed, adaptive system for calculating prices under conditions of uncertainty.

The recurrence relation for $\lambda$ may be derived simply by differentiating equation 12. In the simplest, most direct representation, this yields [8, ch. 13]:

$$\begin{aligned}\lambda_i(\underline{R}(t)) &= \frac{\partial J(\underline{R}(t))}{\partial R_i(t)} = \frac{\partial U(\underline{R}(t), \underline{u}(\underline{R}(t)))}{\partial R_i(t)} + \\ &\quad \frac{1}{1+r}\left\langle \frac{\partial J(\underline{R}(t+1))}{\partial R_i(t)}\right\rangle \\ &= \frac{\partial U(\underline{R}(t), \underline{u}(\underline{R}(t)))}{\partial R_i(t)} + \sum_j \frac{\partial U(\underline{R}, \underline{u})}{\partial u_j} \cdot \frac{\partial u_j(\underline{R}(t))}{\partial R_i(t)} + \\ &\quad \frac{1}{1+r}\left\{\sum_j \left\langle \frac{\partial J(\underline{R}(t+1))}{\partial R_j(t+1)} \cdot \frac{\partial R_j(t+1)}{\partial R_i(t)}\right\rangle + \right.\\ &\quad \left.\sum_{j,k}\left\langle \frac{\partial J(\underline{R}(t+1))}{\partial R_i(t+1)} \cdot \frac{\partial R_j(t+1)}{\partial u_k(t)} \cdot \frac{\partial u_k(t)}{\partial R_j(t)}\right\rangle\right\} \\ &= \frac{\partial U(t)}{\partial R_i(t)} + \sum_j \frac{\partial U(t)}{\partial u_j} \cdot \frac{\partial u_j(t)}{\partial R_i(t)} + \\ &\quad \frac{1}{1+r}\left\{\sum_j \lambda_j(t+1)\left(\frac{\partial R_j(t+1)}{\partial R_i(t)} + \right.\right.\\ &\quad \left.\left.\sum_k \frac{\partial R_j(t+1))}{\partial u_k(t)} \cdot \frac{\partial u_k}{\partial R_j}\right)\right\}\end{aligned} \tag{18}$$

Unfortunately, equation 18—unlike equation 12—no longer includes the recipe for choosing $\underline{u}$. However, (as in equation 12) $\underline{u}$ should be chosen so as to maximize (or minimize) $U(t)+\langle J(t+1)\rangle/(1+r)$. For differentiable systems, this implies:

$$\begin{aligned}0 &= \frac{\partial}{\partial u_i}\left(U(t) + \frac{1}{1+r}\langle J(t+1)\rangle\right) \\ &= \frac{\partial U(t)}{\partial u_i(t)} + \frac{1}{1+r}\sum_j \left\langle \frac{\partial J(\underline{R}(t+1)}{\partial R_j(t+1)} \cdot \frac{\partial R_j(t+1)}{\partial u_i(t)}\right\rangle \\ &= \frac{\partial U(t)}{\partial u_i(t)} + \frac{1}{1+r}\left\langle \lambda_j(t+1) \cdot \frac{\partial R_j(t+1)}{\partial u_i(t)}\right\rangle\end{aligned} \tag{19}$$

Equation 18 is a stochastic version of the classical Pontryagin principle. In recent years, the mathematics community has shown interest in other, more formal stochastic versions of the Pontryagin principle [70]. For any particular policy $\pi$, the differentiation of equation 15 again yields equation 18, but without the additional requirement of equation 19.

As discussed herein, the Critic networks ($\hat{J}$ or $\hat{\hat{e}}$) of HDP and DHP systems are adapted by gradient-based error minimization, as in classical backpropagation [26]. However, in the neural network community, many researchers prefer to use different types of adaptation, in order to perform basic tasks in supervised learning. (HDP previously has been detailed [8,17] in the general case so that the user can choose a preferred supervised learning system. DHP was similarly described in [8].) This is the reason why Landelius [43] was able to use an alternative supervised learning method, somewhat analogous to Recursive Least Squares (RLS), in his implementations of HDP, DHP, etc. (RLS is not a parallel distributed processing method, according to the strict standards of neural network research, but it comes close.) Unfortunately, in equation 10 of [8, ch. 13], there is a typographical error. The left-hand side should read "$\lambda^*(t)$".) The reader should also be warned that the pseudocode in [22] contains typographical errors. GDHP inherently requires a gradient-based learning approach.

In practice, the restriction to gradient-based learning is not as serious as it may seem at first, because many popular learning algorithms can be expressed in that form. For further examples and discussions of how to implement these methods in the general case, see the literature discussed above with reference to adapting Critics. Certain kinds of second-order information can also be used in true gradient-based parallel processing designs, as will be discussed later. Landelius has suggested that his ways of implementing DHP and ADDHP might provide an alternative route for achieving a low-cost universal adaptive control.

To adapt the Action networks, in the general case, one mainly uses the derivatives of U(t)+<J(t+1)> with respect to the weights in the Action network. One can calculate those derivatives by first calculating the derivatives with respect to u(t) (as in equation 19, implemented by backpropagation), and then using backpropagation again to propagate them through the Action network. For HDP and GDHP, see the discussion above of HDP+BAC, except that an extra term is added for the derivatives of U($\underline{R}$(t), $\underline{u}$(t)) with respect to $\underline{u}$(t). The present invention, however, focuses on the special case where U(t) is expressed simply as U($\underline{R}$(t)), so that this additional, term drops out. Even though equation 19 calls for the use of an expectation value, the same change of weights can be achieved, on average, by simply adapting the weights in response to the currently observed derivatives, as in the usual LMS learning and statistical sampling.

The present invention focuses on assessing the stability and accuracy of Critic adaptation in situations where the Action network or policy is held fixed, where the Model network is also held fixed, where U(t) does not depend on $\underline{u}$(t), and where Critic adaptation is based on the traditional gradient-based versions of the Critic adaptation methods. In addition, the present invention assumes a completely observable plant, where $\underline{R}$(t) and $\underline{X}$(t) are the same. For simplicity, it is assumed that $U_0=0$ or that $U_0$ is known apriori.

In this special case, there really is no Action network, in effect. Thus, the augmented Model network is defined, is the combination of the Model network proper and the Action network, treated as one large network. The augmented Model network is written as:

$$\underline{R}(t+1)=\underline{f}(\underline{R}(t), \underline{w}(t)), \tag{20}$$

where $\underline{w}$(t) refers to a vector of random variables, as in [39]. (Statisticians more often use the notation $\underline{e}$(t) or $\underline{u}$(t) to refer to a vector of random numbers; however, this notation has led to severe confusion in parts of the control theory community, especially involving the definition of "ARMA" processes, which are explained at length in [26,29].)

In real-time adaptation in HDP, the Critic is adapted as follows at each time t:

(1) First obtain the vector $\underline{R}$(t), simply by observing (or estimating) the current state of the plant.
(2) Next obtain a sample of $\underline{R}$(t+1), either by simulating equation 20 or by waiting until time t+1 and obtaining a new observation.
(3) Update the weights $W_{ij}$ by:

$$W_{ij}(t+1) = W_{ij}(t) - \alpha \frac{\partial E}{\partial W_{ij}} \tag{21}$$

where $\alpha$ is a learning rate (as in equations 8 and 11), and $$E=\tfrac{1}{2}(e(t))^2, \tag{22a}$$

where:

$$e(t)=\hat{J}(\underline{R}(t+1))/(1+r)+U(t)-\hat{J}(\underline{R}(t))-U_0 \tag{22b}$$

This is not a complete description of the problem, because it does not specify how to compute the derivatives that appear in equation 21. This is not just a matter of computation; there is also a need to specify which partial derivatives or gradient are used. In HDP proper, the system calculates:

$$\frac{\partial E}{\partial W_{ij}} = 2e\left(\frac{\partial E}{\partial W_{ij}}\right) = 2e\left(-\frac{\partial}{\partial W_{ij}}\hat{J}(\underline{R}(t), W)\right) \tag{23}$$

This calculation treats $J(\underline{R}(t))$ in equation 22 as a function of W, but does not account for the effect of W on $J(\underline{R}(t+1))$! If equation 12 were solved using an extension of the Galerkin method [27], the weights would be adapted by use of the complete total gradient:

$$\frac{\partial E}{\partial W_{ij}} = 2e\left(-\frac{\partial}{\partial W_{ij}}\hat{J}(\underline{R}(t), W) + \frac{1}{1+r}\frac{\partial}{\partial W_{ij}}\hat{J}(\underline{R}(t+1), W)\right) \tag{24}$$

Combining equations 21, 22 and 23, pure HDP may be written as:

$$\Delta W = -2\alpha e(\nabla_p e) = 2\alpha e \nabla \hat{J}(\underline{R}(t)) \tag{25}$$

and the Galerkinized version of HDP, HDPG, may be written as:

$$\Delta W = -2\alpha e(\nabla_t e) = 2\alpha e(\nabla \hat{J}(\underline{R}(t)) - (1/(1+r))\nabla \hat{J}(\underline{R}(t+1))), \tag{26}$$

where $\nabla_p$ refers to the partial gradient with respect to the weights, and where $\nabla_t$ refers to the total gradient. All of these derivatives can be obtained very efficiently by use of backpropagation, using local parallel calculations and so on [8,26].

In DHP, essentially the same three steps are followed, but the error, E, is defined as:

$$E = (\underline{e}(t))^2 = \sum_i (\lambda_i * (t) - \hat{\lambda}_i(t))^2, \tag{27}$$

where the target value $\lambda_i^*(t)$ is calculated by:

$$\lambda_i^*(t) = \frac{\partial U(t)}{\partial R_i} + \frac{1}{1+r}\sum_j \hat{\lambda}_j(t+1) \cdot \frac{\partial f_j(\underline{R}(t), \underline{w}(t))}{\partial R_i(t)} \quad (28)$$

Note that $\hat{\lambda}_i(t)$ is simply the i-th component of the vector $\underline{\hat{\lambda}}(\underline{R}(t),W)$ calculated by the Critic network, and that $\hat{\lambda}_j(t+1)$ is the j-th component of $\underline{\hat{e}}$ ($\underline{R}(t+1),W$). Equation 28 corresponds to equation 10 of [8,ch.13] in the case where there is no Action network (and where the typo on the left is fixed). However [8,ch. 13] explicitly indicates how the derivatives may be calculated efficiently, using "dual subroutines" or "dual functions" in order to implement backpropagation. Note as well that the backpropagation equations for equation 28 require that the vector $\underline{w}(t)$ be known. When $\underline{R}(t+1)$ was obtained from simulation, $\underline{w}(t)$ was already known, but when $\underline{R}(t+1)$ is observed directly, $\underline{w}$ is deduced efficiently only if the Model network has a special kind of structure. (For example, the Model network could be based on the usual assumption that $R_i(t+1)=\hat{R}_i(t+1)+w_i$, or it could be based on a structure like the Stochastic Encoder/Decoder, Predictor of [8,ch.13].)

Here, as with HDP, either a pure version of DHP, based on $\nabla_p E$, or a Galerkinized version, based on $\nabla_t E$, may be chosen. In pure DHP:

$$\Delta W = \qquad (29)$$
$$-2\alpha \sum_k e_k \nabla_p e_k = 2\alpha \sum_k e_k \nabla \hat{\lambda}_k(\underline{R}(t)) = -2\alpha(\underline{e}^T \nabla_p \underline{e}) = 2\alpha(\underline{e}^T \nabla \underline{\hat{e}}(t))$$

In DHPG:

$$\Delta W_{ij} = -2\alpha \sum_k e_k \left(\frac{\partial \lambda_k^*(t)}{\partial W_{ij}} - \frac{\partial \hat{\lambda}_k(t)}{\partial W_{ij}}\right) \quad (30)$$

$$= -2\alpha \sum_k e_k \left(-\frac{\partial \hat{\lambda}_k(t)}{\partial W_{ij}} + \frac{1}{1+r}\sum_v \frac{\partial f_v(R(t),\underline{w}(t))}{\partial R_k} \cdot \frac{\partial \hat{\lambda}_v(t+1)}{\partial W_{ij}}\right)$$

$$= 2\alpha \sum_k e_k \frac{\partial \hat{\lambda}_k(t)}{\partial W_{ij}} - \frac{2\alpha}{1+r}\sum_{k,v} e_k \frac{\partial f_v}{\partial R_k} \cdot \frac{\partial \hat{\lambda}_v(t+1)}{\partial W_{ij}}$$

This can be represented as:

$$\Delta W = -2\alpha \sum_k e_k \nabla_t e_k = 2\alpha(\underline{e}^T \nabla \underline{\hat{e}}(t)) - \frac{2\alpha}{1+r}\underline{e}^T F^T(t)\nabla \underline{\hat{e}}(t+1), \quad (31)$$

where F(t) is the Jacobian with respect to $\underline{R}(t)$ of the function $\underline{f}(\underline{R}(t),\underline{w}(t))$, and where all of the gradients are gradients with respect to the array of weights W.

Finally, in GDHP, the same three steps are used as with HDP in order to adapt the weights in the Critic network J($\underline{R}(t),W$), but equation 22a is replaced with the error function:

$$E = \Omega_0(e_0^2(t)) + \underline{e}^T \Omega \underline{e}(t), \quad (32)$$

where $\Omega_0$ is some nonnegative scalar and $\Omega$ is some positive definite matrix, where $e_0$ is defined to be the same as "e" as defined in equation 22b, and where $\underline{e}(t)$ is essentially the same vector as in equation 27. (The definition for $\underline{e}(t)$ changes because a $\underline{\hat{e}}$ output available is not available when using a critic which outputs $\hat{J}$. Thus to define $\underline{e}(t)$ here, still using equations 27 and 28, each reference to $\underline{\hat{e}}$ is replaced by a reference to $\nabla \hat{J}$.) This is already sufficient to define GDHP, in a purely mathematical sense. Again, of course, there are two versions of the method, one a pure version and the other a Galerkinized version, depending on whether one adapts the weights in proportion to $\nabla_p E$ or $\nabla_t E$.

GDHP is far more difficult to implement than HDP or DHP. Therefore, most researchers in this area focus their efforts on studying HDP and DHP, which already present major challenges and opportunities. Only Wunsch and Prokhorov have claimed a working implementation of GDHP[14]. To calculate the derivatives of E with respect to the weights, directly, second-order backpropagation is used; the theory of how to do this is given in [8,ch. 10], and pseudocode may be found in [71]. Indirect approaches may or may not converge to the same equilibrium. Even though GDHP is more difficult to implement than HDP or DHP, it is still a local, parallel neural network design, O(N) in cost in the same way as the other.

In [65], it was proposed that 92 should be a diagonal matrix, in effect. From a neural network viewpoint, that is a reasonable restriction. Herein, only two special cases are considered: (1) $\Omega=1$; (2) $\Omega$ as any positive symmetric real matrix. In both cases, $\Omega_0=0$. Strictly speaking, then, the conclusions below about GDHP apply only to those special cases of GDHP. But the general form of GDHP is a hybrid, in effect, of HDP (which minimizes $e_0^2$) and of those special cases. It is difficult to believe that any form of GDHP could be unconditionally stable if those special cases and HDP both fail to achieve unconditional stability.

Using HDP, DHP or GDHP as methods for continuous-time adaptation appears to unique. There are several reasons for this. First, in real-world computing, digital or analog, there always are time delays, especially when complex nonlinear calculations are required. Continuous-time equations that assume that special-purpose analog chips are used and that no such delays exist would not accurately represent the actual behavior of a real-world computational system. Second, there are fundamental theoretical reasons why higher-order intelligent systems must contain discrete "clocks" [32].

Third, there is evidence from a host of respected neuroscientists (e.g. Llinas and Barry Richmond) that indicates that there are surprisingly precise "clocks" all over the brain. For example, there are general, nonspecific synchronized signals which enter the cerebral cortex, and create alternating "windows" of 30–50 ms in which the dynamics of the entire circuit appear to behave differently. Fourth, a discrete-time representation tends to simplify the communication and presentation of complex designs. Fifth, one can normally approximate the behavior of continuous-time systems with a series of discrete-time systems, but not vice-versa. Of course, the continuous time version of the Bellman equation—sometimes called the Hamilton-Jacobi-Bellman equation—has been well know for decades [4].

On the other hand, Narendra [1] and Grossberg [72] and others have proved a number of very important stability theorems, using a combination of Liapunov stability analysis and continuous-time representations. There is a connection between Liapunov theory and continuous-time representation.

For HDP, the discrete-time case and the continuous-time case do not appear to be very different. (Those cases are not likely to be very different for DHP or GDHP, either.)

The continuous-time version of equation 15 is:

$$\partial_t J = -U + U_0 + rJ \tag{33}$$

The continuous-time version of equation 21 is:

$$\partial_t W_{ij} = -\alpha \frac{\partial}{\partial W_{ij}} E = -2\alpha e \frac{\partial}{\partial W_{ij}} e, \tag{34}$$

where:

$$e = \partial_t \hat{J} + U - U_0 - r\hat{J} \tag{35}$$

For the continuous time version of pure HDP, HDPC, the partial gradient is given by:

$$\frac{\partial e}{\partial W_{ij}} = -\frac{\partial \hat{J}}{\partial W_{ij}} \tag{36}$$

(Multiply this by (1−r) has no real effect on equation (34) since it simply multiplies the arbitrary fixed scalar α by another fixed positive scalar.) For the continuous-time version of HDPG, HDPGC, the full gradient is given by:

$$\frac{\partial e}{\partial W_{ij}} = \frac{d}{dt}\left(\frac{\partial \hat{J}}{\partial W_{ij}}\right) - r\frac{\partial \hat{J}}{\partial W_{ij}} \tag{37}$$

where the total derivative with respect to time is computed as if W were constant. In other words, the system defines:

$$\frac{d}{dt}\left(\frac{\partial \hat{J}}{\partial W_{ij}}\right) = \sum_k \left(\frac{\partial^2 \hat{J}}{\partial W_{ij} \partial R_k} \dot{R}_k\right) \tag{38}$$

which could be calculated in a number of ways (such as direct observation of the time-changes of the network under fixed weights or the use of second-order backpropagation).

The continuous-time version of DHP is based on the gradient with respect to $\underline{R}$ of equation 33:

$$\partial_t \underline{\hat{\lambda}} = -\nabla U + r\underline{\hat{\lambda}} \tag{39}$$

The continuous-time version of equation 21, for E defined as in equation 27, is:

$$\partial_t W_{ij} = -\alpha \frac{\partial}{\partial W_{ij}} |\underline{e}|^2 = -2\alpha \sum_k e_k \frac{\partial}{\partial W_{ij}} e_k \tag{40}$$

where:

$$e_k = \partial_t \hat{\lambda}_k + \frac{\partial U}{\partial R_k} - r\hat{\lambda}_k \tag{41}$$

For the continuous-time version of pure DHP, DHPC, equation 40 is completed by defining:

$$\frac{\partial}{\partial W_{ij}} e_k = -\frac{\partial}{\partial W_{ij}} \hat{\lambda}_k \tag{42}$$

For DHPGC, the system defines:

$$\frac{\partial}{\partial W_{ij}} e_k = \frac{d}{dt}\left(\frac{\partial \hat{\lambda}_k}{\partial W_{ij}}\right) - r\frac{\partial \hat{\lambda}_k}{\partial W_{ij}} \tag{43}$$

where the total derivative with respect to time in equation 43 is defined exactly in parallel with the similar equations 37 and 38.

Finally, in GDHPC and GHDPGC, the weights are adapted according to:

$$\partial_t W_{ij} = -\alpha \frac{\partial}{\partial W_{ij}} E, \tag{44}$$

where E is defined as in equation 32, and where $e_0, \underline{e}(t)$ and their derivatives are based on e, $\underline{e}(t)$ and their derivatives for HDPC and DHPC—exactly in parallel to the way that HDP and DHP are used in GDHP in the discrete-time case.

As discussed above, it is assumed that the Action network is held fixed, which results in an augmented model $\underline{R}(t+1) = \underline{f}(\underline{R}(t), \underline{w}(t))$. In working with the linear observable case, notation similar to that of Narendra and Annaswamy [1] is used. Thus the state vector will be denoted simply as $\underline{x}$. Under these conditions, a linear deterministic MIMO plant obeys the following very simple dynamics:

$$\partial_t \underline{x}(t) = A\underline{x} \tag{45}$$

for the continuous-time case, or:

$$\underline{x}(t+1) = A\underline{x}(t) \tag{46}$$

for the discrete-time case. The linear stochastic MIMO plant obeys:

$$\partial_t \underline{x} = A\underline{x} + \underline{w} \tag{47}$$

in the continuous-time case, where $\underline{w}$ is a continuous stochastic process [4,5]. In the discrete-time case, it obeys:

$$\underline{x}(t+1) = A\underline{x}(t) + \underline{w}(t), \tag{48}$$

where $\underline{w}$ is a random vector based on the multivariate normal distribution N(0,Q), which implies that:

$$<\underline{w}> = \underline{0} \tag{49}$$

$$<\underline{w}\underline{w}^T> = Q \tag{50}$$

By using a minimization of tracking error as an immediate goal, which is a quadratic in the state vector, the cost function to be minimized is assumed to be quadratic (technically, a quadratic disutility function) according to:

$$U(\underline{x}) = \underline{x}^T V \underline{x}, \tag{51}$$

where r is assumed to be zero.

For many linear-quadratic optimization problems, it is well known that the true J function of dynamic programming is quadratic in the state vector $\underline{x}$. This was crucial to the research strategy discussed above. Thus for all of the $\hat{J}$ Critic networks applied to these problems:

$$\hat{J}(\underline{x}) = \underline{x}^T C \underline{x} \tag{52}$$

For the $\hat{\underline{e}}$ Critics, the gradient of $\hat{J}$ with respect to $\underline{x}$ is given by:

$$\hat{\underline{e}}(\underline{x}) = 2C\underline{x} \tag{53}$$

In order to analyze stability properties, a weight error matrix M is given by:

$$M = C - C^* \quad (54)$$

where $C^*$ is the correct Critic weight matrix, the matrix which satisfies the Bellman equation for these systems:

$$J(\underline{x}(t)) = U(\underline{x}(t)) + \langle J(\underline{x}(t+1)) \rangle - U_0 \quad (55)$$

which, upon substitution from 51 and 53, reduces to:

$$C^* = V + A^T C^* A \quad (56)$$

both in the deterministic case (where $U_0=0$) and in the stochastic case (where $U_0 = \langle \underline{w}^T C^* \underline{w} \rangle = \mathrm{Tr}(C^* Q)$, a scalar independent of $\underline{x}$).

For the stochastic version of these problems, with r=0, the $U_0$ term is not generally equal to zero. This affects HDP and its variants, but not DHP or GDHP (as implemented here). For simplicity, $U_0$ has not been adapted here, because it does not affect the issues presented herein. In practical computing work where r=0, the usual practice is to start with r>0 and gradually send r towards zero, and see what the Action network converges to; the adaptation of $U_0$ has not received serious attention. This is a point worth returning to, as the basic understanding becomes more rigorous.

In describing the effects of adaptation in the discrete-time case, infinitely small learning, rates have implicitly been assumed. Many techniques exist to reduce learning rates, in practice, when they are so large that they lead to instabilities. Those issues are certainly worthy of study. Here, however, the more basic question is whether these methods could be unconditionally stable, even if there were no danger of learning rates being set too high. This approach simplifies the analysis very greatly, because the adaptation of C can be represented as a continuous process represented as a differential equation. This, in turn, allows the use of the usual continuous-time Liapunov stability methods.

To derive the adaptation rule for C with HDPC and HDPGC in the linear case with r=0, equations 51 and 52 are substituted into equation 35, which yields:

$$e = \partial_t(\underline{x}^T C \underline{x}) + \underline{x}^T V \underline{x} - U_0 = \underline{x}^T C \underline{x} + \underline{x}^T C \underline{x} + \underline{x}^T V \underline{x} - U_0, \quad (57)$$

where "$\partial_t$" is a standard notation from physics for differentiation with respect to time. For the deterministic case, equation 45 is substituted into equation 57, and since $U_0=0$ here, e is given by:

$$e = \underline{x}^T A^T C \underline{x} + \underline{x}^T C A \underline{x} + \underline{x}^T V \underline{x} \quad (58)$$

For HDPC, equation 52 is substituted into equation 36, remembering that the weights "$W_{ij}$" for the Critic shown in equation 52 are simply the matrix elements $C_{ij}$. This yields:

$$\frac{\partial e}{\partial C_{ij}} = -x_i x_j \quad (59)$$

Finally, substituting equations 59 and 58 into equation 34, the adaptation rule for HDPC in the linear deterministic case becomes:

$$\partial_t C_{ij} = \alpha(\underline{x}^T A^T C \underline{x} + \underline{x}^T C A \underline{x} + \underline{x}^T V \underline{x}) x_i x_j \quad (60a)$$

which can be expressed more compactly as:

$$\partial_t C = \alpha e \underline{x} \underline{x}^T \quad (60b)$$

For HDPGC, it is easiest to compute the total gradient of e with respect to C by differentiating equation 58 directly:

$$\nabla_C e = \underline{x} \underline{x}^T A^T + A \underline{x} \underline{x}^T \quad (61)$$

Substituting equations 61 and 58 back into equation 38:

$$\partial_t C = -\alpha e (\underline{x} \underline{x}^T A^T + A \underline{x} \underline{x}^T) \quad (62)$$

Equation 54 is then solved to get:

$$C = M + C^* \quad (63)$$

Substituting this into equation 58, and subtracting out the terms containing $C^*$ (which cancel out due to the Bellman equation, as expressed in equations 55 and 56), e is rewritten as:

$$e = \underline{x}^T A^T M \underline{x} + \underline{x}^T M A \underline{x} \quad (64)$$

Since the matrix $C^*$ in equation 63 is constant (i.e. unchanged by our adaptation process), substitution into equation 60 yields equations (65) and (66) for HDPC and HDPGC, respectively.

$$\partial_t M = \alpha e \underline{x} \underline{x}^T \quad (65)$$

$$\partial_t M = -\alpha e (\underline{x} \underline{x}^T A^T + A \underline{x} \underline{x}^T). \quad (66)$$

For all the varieties of HDP, the matrices $C^*$, C and M are assumed to be symmetric, without loss of generality, because: (1) only the symmetric part of C or $C^*$ affects the function $J(\underline{x})$; (2) the update rules for C and M all involve the addition of symmetric matrices only (which can be seen by simply looking at the right-hand-side of these update equations).

Continuing with the analysis for HDP and HDPG, substituting equations 51 and 52 into 22b, again with r=0, produces:

$$e = \underline{x}(t+1)^T C \underline{x}(t+1) + \underline{x}^T V \underline{x} - \underline{x}^T C \underline{x} - U_0 \quad (67)$$

where "$\underline{x}$" refers to $\underline{x}(t)$. Substituting equation 46 into equation 67, and exploiting the fact that $U_0=0$ in the deterministic case, produces:

$$e = \underline{x}^T A^T C A \underline{x} + \underline{x}^T V \underline{x} - \underline{x}^T C \underline{x} = \underline{x}^T (A^T C A + V - C) \underline{x} \quad (68)$$

For HDP, substituting equation 52 into equation 23, produces:

$$\frac{\partial E}{\partial W_{ij}} = -2 e x_i x_j \quad (69)$$

Assuming infinitely small learning rates in equation 21, such that equation 21 is converted into a differential equation, the substituting from equation 69 into that equation yields:

$$\partial_t C_{ij} = -\frac{1}{2} \frac{\partial E}{\partial W_{ij}} = e x_i x_j \quad (70)$$

Although an apparent learning rate of $\alpha = \frac{1}{2}$ was chosen (for simplicity's sake), in actuality, the choice of apparent leaning rate has no effect on the meaning of this equation. It only rescales the arbitrary time scale of this equation.

For HDPG, equation 52 is substituted into equation 24, and then the result is substituted into equation 21 in the same maimer, which results in:

$$\partial_t C = -e(A \underline{x} \underline{x}^T A^T - \underline{x} \underline{x}^T) \quad (71)$$

Substituting equation 63 into equation 68, and again exploiting the Bellman equation, produces:

$$e = x^T(A^T M A - M)x \tag{72}$$

Substituting equation 63 into equation 70, produces equations (73) and (74) for HDP and HDPG, respectively, given by:

$$\partial_t M = e\underline{x}\underline{x}^T \tag{73}$$

$$\partial_t M = e(\underline{x}\underline{x}^T - A\underline{x}\underline{x}^T A^T). \tag{74}$$

For the linear stochastic case, equation 48 is substituted into equation 57, and recall that $U_0 = \text{Tr}(CQ)$ here, which yields:

$$e = (A\underline{x}+\underline{w})^T C(A\underline{x}+\underline{w}) + \underline{x}^T V\underline{x} - \underline{x}^T C\underline{x} - \text{Tr}(C^*Q) = \underline{x}^T A^T C A\underline{x} + \underline{x}^T A^T C\underline{w} + \underline{w}^T C A\underline{x} + \underline{w}^T C\underline{w} + \underline{x}^T V\underline{x} - \underline{x}^T C\underline{x} - \text{Tr}(C^*Q) \tag{75}$$

For HDP, equation 52 is substituted into equation 23, as in the deterministic case. The adaptation rule for C is still equation 70, but the meaning of equation 70 is changed by the use of a new definition for e, the definition given in equation 75. However, taking statistical expectations, with respect to the random vector $\underline{w}$, produces (by in effect exploiting equations 49 and 50):

$$\langle \partial_t C \rangle = \langle e\underline{x}\underline{x}^T \rangle = \underline{x}\underline{x}^T \langle e \rangle = \underline{x}\underline{x}^T (\underline{x}^T A^T C A\underline{x} + \underline{x}^T V\underline{x} - \underline{x}^T C\underline{x} + \langle \underline{x}^T A^T C\underline{w} \rangle + \langle \underline{w}^T C A\underline{x} \rangle + \underline{w}^T C\underline{w} - \text{Tr}(C^*Q) \rangle) = \underline{x}\underline{x}^T (\underline{x}^T A^T C A\underline{x} + \underline{x}^T V\underline{x} - \underline{x}^T C\underline{x} + \text{Tr}((C-C^*)Q)) \tag{76}$$

For HDPG in the stochastic case, equation 75 is differentiated with respect to C:

$$\nabla_C e = A\underline{x}\underline{x}^T A^T + \underline{w}\underline{x}^T A^T + A\underline{x}\underline{w}^T + \underline{w}\underline{w}^T - \underline{x}\underline{x}^T \tag{77}$$

Substituting into equation 24 and then 21, produces:

$$\partial_t C = -e(A\underline{x}\underline{x}^T A^T + \underline{w}\underline{x}^T A^T + A\underline{x}\underline{w}^T + \underline{w}\underline{w}^T - \underline{x}\underline{x}^T) \tag{78}$$

The expectation value of equation 78 is somewhat nasty to calculate, because it involves products up to the fourth power in the random vector $\underline{w}$. However, as is apparent from the definition of e in equation 75, four of the terns do not depend upon $\underline{w}$; pulling out their contribution, and then exploiting the fact that the expectation value of odd powers of $\underline{w}$ will always equal zero, equation 78 is expanded to:

$$\langle \partial_t C \rangle = -(\underline{x}^T(A^T CA+V-C)\underline{x} - \text{Tr}(C^*Q))(\langle A\underline{x}\underline{x}^T A^T + \underline{w}\underline{x}^T A^T + A\underline{x}\underline{w}^T + \underline{w}\underline{w}^T - \underline{x}\underline{x}^T \rangle) - \langle(\underline{x}^T A^T C\underline{w}+\underline{w}^T CA\underline{x})(\underline{w}\underline{x}^T A^T + A\underline{x}\underline{w}^T)\rangle - \langle(\underline{w}^T C\underline{w})(A\underline{x}\underline{x}^T A^T + \underline{w}\underline{w}^T - \underline{x}\underline{x}^T)\rangle \tag{79}$$

The middle line of this equation is somewhat tricky to expand. As an example, one of its terms, $\langle (\underline{x}^T A^T C\underline{w})\underline{w}\underline{x}^T A^T \rangle$, can be expressed in an Einstein-like convention, in which doubled subscripts are implicitly summed over, yielding:

$$\langle (x_\kappa A^T{}_{ij} C_{jk} w_k) w_\mu x_\lambda A^T{}_{\lambda\nu} \rangle = x_\kappa A^T{}_{ij} C_{jk} Q_{k\mu} x_\lambda A^T{}_{\lambda\nu} \tag{80}$$

which represents the matrix:

$$QCA\underline{x}\underline{x}^T A^T \tag{81}$$

Using this kind of approach, equation 79 is further expanded to produce:

$$\langle \partial_t C \rangle = -(\underline{x}^T(A^T CA+V-C)\underline{x} - \text{Tr}(C^*Q))(A\underline{x}\underline{x}^T A^T + Q - \underline{x}\underline{x}^T) - 2QCA\underline{x}\underline{x}^T A^T - 2A\underline{x}\underline{x}^T A^T CQ - \text{Tr}(CQ)(A\underline{x}\underline{x}^T A^T - \underline{x}\underline{x}^T) - \langle (\underline{w}^T C\underline{w})(\underline{w}\underline{w}^T) \rangle = -(\underline{x}^T(A^T CA+V-C)\underline{x}+\text{Tr}((C-C^*)Q))(A\underline{x}\underline{x}^T A^T + Q - \underline{x}\underline{x}^T) - 2QCA\underline{x}\underline{x}^T A^T - 2A\underline{x}\underline{x}^T A^T CQ + \text{Tr}(CQ)Q - \langle(\underline{w}^T C\underline{w})(\underline{w}\underline{w}^T)\rangle \tag{82}$$

Finally, for the analysis of error dynamics, equation 63 is again substituted into equations 76 and 82, and the Bellman equation is exploited. For HDP, this produces:

$$\langle \partial_t M \rangle = \underline{x}\underline{x}^T (\underline{x}^T(A^T MA-M)+\text{Tr}(MQ)) \tag{83}$$

For HDPG, this produces:

$$\langle \partial_t M \rangle = -(\underline{x}^T(A^T MA-M)\underline{x}+\text{Tr}(MQ))(A\underline{x}\underline{x}^T A^T + Q - \underline{x}\underline{x}^T) - 2Q(M+C^*)A\underline{x}\underline{x}^T A^T - 2A\underline{x}\underline{x}^T A^T (M+C^*)Q + \text{Tr}((M+C^*)Q)Q - \langle \underline{w}^T(M+C^*)\underline{w})(\underline{w}\underline{w}^T) \rangle \tag{84}$$

Again, without loss of generality, it is assumed that C, C* and M are all symmetric matrices. In order to derive the details of DHP and DHPG in the stochastic linear case, with r=0, equations 51 and 48 are substituted into equation 28, to deduce:

$$\underline{\lambda}^* = 2V\underline{x} + A^T \underline{\hat{e}}(t+1) \tag{85}$$

Substituting 53 and 48 into 85, produces:

$$\underline{\lambda}^* = 2V\underline{x} + A^T(2C)((A\underline{x}+\underline{w}) = 2V\underline{x} + 2A^T CA\underline{x} + 2A^T C\underline{w} \tag{86}$$

Substituting 53 and 86 into 27, produces:

$$\underline{e} = \underline{\lambda}^* - \underline{\hat{e}} = 2(V\underline{x} + A^T CA\underline{x} + A^T C\underline{w} - C\underline{x}) \tag{87}$$

To derive the details for DHP in this application, the derivatives that make up tile partial gradient, are calculated simply by differentiating equation 87 directly:

$$\frac{\partial}{\partial C_{ij}} e_k = 2(-\delta_{ik} x_j)! \tag{88}$$

From this, it holds that:

$$\left( e^T \frac{\partial}{\partial W_{ij}} e \right) = \sum_k e_k \frac{\partial}{\partial C_{ij}} e_k = -2 e_i x_j \tag{89}$$

Substituting equations 87 and 89 into equation 29, and converting equation 29 into a differential equation produces:

$$\partial_t C = -\tfrac{1}{2}(\underline{e}^T \nabla_C \underline{e}) = (V\underline{x} + A^T CA\underline{x} + A^T C\underline{w} - C\underline{x})\underline{x}^T = (V + A^T CA - C)\underline{x}\underline{x}^T + A^T C\underline{w}\underline{x}^T \tag{90}$$

The expected value over the random vector $\underline{w}$ is easily calculated:

$$\langle \partial_t C \rangle = (V + A^T CA - C)\underline{x}\underline{x}^T \tag{91}$$

Note that the deterministic linear case is simply the special case where $\underline{w}=\underline{0}$; in that case, $\partial_t C = \langle \partial_t C \rangle$ is still given by equation 91.

In order to derive the details for DHPG, the values of two of the terms which appear in equation 30 must be determined for the linear stochastic case:

$$\frac{\partial f_v}{\partial R_k} = A_{vk} \tag{92}$$

$$\frac{\partial \hat{\lambda}_v(t+1)}{\partial W_{ij}} = \frac{\partial}{\partial C_{ij}}(2C(A\underline{x}+\underline{w}))_v = 2\delta_{iv}(A\underline{x}+\underline{w})_j \tag{93}$$

Substituting into the more complicated summation in equation 30 produces:

$$\sum_{k,v} e_k \frac{\partial f_v}{\partial R_k} \cdot \frac{\partial \hat{\lambda}_v(t+1)}{\partial W_{ij}} = 2 \sum_{k,v} e_k A_{vk} \delta_{ij} (A\underline{x} + \underline{w})_j = 2(A\underline{e})_i (A\underline{x} + \underline{w})_j \quad (94)$$

Substituting back into equation 30, and translating these update equations into a differential equation as before, produces:

$$\partial_t C = \underline{e}\underline{x}^T - A\underline{e}(\underline{x}^T A^T + \underline{w}^T) \quad (95)$$
$$= (V + A^T CA - C)\underline{x}\underline{x}^T + A^T C\underline{w}\underline{x}^T -$$
$$A(V + A^T CA - C)\underline{x}\underline{x}^T A^T - AA^T C\underline{w}\underline{v}^T A^T -$$
$$A(V + A^T CA - C)\underline{x}\underline{w}^T - AA^T C\underline{w}\underline{w}^T$$

This implies:

$$<\partial_t C> = (V+A^T CA-C)\underline{xx}^T - A(V+A^T CA-C)\underline{xx}^T A^T - AA^T CQ \quad (96)$$

In order to analyze the error dynamics of pure DHP, equation 63 is substituted into equation 91, and the Bellman equation is used to derive:

$$<\partial_t M> = (A^T MA - M)\underline{xx}^T \quad (97)$$

For DHPG, the same kind of substitution into equation 96 yields:

$$<\partial_t M> = (A^T MA-M)\underline{xx}^T - A(A^T MA-M)\underline{xx}^T A^T - AA^T(C+M)Q \quad (98)$$

Note that the update rules shown in equations 91 and 96–98 do not in general add a symmetric matrix to C or M! With pure DHP or with DHPG, it cannot safely be assumed that C or M is a symmetric matrix: even if the initial estimate of C* is symmetric, the updated estimates after learning will usually not be symmetric. This is a valid consequence of the original nonlinear Critic adaptation rule that these special cases are being derived from. It is a manifestation of a general problem in the nonlinear case: the problem that DHP does not force $\lambda(\underline{R}(t))$ to be an integrable vector field, even though the gradient of any scalar field (like $J(\underline{R}(t))$) should be integrable. This problem was one of the main motivations behind the development of GDHP, which guarantees integrability even in the nonlinear case.

GDHP is more complicated than HDP or DHP in the general nonlinear case; however, in the linear stochastic case, with $\Omega_0 = 0$ (which allows us to ignore $U_0$), it reduces to something relatively simple. C might or might not be symmetric, for the sake of generality. For the case where $\Omega_0 = 0$ and $\Omega = 1$, equation 32 becomes exactly the same as equation 27, except that alternative sources are used for the vectors $\lambda^*$ and $\hat{\underline{e}}$. These vectors are defined by using $\nabla J$ in place of equation 53. Differentiating J as given in equation 52, produces:

$$\underline{\lambda}(\underline{x}) = (C + C^T)\underline{x} \quad (99)$$

Aside from this replacement, the farther calculations for GDHP are identical to those for DHP. When derivatives of E or e are calculated with respect to the weights $C_{ij}$, equation 99 simply replaces the previous (DHP) value of $(\partial E/\partial C_{ij})$ by the average $\frac{1}{2}(\partial E/\partial C_{ij})+(\partial E/\partial C_{ji})$, because each weight $C_{ij}$ appears both in C (as before) and in $C^T$. The net effect of this is that all of the adaptation equations for C, and dynamic equations for M, are exactly the same as for DHP and DHPG, except that every update is divided by two, and added it to its transpose. (Also, the division by two can be skipped, since it simply multiplies everything by a scalar factor that can be absorbed into the learning rate.)

Thus for GDHP in the stochastic case, equation 91 is replaced by:

$$<\partial_t C> = (V+A^T CA-C)\underline{xx}^T + \underline{xx}^T(V+A^T CA-C) \quad (100)$$

Its error dynamics are:

$$<\partial_t M> = (A^T MA-M)\underline{xx}^T + \underline{xx}^T(A^T MA-M) \quad (101)$$

For GDHPG, the error dynamics follow the symmetrization of equation 98:

$$<\partial_t M> = (A^T MA-M)\underline{xx}^T + \underline{xx}^T(A^T MA-M) - A(A^T MA-M)\underline{xx}^T A^T - AA^T(C^*+M)Q - A\underline{xx}^T(A^T MA-M)A^T - Q(C^*+M)AA^T \quad (102)$$

Strictly speaking, the asymmetry problem with DHP could have been patched up by using a neural network trick called "weight sharing" or "symmetry exploitation"—which works here specifically in the linear/quadratic case (forming a "DHPS" (DHP Symmetrized)). But DHPS is identical to GDHP in the linear/quadratic case. GDHP, however, is a general nonlinear adaptation method.

For DHP, where $\Omega$ may be a general positive symmetric matrix that is not necessarily the identity matrix, equation 89 is replaced with:

$$\left(\underline{e}^T \Omega \frac{\partial}{\partial W_{ij}} \underline{e}\right) = \sum_k (\Omega \underline{e})_k \frac{\partial}{\partial C_{ij}} e_k \quad (103)$$

By replacing the vector $\underline{e}$ on the left side of equation 90 with $\Omega\underline{e}$, equation 91 changes to:

$$<\partial_t C> = \Omega(V+A^T CA-C)\underline{xx}^T \quad (104)$$

The resulting error dynamics are of course:

$$<\partial_t M> = \Omega(A^T MA-M)\underline{xx}^T \quad (105)$$

For GDHP, the error dynamics are just the Symmetrized version of equation 105:

$$<\partial_t M> = \Omega(A^T MA-M)\underline{xx}^T + \underline{xx}^T(A^T MA-M)\Omega \quad (106)$$

This provides the framework for the construction of a universal adaptive controller for the MIMO linear deterministic case, guaranteed to stabilize (asymptotically) any unknown plant which is stabilizabie. In other words, this universal adaptive controller should be able to stabilize any plant for which a fixed controller could stabilize (asymptotically) the plant if the dynamics of the plant were known.

Such an achievement would require total system stability theorems in the spirit of Narendra and Annaswamy [1] and others. To do this requires the individual components—Action, Model and Critic—which are at least stable under the most benign conditions, the conditions where the other components are held fixed. Stable system identifiers and Action/controller systems already exist [1]. However, no one has ever provided Critic adaptation methods which meet the strict standards for stability discussed below.

In actuality, the present invention focuses on a universal adaptive controller for the linear deterministic case. It utilizes a controller that is based on a Critic adaptation method which converges to the right answer in the stochastic case, derived from an adaptation rule which makes sense in the general nonlinear stochastic situation. Adhering to this constraint should make it easier to carry through the extensions to the stochastic and nonlinear cases in the more distant future.

Narendra has asserted in several contexts that multiple-model methods are a key to intelligent control. There are several lines of argument which support that viewpoint [13]. Nevertheless, apparently the complexity and the power of multiple models should not be wasted on patching up more elementary problems, like the minimum phase and sign-information problems in adaptive control. When a plant is known to be linear, and when the state space is not divided up into different regions governed by different laws, then single-model methods should suffice.

There is good reason to believe that the present restrictions on adaptive control (minimum phase and knowledge of gain structure) can be overcome in the linear case, without resorting to multiple models. These problems—as well as slow transient response—are essentially the result of minimizing a simple measure of tracking error at time t+1. An approach which converges to the dynamic programming solution should converge to a stable and optimal solution which, like model-predictive-control should also show good response to transient disturbances, when sufficient input data is available.

On the other hand, there are three possible uses of multiple models which remain valid and important:

(1) The use of multiple models to explicitly represent qualitative uncertainty about the world, when that uncertainty cannot be adequately represented by probability distributions over continuous [8,ch.13] or discrete [75] variables. This kind of intellectual strategy is very important to sophisticated symbolic reasoning in humans.

(2) The use of multiple models to characterize very different regions of state space [13]. Piecewise linear models of nonlinear systems are one classic example of this approach. Piecewise linear models or approximations can emerge in many different ways. For example, Sugeno's classic fuzzy controller for a helicopter (presented at the World Automation Congress 1998) is often cited as the most impressive success story for fuzzy control. It is based on fuzzy IF-THEN rules which translate down, in practice, to a piecewise linear system. Classical gain-scheduling embodies the same underlying principles, with less user-friendly interface. Multiple nonlinear models have also proven very useful and powerful, and are now very popular in parts of the neural network community [76].

(3) The use of multiple models to characterize different tasks or action schemata or decision blocks [9,13,46] in a hierarchical decision-making system.

Of these three directions, the application to piecewise linear control seems most relevant to the present state of the art in control engineering. Improved control within each linear region would clearly be very important to these kinds of schemes. By better developing control possibilities within each linear region, it should be easier to build more powerful control systems by linking together these multiple regions.

The existing literature on stable control for piecewise linear systems (as in [77] or in Sugeno's stability proofs) emphasizes the development of a common quadratic Liapunov function, applicable to all of the regions. When this works, it certainly yields stable controllers. However, it is evident that there are many piecewise linear systems which can be stabilized in principle, in which the same Liapunov function cannot be used across all regions. (For example, one region may be nonminimum phase, relative to the metric or coordinate system implied by the Liapunov function used in another region.) But how piecewise quadratic Liapunov functions be constructed (or even found)? (Or of whatever class of Liapunov function is guaranteed to work in piecewise linear systems that can be stabilized.) The first step in developing such constructive methods is to fully develop constructive methods for individual linear/quadratic regions.

Critics must interface properly at the boundaries between regions. The new Werbos-Bellman equations given in [13] (extracted from a longer, denser paper [46]) provide a rigorous basis for managing that interface. The development of those equations was initially motivated by an effort to develop more truly brain-like intelligent control: however, the mathematics is not limited to that application.

At least six areas touch on the present invention:

(1) Even in the "simple" testbed problem of supervised learning (learning a static mapping from an input vector $\underline{X}$ to a vector of targets or dependent variables $\underline{Y}$), improved learning speed and generalization ability, exploiting concepts such as "syncretism" and "simultaneous recurrence" [32] are needed. Also see [34].

(2) In adapting Model networks, architectures (like SEDP [8,ch. 13] and like [75]) which can represent probability distributions, not just deterministic input-output relations, need to be explored. "Robustness over time" [8,ch. 10] needs to be improved as well. Error Critics [8, ch. 13:26:15] need to be explored as an alternative to BTT, in order to combine real-time learning with the robust kind of memory now available only with BTT. The improvements needed in supervised learning should be extended to Model training as well.

(3) Substantial improvements in basic ADP technology are also needed.

(4) At a higher level, designs for systems that perform "temporal chunking" in an adaptive way need to be developed, understood, tested and applied [9,13,46].

(5) Better systems are needed for a "brain-like" stochastic search, in order to help decision-making system escape from local minima, without the artificial limitations of methods like genetic algorithms that do not appear to be truly brain-like. For example, when trying to find actions or decisions $\underline{u}$ which maximize $U(\underline{\alpha},\underline{u})$ for a class of static function maximization problems, in which each specific problem is characterized by set of parameters $\underline{\alpha}$, how should the problem be attacked? (As an example, $\underline{\alpha}$ might represent the locations of cities in a traveling salesman problem.) An Option Network [46] can be trained so that it inputs $\underline{\alpha}$ and outputs possible $\underline{u}$, in a stochastic way, and tries to ensure that it outputs $\underline{u}$ according to a Gibbs distribution, $c^*\exp(-(k/T)U)$, where T is a temperature parameter also input to the network.

(6) Principles like spatial symmetry and objective symmetry [46] need to be implemented in new classes of neural networks, in order to make it possible for these networks to cope with the huge volumes of input which biological organisms can handle. In effect, neural adaptive designs need to learn to do what some A1 systems already do in a crude, brute-force manner; build up spatial "world models;" analyze objects one at a time, in a multiplexing kind of mode; perform spatial chunking; and input and output networks of relations rather than fixed-length vectors. Again, see [46].

The effort to really understand the level of intelligence found in basic mammalian brains, in a mathematically sophisticated way, is already a difficult enough challenge for now. It may be a prerequisite to a deeper, less fuzzy understanding of the higher levels.

To produce the most robust system, it would have been preferable that both of the following basic test were met:

(1) "Correct equilibrium", defined as follows: when C equals the correct C* matrix, defined by equation 56, then the adaptation methods results in $<\partial_t C> = 0$ in general in the linear stochastic case.

(2) Stable convergence to the equilibrium: The adaptation rule should possess a property called quadratic unconditional stability (to be discussed below) in the linear deterministic case, at least.

Unfortunately, none of these methods passed both of these tests. In particular, none of the Galerkinized methods discussed above possess the property of correct equilibrium. (The results of HDPC and HDPGC are not known precisely.) These results are consistent with earlier work [17], addressing the case of linear/lineal multivariate plants; in that work HDP demonstrated correct equilibrium for stochastic plants, but HDPG did not.

From the definition of M in equation 63, the property of "correct equilibrium" as defined above is equivalent to the property that $<\partial_t M> = 0$ when M=0. For HDP, the dynamics of M in the stochastic case are given in equation 83. When M=0 is substituted into equation 83, the right-hand side equals zero. Thus HDP possesses correct equilibrium. Likewise, the dynamics of M in the stochastic case for DHP are given in equation 97. Again, inserting M=0 sends the right-hand side to zero, which demonstrates correct equilibrium.

Finally, for GDHP, in the most general version analyzed above, the dynamics of M in the stationary case are given in equation 105. Once again, when M=0 $<\partial_t M> = 0$, as required. Thus GDHP also possesses correct equilibrium.

The equilibrium properties of these methods can again be analyzed for HDPG, DHPG, and GDHPG in the same way as for GDHP. The dynamics of M for HDPG in the stochastic case are given in equation 84. Substituting M=0 into that equation produces:

$$<\partial_t M> = -2QC^*A\underline{xx}^T - 2A\underline{xx}^T A^T C^* Q + \mathrm{Tr}(C^*Q)Q - <\underline{w}^T C^* \underline{w})\underline{w}\underline{w}^T> \quad (107)$$

If Q=0 (the deterministic case), this will still go to zero. This is like the results in [17], where it was shown that HDPG yields an incorrect equilibrium almost always. There was a small list of special cases, of plants where the equilibrium would be correct. At the top of that list was the case where Q=0. But beyond that, for normal plants C* is not expected to be a singular matrix. In a stochastic system, it is not expected that the state vectors $\underline{x}$ will always fit the condition $A\underline{x}=\underline{0}$ or (even less likely) always have the property that they exactly cancel out the last two terms in equation 107. It is clear that equation 107 will usually (in fact, almost always) be different from zero for a normal stochastic system. Certainly equation 107 is not always zero, as the property of "correct equilibrium" requires.

Likewise, the dynamics of M for DHPG in the stochastic case are given in equation 98. Substituting M=0 into that equation produces:

$$<\partial_t M> = -AA^T C^* Q \quad (108)$$

Once again, when Q is nonzero, this matrix is expected to be nonzero as well. Note that this equation indicates a constant, unremitting bias away from the correct equilibrium, regardless of the states $\underline{x}$ actually experienced.

For GDHPG (with ω=I), the error dynamics for the stochastic case are given in equation 102. Substituting M=0 yields:

$$<\partial_t M> = -AA^T C^* Q - QC^* AA^T \quad (109)$$

The conclusions here are exactly the same as for DHP. In summary, none of the Galerkinized methods discussed above possess "correct equilibrium" in the linear stochastic case.

Which methods then possess quadratic unconditional stability in the deterministic case? Preliminarily, the concept of stability as used herein is extremely stringent—far more stringent than needed in practice. However, (1) it is a relatively easy point of departure for an initial phase of research; and (2) methods that do meet this stringent test tend to be of practical interest as well.

There are many, many concepts of stability useful in different types of application [1,73, 78]. To define the type of quality discussed herein, the term "q-stability" is used. Systems that do not possess q-stability will be called "q-unstable."

Q-stability is defined as follows, for the kinds of adaptive systems discussed above. For any dynamic process {A,Q, V}, an adaptation process for C is q-stable if there exists a Liapunov function)—or, equivalently, $\Lambda(M,A,Q,V)$—such that:

(1) $\Lambda$ is a positive definite quadratic function of M;

(2) $<\partial_t \Lambda> \leq 0$ for all combinations of M and $\underline{x}$. (110)

In equation 110, the angle brackets refer to the expectation value with respect to the random vector $\underline{w}$.

Intuitively, unconditional stability requires stability in the face of sequence of inputs $\underline{x}$—not just the sequences that the plant would normally generate if it obeys equations 45 or 46 (or even 47 or 48). In effect, the system is to learn and thrive even when the experience it grows up on is "a movie made by a devil" —a sequence of collages (pairs of $\underline{x}$(t) and $\underline{x}$(t+1)), each of which flows naturally internally, but which fade in and out in an illogical manner, specifically chosen so as to destabilize the learning process. Q-stability is the special case of unconditional stability, in which the Liapunov function is quadratic. (An example is given later of a linear dynamic system which is unconditionally stable but not q-stable.)

The notion of q-stability given above is almost identical to the notion of quadratic stability as discussed in the seminal book by Boyd et al [79]. On page 73 of that book, they note that it is possible for a Linear Differential Inclusion (like the dynamic rules for M) to be stable, without being quadratically stable. On page 74, they cite a number of examples; they state that unconditional stability in a more general sense occurs ". . . if and only if there is a convex Liapunov function that proves it . . . IN general, computing such Liapunov functions is computationally intensive, if not intractable."

Ideally, adaptive methods should be found that are q-stable for all dynamic processes such that the eigenvalues of A lie within the unit circle. The Galerkinized methods do possess that property, for deterministic linear plants. But the other methods—the methods which possess "correct equilibrium" —are q-unstable, even in the deterministic case, except for a "set of measure zero" in the universe of dynamical systems. For practical purposes, they are q-stable only when A is a perfectly symmetric matrix.

Q-stability applies to a well-known, fundamental learning rule used in supervised learning and signal processing. That rule is the real-time learning rule called Least Mean Squares (LMS) developed by Widrow and Hoff [80], in a linear multivariate case, which is known to have robust stability.

Assume that a sequence of pairs, $\underline{x}(t)$ and $y(t)$, of a vector x and a scalar y are observed that are governed by the stochastic process:

$$y(t)=(\underline{b}^*)^T\underline{x}(t)+w(t), \quad (111)$$

where w is a normally distributed random variable. Also assume a learning process based on:

$$\Delta b_i = -\alpha \frac{\partial E}{\partial b_i}, \quad (112)$$

where:

$$E=\tfrac{1}{2}e^2=\tfrac{1}{2}(y-\underline{b}^T\underline{x})^2 \quad (113)$$

Substituting 113 into 112, produces:

$$\frac{\partial E}{\partial b_i} = -(y-\underline{b}^T\underline{x})x_i \quad (114)$$

Assuming infinitely small learning rates, equation 114 is substituted into equation 112, and represents the result as a differential equation:

$$\partial_t\underline{b}=(y-\underline{b}^T\underline{x})\underline{x} \quad (115)$$

Substituting equation 111 into equation 115 produces:

$$\partial_t\underline{b}=(\underline{b}^{*T}\underline{x}+w-\underline{b}^T\underline{x})\underline{x} \quad (116)$$

In parallel with equation 63, a new vector $\underline{\delta}$: may be implicitly defined that represents the error of the adaptive system in estimating the parameter vector $\underline{b}$:

$$\underline{b}=\underline{b}^*+\underline{\delta} \quad (117)$$

Substituting this definition into equation 116, and taking expectation values with respect to the random variable w, produces:

$$\langle\partial_t\underline{\delta}\rangle=-(\underline{\delta}^T\underline{x})\underline{x} \quad (118)$$

The following Liapunov function is then selected for this system:

$$\Lambda(\underline{\delta})=\tfrac{1}{2}|\underline{\delta}|^2=\tfrac{1}{2}\underline{\delta}^T\underline{\delta} \quad (119)$$

This meets the first condition for a Liapunov function, that it is positive $\underline{\delta}$ definite in 8 (which plays the same role as M above). To verify the second condition, equations 118 and 119 are used to compute:

$$\langle\partial_t\Lambda\rangle=\langle\underline{\delta}^T\partial_t\underline{\delta}\rangle=\underline{\delta}^T\langle\partial_t\underline{\delta}\rangle=-(\underline{\delta}^T\underline{x})(\underline{\delta}^T\underline{x})\leq 0 \quad (120)$$

For all four systems, stability occurs using the same Liapunov function:

$$\Lambda(M)=\tfrac{1}{2}\mathrm{Tr}(M^2) \quad (121)$$

Because M is a symmetric real matrix, its square is guaranteed to be a symmetric non-negative matrix. All of its eigenvalues are guaranteed to be nonnegative. $\Lambda$ is positive definite, because the trace—the sum of the eigenvalues— can only be zero if all of the eigenvalues are zero, which would imply M=0. Therefore, equation 121 meets the first condition for a Liapunov function. To complete the proof for each of the four Galerkinized methods to be discussed here, only the second condition need be verified for each of them.

Because M is a symmetric matrix, differentiating equation 121 produces:

$$\partial_t\Lambda(M^2)=\mathrm{Tr}(M(\partial_t M)) \quad (122)$$

The dynamics of M, the error matrix for the weights, in HDPGC are given in equation 66. Substituting that equation into equation 122 (and choosing $\alpha=1$ for simplicity), produces:

$$\partial_t\Lambda=-\mathrm{Tr}(Me(\underline{xx}^TA^T+A\underline{xx}^T))=-e(\mathrm{Tr}(M\underline{xx}^TA^T)+\mathrm{Tr}(MA\underline{xx}^T)) \quad (123)$$

Exploiting the well known theorem (easily proved) that Tr(AB)=Tr(BA), even for nonsquare matrices A and B, (123) reduces to:

$$\partial_t\Lambda=-e(\underline{x}^TA^TM\underline{x}+\underline{x}^TMA\underline{x}) \quad (124)$$

Substituting in from equation 64, this is simply:

$$\partial_t\Lambda=-(\underline{x}^TA^TM\underline{x}+\underline{x}^TMA\underline{x})^2\leq 0 \quad (125)$$

This completes the proof of u-stability.

The error dynamics for HDPG in the stochastic case are given in equation 84. For the deterministic case, where Q=0 and $\underline{w}=\underline{0}$, equation 84 reduces to:

$$\partial_t M=d(\underline{xx}^T-A\underline{xx}^TA^T), \quad (126)$$

where the following new scalar is defined in order to simplify the algebra:

$$d=\underline{x}^T(A^TMA-M)\underline{x} \quad (127)$$

Substituting equation 126 into equation 122 produces:

$$\partial_t\Lambda=\mathrm{Tr}(M(\partial_t M))=d\,\mathrm{Tr}(M\underline{xx}^T-MA\underline{xx}^TA^T)=d\underline{x}^TM\underline{x}-d\underline{x}^TA^TMA\underline{x}=d\underline{x}^T(M-A^TMA)\underline{x}=-d^2\leq 0 \quad (128)$$

Again, QED.

The error dynamics for DHPG in the stochastic case are given in equation 98. For the deterministic case, where Q=0, equation 98 reduces to:

$$\partial_t M=(A^TMA-M)\underline{xx}^T-A(A^TMA-M)\underline{xx}^TA^T \quad (129)$$

If, for convenience, the symmetric matrix is defined as:

$$D=A^TMA-M, \quad (130)$$

equation 129 is simplified to:

$$\partial_t M=D\underline{xx}^T-AD\underline{xx}^TA^T \quad (131)$$

Following equation 122, the following relationship derived:

$$\partial_t\Lambda=\mathrm{Tr}(M(\partial_t M))=\mathrm{Tr}(MD\underline{xx}^T)-\mathrm{Tr}(MAD\underline{xx}^TA^T)=\underline{x}^TMD\underline{x}-\underline{x}^TA^TMAD\underline{x}=\underline{x}^T(M-A^TMA)D\underline{x}=-\underline{x}^TD^2\underline{x}=-|D\underline{x}|^2\leq 0 \quad (132)$$

QED.

The error dynamics for GDHPG in the stochastic case, for $\omega_0=0$ and $\omega=1$, are given in equation 102. Equation 102 is really just the symmetrized version of equation 98. In the deterministic case, where Q=0, it reduces to the symmetrized version of equation 129, which can be expressed as follows:

$$M=D\underline{xx}^T-AD\underline{xx}^TA^T+\underline{xx}^TD-A\underline{xx}^TDA^T, \quad (133)$$

using the definition of "D" given in equation 130. Following equation 122, the following relationship is derived:

$$\partial_t\Lambda=\mathrm{Tr}(M(\partial_t M))=\mathrm{Tr}(MD\underline{xx}^T)-\mathrm{Tr}(MAD\underline{xx}^TA^T)+\mathrm{Tr}(M\underline{xx}^TD)-\mathrm{Tr}(MA\underline{xx}^TDA^T)=\underline{x}^TMD\underline{x}-\underline{x}^TA^TMAD\underline{x}+\underline{x}^TDM\underline{x}-\underline{x}^TDA^TMA\underline{x}=$$

$$\underline{x}^T(M-A^TMA)D\underline{x}+\underline{x}^TD(M-A^TMA)\underline{x}=-\underline{x}^TD^2\underline{x}-\underline{x}^TD^2\underline{x}=-2|D\underline{x}|^2 \leq 0 \tag{134}$$

Once a Liapunov function, has been found, q-stability can be proven. For a given plant, instability can also be proven in a straightforward way, by giving examples of training schedules $\{\underline{x}(t)\}$ which cause an explosion in the estimation errors M. However, to prove q-instability across a broad range of possible plants is more difficult. It requires a more abstract mathematical approach.

First of all, our focus here will be on q-instability for four methods—HDPC, HDP, DHP and GDHP—in the deterministic linear case. This reduces down to an analysis of four different dynamical systems for the matrix M—equation 65 (for HDPC), equation 73 (for HDP), equation 105 (with angle brackets removed, for generalized DHP) and equation 106 likewise, for generalized GDHP). It can easily be seen that these dynamical systems are linear in the matrix M. Thus the easiest way to analyze these systems is by applying linear systems theory to them. In this case, it requires a certain amount of care to do this.

The original dynamical system (equations 44 or 45) involved a state vector, $\underline{x}$, with n components. In formal terms, $\underline{x} \in R^n$. But the linear deterministic systems of equations 65, 7 73, 105 and 106 concern a matrix M. In order to apply ordinary linear systems theory, M, in equation 105, is treated as a kind of vector of dimensionality $N=n^2$. In other words, $\underline{M} \in R^N$ is the representation of the matrix M as a vector in $n^2$-dimensional space. For equations 65, 73 and 106, M is taken from the space of symmetric matrices, which only have $N'=n(n+1)/2$ independent degrees of freedom. Then in those cases, the vector representation of M will be $\underline{M} \in R^{N'}$. Throughout, the quantities n, N' and N are defined in this way. It is also noted that in this formulation, the usual matrix Ricatti equations are ordinary linear equations for the vector $\underline{C}$ in $R^{N'}$. This permits exact finite-time solutions using ordinary methods for the solution of linear equations over $R^{N'}$.

For q-stability in the linear case, $\Lambda(C,Q,V,A)$ is required to be quadratic in C. The Liapunov function can be expressed as a quadratic about the desired stable equilibrium, C*; in other words, it can be expressed as a quadratic in M, if such a Liapunov function exists. Because Q=0 in the linear deterministic case, and because the dynamics of M in equations 65, 73. 105 and 106 do not depend upon V, this means that $\Lambda(M,A)$ is required to be quadratic in M. Thus a Liapunov function in the following form is used:

$$\Lambda(M, A) = \frac{1}{2} \sum_{ijkl} T^{ijkl}(A) M_{ij} M_{kl} \tag{135}$$

(Even though $T^{ijkl}$ should always be understood to be a function of A, sometimes this dependence is only implicit in the description below.)

Without loss of generality, T can be required to be symmetric in M. In other words:

$$T^{ijkl}=T^{kilj}, \text{ for all } i,j,k,l \tag{136}$$

Furthermore, if we think of $\underline{M}$ as a vector in $R^N$ or $R^{N'}$, we may also define:

$$\underline{L} = \nabla \Lambda = \sum_{i,j} T^{ijkl}(A) M_{ij}, \tag{137}$$

where $\underline{L}$ also corresponds to a matrix L. In the case where $\underline{M}$ is a vector in $R^{N'}$, without a loss of generality, it may be required that:

$$T^{ijkl}=T^{jikl}=T^{ijlk}=T^{jilk}, \tag{138}$$

and that L is therefore a symmetric matrix.

The first condition for q-stability requires that T(A) must be positive definite, when considered as an N-by-N or N'-by-N' matrix. The second condition requires that:

$$\partial_t \Lambda = \sum_{ijkl} T^{ijkl} M_{ij}(\partial_t M_{kl}) = Tr(L^T \partial_t M) \leq 0 \tag{139}$$

for all M and $\underline{x}$, for the particular matrix A under study. Note that equation 139 specifically follows for the choice of T as a symmetric matrix. It is not possible to satisfy the requirement for q-stability with a matrix T which is not symmetric, unless it is also possible to satisfy it for the symmetrized version of that matrix. Thus to prove q-instability in general, it is enough to prove that no such symmetric T exists.

Could the requirement in equation 138 be satisfied for some symmetric T, in HDPC? To evaluate this, substitute equation 65 into equation 138 (with $\alpha=\frac{1}{2}$), which yields the requirement:

$$Tr(L(\frac{1}{2}e\underline{x}\underline{x}^T)) \leq 0 \text{ for all } \underline{x}, M \tag{140}$$

Note that L is a symmetric matrix, in this case, because M is a symmetric matrix, and because equation 138 is imposed. Substituting equation 64 into 140, the requirement of equation 138 reduces to:

$$(\underline{x}^T L \underline{x})(\underline{x}^T(A^T M+MA)\underline{x}) \leq 0 \text{ for all } \underline{x} \text{ and } M \tag{141}$$

The analysis of equation 141 leads to the following lemma:

Lemma on L and B: If:

$$(\underline{x}^T L \underline{x})(\underline{x}^T B \underline{x}) \leq 0 \text{ for all } \underline{x} \tag{142}$$

for some symmetric matrices L and B, then either: (1) B is positive semidefinite and L is negative semidefinite: (2) L is positive semidefinite and B is positive semidefinite; or (3) L=−kB for some nonnegative scalar k.

Proof: Since L is real and symmetric, without a loss of generality, it may be assumed that a similarity transformation is performed on L, B and $\underline{x}$ based on the eigenvectors of L, such that L becomes a diagonal matrix. After that, if the elements on the diagonal of L are all nonnegative or all nonpositive, then $\underline{x}^T L \underline{x}$ is always negative or always positive. In those cases, equation 142 requires that $\underline{x}^T B \underline{x}$ is always nonpositive or always nonnegative, respectively, for all $\underline{x}$, which then gives us cases (2) and (1) respectively. The only alternative possibility is that L contains a mix of diagonal elements (eigenvalues), some positive and some negative.

Let $\underline{e}_i$ and $\underline{e}_j$ be the basis vectors (after the similarity transformation) corresponding to one of the positive eigenvalues $\lambda_i$ of L, and one of the negative eigenvalues, $\lambda_j$, respectively. When $\underline{x}=\underline{e}_i$, equation 142 states that $B_{ji} \leq 0$. Likewise, when $\underline{x}=\underline{e}_j$ then $B_{ji} \geq 0$. For $\underline{x}=\underline{e}_i+y\underline{e}_j$, it can be shown that:

$$\underline{x}^T L \underline{x} = \lambda_i + y^2 \lambda_j \tag{143a}$$

$$\underline{x}^T B \underline{x} = B_{ii} + 2yB_{ij} + y^2 B_{jj} \tag{143b}$$

The graph for equation 143a as a function of y is a parabola, crossing the x-axis at two points, where y=±sqrt$(-\lambda_i/\lambda_j)$. Equation 142 shows that the quadratic expression in 143b must cross the x-axis at the same two points. From elementary algebra, this means that $B_{ij}=0$ and $B_{ii}/B_{jj}=\lambda_i/\lambda_j$. Applying this argument to all possible positive/negative $\lambda_i/\lambda_j$ pairs (including $\lambda_k/\lambda_j$ involving different k but the same j), it may be deduced that the entire diagonal of B must equal −k multiplied by L, for some nonnegative scalar k. It may also be deduced that all the $B_{ij}$ crossterms for $\lambda_i$ positive and $\lambda_j$ negative must be zero.

Next, consider $\underline{x}$ of the form $\underline{e}_i + y\underline{e}_j + z\underline{e}_k$, where $\lambda_k, \lambda_i > 0$ and $\lambda_j < 0$. This produces two expressions quadratic in y, analogous to 143a and 143b, which must match crossing points as before, for every possible value of z. The only way this can happen is if $B_{ik}=0$. In a similar way, it is known that the offdiagonal terms in the negative block of B are also zero. In summary, all of the offdiagonal terms of B must be zero—the ones which cross between the negative and positive blocks, and the ones which go between different elements within each block. Thus B must be a diagonal matrix. Since the diagonal of B must equal −kL, this completes the proof of the lemma.

Applying the above lemma to equation 141, it is required that:

$$L(A,M) = -k(A,M)(A^T M + MA), \tag{144}$$

for all matrices M such that $A^T M + MA$ is not positive semidefinite or negative semidefinite.

Assume $M \in P(A)$ when $A^T M + MA$ is positive semidefinite. It is straightforward to prove that P(A) is a convex cone[81] by simply applying the definition of a convex cone: (1) if $M \in P(A)$, then $kM \in P(A)$ (for $k \geq 0$) because k multiplied by a positive semidefinite matrix is still a positive semidefinite matrix: (2) if $M_1 \in P(A)$ and $M_2 \in P(A)$, then $(l-k)M_1+kM_2$ (for 1>k>0) is in P(A), because the sum of two positive definite matrices is also positive definite. Also, $M \in N(A)$ iff $-M \in P(A)$; this is also a closed convex cone. If K(A) is defined as the rest of $R^a$, after P(A) and N(A) are removed; clearly it, too, is a connected cone.

Equation 137 shows that L would be required to be linear in M. Consider any two matrices, $M_1$ and $M_2$, both in K(A), such that $M_1+M_2$ is also in K(A), and that $A^T M_1+M_1 A$ is not just equal to a scalar multiple of $A^T M_2+M_2 A$. In this case, the linearity of L as a function of M requires that $k(A,M_1)=k(A,M_2)=k(A,M_1+M_2)$. Likewise, the linearity of L requires that $k(A,cM)=k(A,M)$ for any scalar c. Since all matrices M in K(A) are connected to each other by some combination of adding and scaling, k(A,M) is actually k(A)—a constant with respect to M, all across K(A). Furthermore, all matrices in P(A) or N(A) can be reached as linear combinations of matrices in K(A). (In other words, it is easy to write any positive definite symmetric matrix as a linear combination of two symmetric matrices which are not definite. A convex combination is not required, only a linear combination.) Therefore:

$$L(A,M) = -k(A)(A^T M + MA) \text{ for all } M, \tag{145}$$

for any linear dynamic process (A) which is q-stable.

Combining equations 137 and 145, produces the requirement that:

$$\sum_{kl} T^{ijkl}(A) M_{kl} = -k(A) \sum_k (A_{ik}^T M_{kj} + M_{ik} A_{kj}) \text{ for all } M \tag{146}$$

Differentiating with respect to $M_{kl}$ (recalling that $M_{kl}=M_{lk}$ is one element of $\underline{M} \in R^N$) and exploiting the fact that T can be multiplied by a positive scalar without changing its validity as a Liapunov function. produces the requirement that:

$$T^{ijkl}(A) = -(\delta_{jl} A_{ik}^T + \delta_{jk} A_{il}^T + \delta_{il} A_{kj} + \delta_{ik} A_{lj}) \tag{147}$$

Again, equation 147 has been deduced as a necessary requirement for a symmetric, quadratic Liapunov function T for a deterministic linear system. But equation 136 is another necessary requirement. The combination of these two requirements, which apply to all combinations of i,j,k and l, implies a requirement that:

$$\delta_{jl} A_{ik}^T + \delta_{jk} A_{il}^T + \delta_{il} A_{kj} + \delta_{ik} A_{lj} = \delta_{lj} A_{ki}^T + \delta_{li} A_{kj}^T + \delta_{kj} A_{il} + \delta_{ki} A_{jl} \tag{148}$$

For example, in the case where i=j=k, this requires that:

$$\delta_{il} A_{ii}^T + A_{il}^T + \delta_{il} A_{il} + A_{li} = \delta_{li} A_{ii}^T + \delta_{li} A_{ii}^T + A_{il} + A_{il} \tag{149}$$

which reduces to:

$$2A_{li} = 2A_{il} \text{ for all i and l} \tag{150}$$

which is satisfied if and only if the matrix A is symmetric.

The conclusion of this analysis is that HDPC can be q-stable only in the case where A happens to be symmetric. Matrices of this sort are a set of measure zero in the space of all matrices A! More importantly, there are few real-world applications where the dynamic matrix A is exactly symmetric. This is far more restrictive than the restrictions described for the old IAC designs. When A does happen to be symmetric, it can be shown that equation 147 gives a valid Liapunov function. HDPC clearly fails to meet other goals described herein, so further discussion of it is omitted.

Notice that L, the gradient of Λ, is defined for any differentiable Liapunov function over M. Thus equations 140, 141 and 144 are valid requirements for unconditional stability in general, not just q-stability. Q-stability was used in this argument only to derive the narrower requirement given in equation 145. Prior to the development of this proof, a variety of two-by-two and diagonalized (complex) examples were analyzed, where the results were all consistent with the general result given here. Intuitively, the argument here is saying that the required gradient field L is not an integrable field, because it does not meet the usual condition for the integrability of a vector field. In other words, the required L cannot actually be the gradient of a scalar field Λ, as required, because its derivatives do not possess the required symmetry.

Equation 144 seems very close to equation 145, on the surface; however, this may be misleading. There appear to be some dynamical systems A, which are not exactly symmetric, where HDPC is unconditionally stable, based on a Liapunov function which is not quadratic. However, this does not imply unconditional stability across all controllable systems A.

The proof of q-instability of HDP proper follows exactly the same structure as the earlier proof. After all, the dynamics of M in equation 73 are virtually identical to the dynamics in equation 65, except the definition of "e" changes (from equation 72 instead of 64).

More precisely, the proof of q-instability for HDP is exactly the same except that "$A^T M + MA$" is replaced everywhere by "$A^T MA-M$". In place of equation 146, it is required that:

$$\sum_{kl} T^{ijkl} M_{kl} = -k(A)\left(-M_{ij} + \sum_{kl} A_{ik}^T M_{kl} A_{lj}\right) \quad (151)$$

for all M. Once again, differentiating with respect to $M_{kl}=M_{lk}$ and exploiting the invariance of T with respect to positive scalar multiplication, derives the requirement:

$$T^{ijkl} = \delta_{ik}\delta_{jl} + \delta_{il}\delta_{jk} - (A_{ik}{}^T A_{lj} + A_{il}{}^T A_{kj}) \quad (152)$$

Once again, equation 134 then requires:

$$\delta_{ik}\delta_{jl} + \delta_{il}\delta_{jk} - A_{ik}{}^T A_{lj} - A_{il}{}^T A_{kj} = \delta_{ki}\delta_{lj} + \delta_{kj}\delta_{li} - A_{ki}{}^T A_{jl} - A_{kj}{}^T A_{il} \quad (153)$$

for all combinations of i, j, k, and l. For example, choosing k=l and summing the results over k, equation 15e reduces to the necessary requirement that:

$$-A^T A - A^T A = -AA^T - AA^T \quad (154)$$

Thus A commutes with $A^T$, and both of them commute with $A+A^T$. Thus, A is a "normal matrix"[81,82] its eigenvectors (like those of $A+A^T$) will usually be real and orthogonal. (Exceptions may be possible if $A+A_T$ has degenerate eigenvalues.) When a real matrix has eigenvectors which are all real and orthogonal, it must be symmetric. Once again, the matrix A must either be symmetric, or it must fall into some other set of exceptions which is also of measure zero.

The requirement given in equation 154 is only a necessary requirement for q-stability, not a sufficient requirement. The necessary requirement is already strong enough to show that HDP does not provide q-stability for a broad enough range of dynamical systems.

Because GDHP preserves the symmetry of M, while DHP does not, it is easier to begin by considering GDHP as a next system to be examined. For GDHP, q-stability again requires a quadratic Liapunov function that satisfies equations 136 through 139. In the deterministic case, the error dynamics for GDHP as given in equation 106 may be written as:

$$\partial_t M = \Omega(A^T MA - M)\underline{xx}^T + \underline{xx}^T(A^T MA - M)\Omega = D\underline{xx}^T + \underline{xx}^T D^T. \quad (155)$$

where define:

$$D = \Omega(A^T MA - M) \quad (156)$$

Substituting equation 155 into equation 139, and recalling that L must be symmetric in this case, gives the requirement that:

$$\operatorname{Tr}(LD\underline{xx}^T + L\underline{xx}^T D^T) = \underline{x}^T LD\underline{x} + \underline{x}^T D^T L\underline{x} = 2(L\underline{x})^T (D\underline{x}) \le 0 \quad (157)$$

for all vectors $\underline{x}$.

It is safe at this point to assume that D and L are both nonsingular, for the following reasons. First, the case $A=\pm I$ is less important since the goal is to show that GDHP is almost always q-unstable, when A is not symmetric. Second, for a sensible adaptation algorithm, $\Omega$ would be required to be nonsingular. Third, $\Lambda$ is required to be positive definite, which implies that L must be nonsingular when M is. In summary, for all nonsingular M, L and D must be nonsingular (for q-stability), produces the matrix:

$$D = S(A,M)L \quad (158)$$

Inserting this definition into equation 157 shows that S(A,M) must be a negative semidefinite matrix, for all M and A. (By continuity, this is expected for all matrices M.)

Combining equation 158 with equations 137 and 156, the requirement for q-stability becomes:

$$L_{ij} = \sum_{kl} T^{ijkl} M_{kl} = (S^{-1}\Omega(A^T MA - M))_{ij} \quad (159)$$

The analysis of equation 159 leads to the following lemma of tensor linearity. Suppose that:

$$\sum_{kl} P^{ijkl} M_{kl} = \sum_{klv} B^{ivkl} M_{kl} C_{vj}(M) \quad (160)$$

for all symmetric matrices M, for some tensors P and B which are not functions of M. Assume also that B has the property that $B\underline{M}$ is nonsingular almost everywhere, in the space of $\underline{M} \in R^N$. Then $C_{vj}(M) = C_{vj}(0)$ is not actually a function of M.

Proof: The validity of equation 160 implies the validity of equation 160 differentiated with respect to $M_{\alpha\beta}$, for any $\alpha$ and $\beta$; this yields:

$$A^{ij\alpha\beta} = \sum_v B^{iv\alpha\beta} C_{vj}(M) + \sum_{klv} B^{ivkl} M_{kl} \frac{\partial C_{vj}}{\partial M_{\alpha\beta}} \quad (161)$$

Multiplying by $M_{\alpha\beta}$ and summing over $\alpha$ and $\beta$, produces the requirement that:

$$\sum_{\alpha\beta} A^{ij\alpha\beta} M_{\alpha\beta} = \sum_{\alpha\beta v} B^{iv\alpha\beta} M_{\alpha\beta} C_{vj}(M) + \sum_{klv\alpha\beta} B^{ivkl} M_{\alpha\beta} M_{kl} \frac{\partial C_{vj}}{\partial M_{\alpha\beta}} \quad (162)$$

But the first two terms in equation 162 ire essentially identical to equation 160. Subtracting out equation 160 from equation 162, produces:

$$\sum_{klv\alpha\beta} B^{ivkl} M_{\alpha\beta} M_{kl} \frac{\partial C_{vj}}{\partial M_{\alpha\beta}} = 0 \quad (163)$$

Defining two new matrices produces:

$$D_{iv} = \sum_{kl} B^{ivkl} M_{kl} \quad (164a)$$

$$R_{vj} = \sum_{\alpha\beta} M^{\alpha\beta} \frac{\partial C_{vj}}{\partial M_{\alpha\beta}} \quad (164b)$$

Using these definitions, equation 103 may be expressed as:

$$D(M)R(M) = 0 \quad (165)$$

Because $B\underline{M}$ is assumed to be nonsingular almost everywhere in M, D(M) will be nonsingular almost everywhere. Thus almost everywhere in M, equation 165 requires:

$$R(M) = 0 \quad (166)$$

By the requirement for continuity with respect to M, R(M)=0 is required for all M. Equatione 166, plus the definition in equation 164b, are an instance, in $R^N$, of the equations:

$$\underline{x}^T \nabla f(\underline{x}) = 0 \text{ for all } \underline{x} \quad (167)$$

Integrating equation 167 along any line radiating out from the origin to a point $\underline{x}$ implies $f(\underline{x}) = f(\underline{0})$. In other words, f is actually a constant with respect to $\underline{x}$. Applying this to equations 164b and 166, $C_{vj}(M)=C_{vj}(0)$ is not actually a function of M.

Applying equation 160 and the lemma above to the analysis of equation 159, it may be deduced that $S^{-1}$ cannot actually be a function of M. However, is $B\underline{M}$ nonsingular almost everywhere in this case? In this case, $B\underline{M}$ is simply the right-hand side of equation 159, which, for q-stability, must equal L. But in the discussion leading tip to equation 158, it was explained why L is required to be nonsingular almost everywhere in M.

Accepting that $S^{-1}$ cannot be a function of M, a new matrix is defined as:

$$R(A)=S^{-1}(A)\Omega \qquad (168)$$

Inserting this definition into equation 159, produces:

$$L=R(A)(A^T MA-M), \qquad (169)$$

but L is required to be symmetric for all symmetric matrices M. Assuming that the N'-by-N' #matrix which multiplies $\underline{M}$ to generate $A^T MA-M$ is not singular, this implies that $A^T MA-M$ ranges over all possible symmetric matrices as well (again, excluding consideration of the case A=±1) If R(A)D is symmetric for all symmetric matrices D, then R(A) must be of the form kI, where k is a scalar. Substituting this back into equation 169, and recalling that T is only defined up to a positive scalar anyway (and using some knowledge about systems analysis to set the sign), produces the requirement that:

$$\sum_{kl} T^{ijkl} M_{kl} = M_{ij} - \sum_{kl} A_{ik}^T M_{kl} A_{lj} \qquad (170)$$

Differentiating with respect to $M_{kl}=M_{lk}$, produces the requirement:

$$T^{ijkl}=\delta_{ik}\delta_{jl}-A_{ik}^T A_{lj}+\delta_{il}\delta_{jk}-A_{il}^T A_{kj} \qquad (171)$$

Once again, equation 136 is used to deduce the requirement:

$$\delta_{ik}\delta_{jl}-A_{ik}^T A_{lj}+\delta_{il}\delta_{jk}-A_{il}^T A_{kj}=\delta_{ki}\delta_{lj}-A_{ki}^T A_{jl}+\delta_{kj}\delta_{li}-A_{kj}^T A_{il} \qquad (172)$$

for all i, j, k and l. This reduces to:

$$A_{ik}^T A_{lj}+A_{il}^T A_{kj}=A_{ki}^T A_{jl}+A_{kj}^T A_{il} \qquad (173)$$

Consider the case k=l and sum over l to deduce the necessary requirement:

$$A^T A+A^T A=AA^T+AA^T \qquad (174)$$

This is essentially the same as equation 154. Q-stability requires that A must either be symmetric, or must belong to some other set of exceptional cases of measure zero. Thus GDHP, like HDPC and HDP proper, is q-unstable for almost all matrices A, under the conditions described herein.

For q-stability of DHP, equations 135–137 and 139 would still need to hold; however M and L are no longer required to be symmetric, and equation 138 does not apply. Substituting the adaptation rule for generalized DHP in the deterministic case (equation 105 with angle brackets removed) into equation 139, produces the requirement for q-stability that:

$$Tr(L^T\partial_t M)=Tr(L^T D\underline{xx}^T)=\underline{x}^T L^T D\underline{x}=(L\underline{x})^T(D\underline{x})\leq 0 \qquad (175)$$

where D is again defined as in equation 156. Note the similarity of the final inequality in equation 175 to the final inequality in equation 157. Starting from that inequality, the exact same logic is used as before, in order to deduce that equations 158 and 159 are also required here. Likewise, the lemma of tensor linearity can be applied. Thus, q-stability for DHP will require that equation 159 hold, for $S^{-1}$ not a function of M. This again allows the definition in equation 168, which leads to equation 169.

For DHP, however, it is not possible to deduce that R(A) must equal kI. The requirement for q-stability given in equation 169 may be written out more exhaustively and combined with equation 137, to yield the requirement:

$$L_{ij}=\sum_{ijv} R_{kv} A_{vi}^T M_{ij} A_{jl} - \sum_{v} R_{kv} M_{vl} = \sum_{ij} T^{ijkl} M_{ij} \text{ for all } M \qquad (176)$$

Differentiating with respect to $M_{ij}$, produces the requirement:

$$\sum_{v} R_{kv} A_{vi}^T A_{jl} - R_{ki}\delta_{lj} = T^{ijkl} \qquad (177)$$

Applying equation 136, produces the requirement, for all i, j, k and l, that:

$$(RA^T)_{ki}A_{jl}-R_{ki}\delta_{lj}=(RA^T)_{ik}A_{lj}-R_{ik}\delta_{jl} \qquad (178)$$

Consider the case where lj. If all of the crossterms $A_{lj}$ for lj are zero, the A would be a symmetric matrix. But the goal here is to show q-instability for almost all A, except for the case of A symmetric. If a non-symmetric matrix A is q-stable, then non-symmetry would imply that $A_{lj}$ 0 for some jl. For all such (j,l) pairs, two of the terms in equation 178 drop out. Dividing what remains by $A_{lj}$ produces:

$$(A_{jl}/A_{lj})(RA^T)_{ki}=(RA^T)_{ik} \qquad (179)$$

for all i and k. In order to satisfy this equation with $A_{jl}=0$, for all i and k, it would be necessary that $(RA^T)_{ik}=0$ for all i and k. This would require that R be singular (which, applied to equation 176, would violate the requirement that A be positive definite) or that A=0 (which is a symmetric case). Thus, $A_{jl}$ 0, and at least some combination of k and i exits such that $(RA^T)_{ki}$ 0. For every such combination of k and i, equation 179 may be divided to produce:

$$A_{jl}/A_{lj}=(RA^T)_{ik}/(RA^T)_{ki} \qquad (180)$$

We may also deduce that the numerators and denominators of equation 180 are all nonzero, for these combinations (l,j) and (k,i). Because they must all be nonzero, we can apply the same logic for l and j interchanged, or for k and i interchanged, independently. This implies, for example, that:

$$A_{jl}/A_{lj}=A_{lj}/A_{jl}=\pm 1 \qquad (181)$$

Furthermore, since we may use the exact same logic for any nonzero $A_{\mu\nu}$ (with $\mu$ v), using the same combination of k and i, we may deduce the following. For q-stability, for any matrix A which is not symmetric, every offdiagonal term would have to obey $A_{lj}=-A_{jl}$. In that case, equation 180 would also require that $RA^T$ would have to be completely antisymmetric.

This analysis could be extended further, to provide additional restrictions or requirements for q-stability. However, q-stability is possible here only in two situations—where A is completely symmetric, or where the offdiagonal terms are completely antisymmetric. Both situations represent sets of measure zero in the space of possible matrices A.

The findings above suggest the continuing use established Critic adaptation methods, and proving theorems which exploit the requirement that the schedule of experience $\underline{x}(t)$ should come from an appropriate probability distribution [73].

The Generalized Moving Target (GMT) problem previously discussed in [17] is discussed below. It will offer new gradient-based neural network designs to address that problem. It will also address related possibilities for assuring convergence more reliably (but still cheaply) for large-scale economic equilibrium models like the one discussed in [16]. However, it will also show how the application of these designs to the Critic adaptation problem here involve excessive cost, just like the previous stable methods of Landelius [43] and Bradtke [44].

The dynamic equations for M given above are all examples of a larger class of systems called Linear Differential Inclusions (LDI) [79]. In essence, the large problem to be considered is: for the system $$\partial_t \underline{x} = A(\alpha)\underline{x}, \quad (182)$$

starting from some bounded initial state $\underline{x}(0)$, prove that $\underline{x}(t)$ at later times is also bounded, regardless of the choice of $\alpha(t)$ at later times t. Equation 182 is not a linear dynamic system, because it refers to a family of matrices $A(\alpha)$, for different possible values of the parameter(s) $\alpha$, rather than a single matrix A. The state vector being studied is actually the matrix $\underline{M}$, and the set of parameters $\alpha$ is actually the state vector of the plant being controlled.

Boyd et al[79, p.74] cite many examples of systems of this sort which are unconditionally stable, but not q-stable. However, these examples give a complete intuitive feel for the nature of the gap between q-stability and unconditional stability.

Instead, suppose that $\underline{x}$ is simply a two-component vector, $(x_1, x_2)$. Suppose that the parameter $\alpha$ takes on only two possible values. ($\alpha=1$ and $\alpha=2$, with:

$$A(1) = \begin{bmatrix} a & 1 \\ -1 & b \end{bmatrix}; \quad A(2) = \begin{bmatrix} b & 1 \\ -1 & a \end{bmatrix} \quad (183)$$

where a>0 and b<0 are both very small (near zero). In order to determine whether this system can be destabilized, how should $\alpha(\underline{x})$ be picked in order to maximize future $|\underline{x}|^2$ over future times t. In this case, the choice between $\alpha=1$ and $\alpha=2$ is easy because:

$$\partial_t(\tfrac{1}{2}|\underline{x}|^2) = \underline{x}^T(\partial_t \underline{x}) = ax_1^2 + bx_2^2 \text{(for } \alpha=1\text{) or } bx_1^2 + ax_2^2 \text{ (for } \alpha=2\text{)} \quad (184)$$

Thus at each point $\underline{x}$, more increase (or less decrease) in length is achieved by choosing A(1) when $|x_1|>|x_2|$ and A(2) when $|x_2|>|x_1|$. If a is very small, and b is set such that b=−ka, and $\underline{x}$ is considered to be on the unit circle (without a loss of generality here), equation 184 is integrated over the interval from $\theta=-\pi/4$ to $\theta=+\pi/4$, in order to evaluate the total net increase or decrease in the length of $\underline{x}$ over that quarter circle. (The other quarter circles would involve the same increase or decrease, by the symmetry here.) In order to ensure a decrease of the length of $\underline{x}$ (i.e., in order to ensure stability), it is required that:

$$k \geq \left(\int_0^{\pi/4} \cos^2\theta d\theta\right) \Big/ \left(\int_0^{\pi/4} \sin^2\theta d\theta\right) = (\pi + 2)/(\pi - 2) \quad (185)$$

(Approximately $k \geq 5$ should ensure stability.)

It is easy to see that this system is not q-stable for any choice of k. By symmetry, we would expect $\Lambda = |\underline{x}|^2$ to be the only serious possibility for a quadratic Liapunov function here. But at $\theta = \pm\pi/4$, etc., both of the matrices A(1) and A(2) lead to increases in the length of $\underline{x}$!

This example shows how a kind of negative boundary zone between A(1) and A(2) prevents the existence of a global quadratic Liapunov function. Nevertheless, if the dynamics of the system are guaranteed to move the system out of this boundary zone, then there may be no possibility of instability in the overall system. On the other hand, this example shows that a small destabilizing term like a (in $A_{ji}(1)$) requires a much larger counterterm (like −5a) elsewhere, in order to permit stability.

In a similar vein, for methods like HDP, consider the possibility of a dynamical system:

$$A(1) = \begin{bmatrix} -1 & 0 \\ a & -1 \end{bmatrix} \quad (186)$$

where once again a is very small. Because A is not symmetric, HDP is not q-stable in adapting to this system. An algebraic analysis does show that there are training vectors like $(1, \pm\tfrac{1}{2}a)$ that can destabilize it, for some matrices M. However, continued training in such special cases would be expected to change M. In effect, there are negative boundary zones here as well, where M can grow, but only for a short time. Intuition suggests that HDP might well be unconditionally stable, in fact, for such a system A, even though it is not q-stable. Nevertheless, as with equation 184, these mechanisms are expected to work only for plants A which are close to q-stable plants (symmetric A) in some sense. This mechanism does not seem likely to prove that HDP is a universal stable adaptation rule.

Consideration of this example does give some clue as to why large interest rates may tend to stabilize HDP in some situations. Interest rates add a negative term to the diagonal of A, in effect. This cannot make a nonsymmetric matrix symmetric! However, it can make the matrix closer to a symmetric matrix, insofar as the nonsymmetric offdiagonal terms may become smaller relative to the diagonal terms.

The Generalized Moving Target ((GMT) problem may be defined as follows. Find the vectors $\underline{v}$ and $\underline{w}$ which simultaneously meet the two following conditions:

(1) $E(\underline{v}, \underline{w})$ is minimized as a function of $\underline{v}$ for $\underline{w}$ held fixed; and (2) $\underline{w}=\underline{v}$.

In 1990 [17], it was shown that the equilibrium of HDP solves that problem, locally (meeting the first-order conditions for a minimum), for the error function:

$$E(\underline{v}, \underline{w}) = \sum_t \left(\hat{j}(\underline{R}(t), \underline{v}) - (\hat{j}(\underline{R}(t+1), \underline{w}) + U)\right)^2 \quad (187)$$

Special-purpose quasiNewton approaches may also be utilized.

The problem with stability, using HDP, may be explained as the result of minimizing E with respect to $\underline{v}$, while not anticipating the effect that this has on changing the problem by changing $\underline{w}$. But minimizing $E(\underline{v},\underline{v})$ directly, as in the Galerkinized methods, would solve the wrong problem. Likewise, all manner of Bayesian updates rooted in the effort to minimize $E(\underline{v},\underline{v})$ would be nothing but sophisticated ways to solve the wrong problem, to move to an incorrect equilibrium.

One approach is to try to solve the GMT problem in general, and then apply the result to the adaptation of Critics. As a preliminary to finding a general solution, consider the quadratic special case of GMT, QGMT, where:

$$E(\underline{v},\underline{w}) = \underline{v}^T A \underline{v} + \underline{w}^T B \underline{w} + \underline{v}^T C \underline{w} + \underline{x}^T \underline{v} + \underline{v}^T \underline{w}, \qquad (188)$$

where A, B, C, $\underline{x}$ and $\underline{v}$ are arrays of parameters held fixed, The first-order condition for a minimum of equation 188 with respect to each component $v_i$ of $\underline{v}$ is:

$$E(\underline{v}, \underline{w}) = \sum_j 2A_{ij}v_j + \sum_j C_{ij}w_j + x_j = 0 \qquad (189)$$

or simply:

$$\nabla_{\underline{v}} E(\underline{v},\underline{w}) = 2A\underline{v} + C\underline{w} + \underline{x} = \underline{0} \qquad (190)$$

Following the gradient of E, as in gradient-based HDP, an adaptation rule is given by:

$$\partial_t \underline{v} = -(2A\underline{v} + C\underline{w} + \underline{x}) \qquad (191)$$

Combined with the companion adaptation rule, that $\underline{w}=\underline{v}$, this leads to the overall dynamics:

$$\partial_t \underline{v} = -(2A+C)\underline{v} - \underline{x} \qquad (192)$$

When this process reaches equilibrium, it satisfies equation 190. Like gradient-based HDP, it does converge to the correct equilibrium—when it converges at all. However, equation 192 will converge only when 2A+C meets the usual Hurwicz conditions, of having eigenvalues all in the left-hand side of the complex plane. But the actual solution of the GMT problem is well-defined whenever the symmetric matrix A is negative definite. There are many situations where this condition is met, but 2A+C would not give convergence. How can reliable convergence for all instances of the problem be achieved where the solution is well-defined? The total gradient—the gradient of $E(\underline{v}, \underline{v})$—is almost useless here, since it drags in the matrix B, which has no bearing on the solution of equation 190.

Leaving aside the nonlinear case for now, there is another alternative to equation 192:

$$\partial_t \underline{v} = (2A+C)^T (\nabla_{\underline{v}} E) = -(2A+C)^T (2A+C)\underline{v} - (2A+C)^T \underline{x} \qquad (193)$$

In this case, the dynamic matrix multiplying $\underline{v}$, $-(2A+C)^T(2A+C)$, is a negative semidefinite symmetric matrix! Therefore, from linear systems analysis, this process is stable, for any A and C. Furthermore, unless 2A+C is singular, the condition for equilibrium is still equivalent to equation 190. In the case where 2A+C is singular, there is no unique equilibrium solution for the GMT problem (see equation 191). In that case, $\underline{v}$ will converge to one of the equilibria, all of which satisfy the first-order conditions for a minimum (equation 190).

In equation 193 generalizable to the nonlinear/neural case? Recall that backpropagation corresponds to premultiplying a vector by a transpose Jacobian; equation 193 has a suggestive similarity to equation 10. But in this case, backpropagation through the nonlinear function or network which represents $E(\underline{v},\underline{w})$ does not work, because its output is only a scalar. However, equation 193 can be derived as the linear/quadratic special case of:

$$\partial_t \underline{v} = -\nabla_1 (|\nabla_p E|^2), \qquad (194)$$

where $\nabla_p$ is the partial gradient and $\nabla_t$ the total gradient. The derivatives in equation 194 can be calculated efficiently, in a parallel distributed manner, by use of second-order backpropagation [8,ch. 10]. Again, in the linear/quadratic case, those calculations reduce to equation 193.

As an alternative, second-order backpropagation is avoided by training an auxiliary network to estimate $\nabla_p E$. In other words, at each time t, $\underline{v}$ and $\underline{w}$ are inserted into the network which calculates E. First-order backpropagation is used to calculate $\nabla_p E$ efficiently, even if E is not a neural network [26]. An auxiliary network is then trained, using any form of supervised learning (like LMS), to input $\underline{v}$ and $\underline{w}$ and output a prediction or estimate of $\nabla_p E$. First-order backpropagation is then used through that auxiliary network in order to calculate the derivatives used in equation 194.

It seems reasonable that this variation should be stable in the linear-quadratic case, just like equation 193. If the auxiliary network (just a linear function, a matrix and a vector) is adapted by LMS, it converges to 2A+C" in a q-stable way, independent of the concurrent adaptation of $\underline{v}$. The errors of this auxiliary model become as small as one likes, as time moves on. Thus the gap between this system and equation 193, in adapting $\underline{v}$, also goes to zero. For any given estimate of 2A+C, the dynamics of $\underline{v}$ are stable, if one bases the adaptation of $\underline{v}$ entirely on the auxiliary network. (Alternatively, the backpropagation can be initialized through the auxiliary network based on the actual $\nabla_p E$ calculated by backpropagating through E.) Also note that this network is used to calculate derivatives which are summed over $\underline{v}$ and $\underline{w}$; there is no need for special training methods which ensure that the network can disentangle the two.

In theory, one could also adapt an auxiliary network to approximate $\nabla_t E$. This would not eliminate the need for using second-order backpropagation in implementing or approximating equation 194.

The discussion above all concerns a gradient-based approach. For very difficult problems in the GMT family, it may be necessary to embed this kind of approach within a more global stochastic approach, to find the right basin of attraction. This would involve the notion of Brain-Like Stochastic Search mentioned above. There is a connection between local minimum problems and the particular version of "the chattering problem" discussed by Bertsekas [24]. One important way to reduce these problems is to use higher-order designs.

The approach above suggests a novel way to ensure convergence in large-scale models built out of nonlinear algebraic equations. The problem of trying to ensure convergence of the official DOE model of long-term energy supply and demand across all sectors was discussed in [16]. For huge nonlinear models of this kind, achieving convergence is usually a matter of trial and error. There was no obvious way to really ensure convergence mathematically, even using the latest methods then available [16]. For example, methods based on conjugate gradients required an assumption of symmetric matrices, unlike the nonsymmetric Jacobians which these models possess.

Models of this sort are usually expressed in the form:

$$\underline{x} = \underline{f}(\underline{x}), \qquad (195)$$

where $f_i$ is usually a formula "predicting" $x_i$ as a function of a few related variables. The naive way to converge such a model is by the usual update procedure:

$$\underline{x}^{(n+1)} = \underline{f}(\underline{x}^{(n)}), \qquad (196)$$

where $\underline{x}^{(n)}$ is the n-th estimate of $\underline{x}$. Sometimes the process converges; sometimes it does not. When it does not, it is common to use a relaxation procedure, which, in the case of infinitely small learning rates, may Ie represented as:

$$\partial_t \underline{x} = (\underline{f}(\underline{x}) - \underline{x}) \qquad (197)$$

In the neighborhood of the equilibrium, the error $\underline{\delta}$ in estimating $\underline{x}$ behaves like:

$$\partial_t \underline{\delta} = (F-I)\underline{\delta},\qquad(198)$$

where F is the Jacobian of $\underline{f}$. Even with infinitely small learning rates, however, there is no guarantee that equation 197 will converge, because there is no guarantee that F−I meets the usual Hurwicz criteria. Explosive modes of error growth remain possible. As an alternative, it is possible to try:

$$\partial_t \underline{x} = (1-F^T)(\underline{f}(\underline{x})-\underline{x}) = \underline{f}(\underline{x})-\underline{x} - F^T(\underline{f}(\underline{x})-\underline{x})\qquad(199)$$

This may be implemented by taking the usual update, given in equation 197, and stabilizing it by subtracting the result of backpropagating it through the model $\underline{f}(\underline{x})$. Backpropagation through such a model is normally very fast, because of its sparse nonlinear stricture. See [8,ch. 10] and [26] for information on how to backpropagate through a nonlinear structure which is not a neural network. (Backpropagation has also been reinvented and implemented in some fast automatic differentiation programs, which could be useful in such applications.)

The errors in estimating $\underline{x}$ in equation 199 obey the following dynamics near equilibrium:

$$\partial_t \underline{\delta} = -(F^T-1)(F-1)\underline{\delta}\qquad(200)$$

Like equation 193, this implies stable dynamics.

In high-performance implementations of this approach, various neural network methods are used, such as the Adaptive Learning Rate (ALR) algorithm of [8,ch.3], to accelerate convergence. Similarly, the right-hand side of equation 199 can be used in lieu of the gradient in a conjugate gradient method; see [22, ch.7] for a review of sophisticated conjugate gradient methods for highly nonlinear problems.

Despite its potential value in GMT problems in general, equation 194 does not solve some of the problems described above. The most obvious way to implement equation 194, in the linear stochastic case, would involve $$\partial_t C = -\nabla_t(|\nabla_p E|^2),\qquad(201)$$

which, for an HDP type of method, entails:

$$\nabla_p E = -ex_i x_j\qquad(202a)$$

$$(\nabla_p E)^2 = e^2 |\underline{x}|^4\qquad(202b)$$

$$<\partial_t C> = -<\nabla_t(|\nabla_p E|^2)> = -|\underline{x}|^4 <\nabla_t(e^2)>,\qquad(202c)$$

which in turn reduces to HDPG, in effect. Here, the presence of noise invalidates a simple sampling-based generalization of equation 194. Another way to view this situation is to try to implement:

$$\partial_t C = -\nabla_t(<\nabla_p E>^2),\qquad(203)$$

bearing in mind that $<\nabla_p E>^2$ is not the same as $<(\nabla_p E)^2>$. The Williams/Baird notion of "Bellman residual errors" [50,51] is related to this idea. The problem here is how to implement this idea, in the general case, where $<\nabla_p E>$ is not known except by some kind of sampling approach, which would interact with the adaptation process.

For the general Stochastic GMT (SGMT) problem, there is a straightforward solution to this difficulty. By using the auxiliary network approach, an auxiliary network is automatically trained to output $<\nabla_p E>$ as a function of $\underline{v}$ and $\underline{w}$. In this case, the approach based on an auxiliary network will converge to the right answer, even though the original approach based on second-order backpropagation does not.

This provides what is perhaps the best general-purpose solution to the SGMT problem. As with GMT, either the auxiliary network can be used itself, or backpropagation through E can be used, in order to compute the derivatives fed back to the output of the auxiliary network, which initialize the process of backpropagation through the auxiliary network. (Also, as indicated in equation 194, $\underline{v}$ should be updated based on the sum of the derivatives fed back to $\underline{v}$ and the derivatives fed back to $\underline{w}$ in that final pass of backpropagation.)

Unfortunately, this is still not acceptable as a solution to the Critic adaptation problem. In the linear-quadratic case, the Critic matrix C would contain on the order of $n^2$ weights (actually, N' weights). The auxiliary network in this case would also input $\underline{v}$ and $\underline{w}$—again, on the order of $n^2$ inputs. Thus the auxiliary network would have on the order of $n^2$ inputs and $n^2$ outputs. It would be a matrix with $O(n^4)$ elements. This is not consistent with the stringent cost constraints that define parallel and distributed processing or neural networks. In addition, the need to estimate $n^4$ unknown parameters has negative effects on performance, not just cost. There is no straightforward and consistent way to solve the cost problem with this approach. In designing Critic adaptation rules, more specific features must be used based on the specific problem at hand.

One way to respond to the deficiencies above is to enhance stability by trying to recode the estimated state vector, so as to make the dynamic matrix A closer to symmetric. This would require some sort of recurrent coding process, to account for oscillatory modes in the original system. This is analogous to "reification" in physics, where a dynamic matrix can be represented in Hermitian form after a change in coordinate representation [78]. Reification approaches might be useful here: however, they would not eliminate the need to develop more robust Critic adaptation as well. At best, they could complement the effort to improve Critic adaptation rules as such. At "worst," they could become useless and obsolete, if new Critic adaptation rules do not work better in symmetric plants.

Another approach is to try to detect and modify "bad directions," as proposed, for example, by Baird [51]. But there are great difficulties in detecting what is a "bad direction." The total gradient $\nabla_t$ should not be used as a standard for what is a good direction, since it does not point towards a minimum of what Baird calls "Bellman residual errors." The basic problem here lies in finding some vector which truly points in (or defines) a "good" direction.

Intuitively, in an HDP style of method, our real goal is to converge to a solution in which:

$$<e>=0,\qquad(204)$$

in every state $\underline{x}$, where the expectation is taken only over the random vector $\underline{w}$ previously discussed. (Some researchers have talked about the great difficulty of calculating derivatives through stochastic systems, and the breakthroughs of the early 1990's in that area. However, backpropagation through a function $\underline{f}(\underline{x},\underline{w})$, treating $\underline{w}$ as a fixed input, is extremely straightforward. It was described in excruciatingly explicit detail years ago [65].) Thus in an ideal world, the system could implement:

$$\partial_t W = -\nabla_t(<e>^2) = -2<e><\nabla_t e>\qquad(205)$$

The problem is that this is not the same as $<e\nabla_t e>$, because of statistical correlation effects between e and $\nabla_t e$. Thus if W is adapted in proportion to $e\nabla_t e$, as in GDHP, $<e\nabla_t e>$ is sampled which is not the desired quantity. If:

$$\partial_t W = -\nabla_p(<e>^2) = -2<e><\nabla_p e> = -2<e\nabla_p e>, \quad (206)$$

is adapted, as in pure HDP, ordinary sampling can be done, because $\nabla_p e$ does not depend on the random vector $\underline{w}$. The statistical correlation effects disappear, so that the desired quantity is achieved by adapting in real time in proportion to $e\nabla_p e$. Equation 206, like equation 205, reaches equilibrium at the correct desired state, the state where $<e>=0$, when it reaches equilibrium.

The problem with HDP is that $\nabla_p e$ does not lead in a valid direction to reach its equilibrium. In summary, in pure HDP, the weights W are adapted in proportion to $e(\nabla_p e)$, where "e" gives us the real error signal and the guarantee of correct equilibrium, while the $\nabla_p e$ term provides the convergence or stability properties, such as they are.

Twelve alternative new variants of HDP are discussed herein, one of which (the two-sample method [50,51]) has been previously published. The corresponding variants of DHP and GDHP will also be discussed. The twelve variants actually consist of four core variants and two ways of modifying them.

The equilibrium problems with HDPG discussed above were previously discussed, in a more primitive example, back in 1990 [17]. Baird [51] suggested in 1995 that these problems could be solved, in effect, by trying to implement equation 205. To solve the statistical correlation problem, which results in $<e\nabla_r e><e><\nabla_r e>$, they proposed that "e" be estimated in the usual manner, but that "$\nabla_r e$" be estimated by simulating a different state vector $\underline{R}(t+1)$, based on a different random vector, $\underline{w}_2$, using the available plant model $\underline{R}(t+1)=\underline{f}(\underline{R}(t),\underline{w}(t))$. (Recall from above that all references to a "plant model" herein actually refer to an augmented plant model. However, the methods of adapting such an augmented model involve adaptating only the weights in the Model network proper.) In his scheme, $$<e_1\nabla_r e_2> = <e_{1><\nabla_r}e_2> = <e><\nabla_r e>, \quad (207)$$

because there are no correlations between the two different random vectors $\underline{w}_1$ and $\underline{w}_2$.

Apparently, the only actual implementation of this idea—which was proposed only briefly in a kind of side section of [51]—was by Prokhorov [15]. Prokhorov has reported that the high level of random noise in this algorithm, due to the use of two unrelated random vectors, leads to very slow convergence, particularly near the equilibrium state. Nevertheless, this is an example of a method that solves the convergence and stability problems above in a formal sense. It would converge to a correct equilibrium, the equilibrium where $<e>=0$. It would possess q-stability, in the stochastic sense discussed above, because the expected dynamics of M follow the dynamics of M for HDPG in the deterministic case. This first correct variation of HDP may be called "HDP2," to highlight the use of two random vectors in parallel.

An alternative approach is to train a deterministic forecasting model $\underline{f}(\underline{R}(t))$ to predict the expectation value of $\underline{R}(t+1)$. (Actually, this is the most common way to train neural net system identifiers today. Few researchers seem to be aware of the stochastic alternatives [8,ch.13;75].) One can adapt W in proportion to $e\nabla_r e'$, where:

(1) the "e" on the left is calculated in the usual way, based on the sampled value of $\hat{J}(t+1)$;

(2) $\nabla_r e'$ is calculated by backpropagation through:

$$e' = (\hat{J}(\underline{R}(t,W)) - (\hat{J}(\underline{f}(\underline{R}(t)),W) + U)) \quad (208)$$

This results in:

$$<\partial_t W> = -<e>\nabla_r e', \quad (209)$$

which has exactly the correct equilibrium, $<e>=0$, exactly like equation 206. In other words, this method should have exactly the same equilibrium as HDP, with the same degree of noise filtering as in HDP. The replacement of $\nabla_p e$ by $\nabla_r e'$ simply leads to a direction of movement which is much more likely to avoid convergence problems. This variation on HDP may be called HDP0, in order to emphasize the lack (0) of statistical sampling in determining derivatives of e.

HDP0 and HDP2 both require a heavy use of a system identification component, such as the adaptive estimates of A in the linear/quadratic case. HDP0 replaces equations 25 and 26 by:

$$\Delta W = -2\alpha e(\nabla_r e') = 2\alpha e(\nabla \hat{J}(\underline{R}(t)) - (1/(1+r))\nabla \hat{J}(\underline{f}(\underline{R}(t)))) \quad (210)$$

In the linear/stochastic case, e can still be computed by sampling (as implied in equation 75), but the weights are adapted according to equation 71, using the estimated value of the matrix A to perform the calculation in equation 71. This is the preferred procedure for adapting Critics in the linear/quadratic case, in order to permit the development of a universal adaptive controller.

There are certain obvious tradeoffs in the use of HDP0. Like IAC itself, it depends heavily on the estimate of A. From the viewpoint of long-term stability theorems, in the spirit of Narendra [1], this is not an essential problem, because the estimates of A should eventually become as accurate as we like, if we pay the usual amount of attention to issues like persistence of excitation and like focusing on estimation errors only in directions which are actually relevant to policy. In practical situations, the adaptation of a suitable problem-dependent Critic should allow faster, more effective adaptation by the other parts of the overall control system, as in some of the aerospace simulations published by Balakrishnan. One could go even further by dispensing with the sampling altogether' one could use estimates of A and Q to estimate $<e>$ directly from the expected value of equation 75; however, that variation—unlike HDP0—does not work in a low-cost, consistent way in the nonlinear stochastic case.

Again, HDP0 is just as exact as HDP proper, but more reliable in terms of convergence. In a formal statistical sense, HDP2 may be even more reliable in its convergence, because it implies an exact symmetry (on average). But the discussion above suggests that exact symmetry is probably not necessary even for unconditional stability. The greater filtering of noise in HDP0 compared with HDP2 should be a tremendous advantage in practical terms. One might imagine trying to filter the "e" signal as well, to some degree; however, the Adaptive Learning Rate (ALR) [8,ch3] family of methods already achieves the same effect.

Nevertheless, there are two further variants of HDP0 which may be worth exploring, in cases where precise symmetry in convergence is worth the cost.

First, in HDP02—a second-order variation of HDP0—the network $\underline{f}$ is trained as follows (after an initial period of adapting it to predict $\underline{R}(t+1)$). At each time t, a sample of $\underline{R}(t+1)$ is obtained in one of the usual ways—either by simulating a random vector $\underline{w}$ inserted into a stochastic model $\underline{f}(\underline{R}(t),\underline{w})$ or by actually observing $\underline{R}(t+1)$ and estimating $\underline{w}$. The usual error e is backpropagated through $\hat{J}(\underline{R}(t+1))$ in the usual way, back to the weights in the Critic network. The resulting gradient of e with respect to the Critic weights is called "$\underline{g}_1$". Then e' is backpropagated through $\hat{J}(\underline{f}((t)))$, back to the same weights in the same Critic network. The second set of derivatives is called $\underline{g}_2$. Notice that $\underline{g}_1$ and $g_2$ are both gradients with respect to weights in the Critic network; each component of these gradients may be physically located "inside" the corresponding weight or synapse of the Critic, in a parallel distributed implementation. Then the weights of $\underline{f}$ are then adapted so as to minimize:

$$E_g = |g_1 - g_2|^2 \qquad (211)$$

In other words, these "g" errors are propagated back through the calculations which led to $g_2$, using second-order backpropagation, in order to calculate the derivatives of $E_g$ with respect to the weights in $\underline{f}$. This procedure trains $\underline{f}$ to give the most exact possible filtered, unbiased estimates of $<\nabla_r e>$. In a practical implementation, the weights of $\underline{f}$ would be adapted based on a weighted sum of these second-order derivatives and the simple derivatives of error in predicting $\underline{R}(t+1)$, with the relative weights of the two types of error adjusted gradually over time.

Finally, there is a variation of these methods which becomes accessible only after the implementation of more complex designs like SEDP [8,ch. 13] and the 3-brain architecture [46]. In such systems, vectors become available which represent probability distributions rather than states as such. In such systems, we may use these vectors as inputs or outputs of $\underline{f}$ instead of using an estimated state vector. They may also be used in developing partially closed form estimates of $<e>$, in order to reduce random sampling error. As in SEDP, a neurally-based weighted or stratified sampling strategy may be used instead of a random sampling strategy for the remaining sampling requirements.

All four of the methods discussed above calculate directions of movement, $\underline{\delta}$, for the weights, $\underline{W}$. These directions of movement are truly "good" directions, insofar as they point (on average) to the correct equilibrium Critic weights. These directions are all based on a simultaneous consideration of $\hat{J}(t+1)$ and $\hat{J}(t)$, as is appropriate when controlling an ergodic sort of process where a system bounces back and forth forever between the same set of states.

On the other hand, traditional dynamic programming works best when it is possible to work backwards from a terminal state, through to intermediate states, through to starting states. Bertsekas calls this kind of situation a "layered" state space [24]. HDP implements this kind of backwards flow of information, from time t+1 to time t. In "layered" situations, we might imagine that HDP would perform better than total-gradient methods, especially if the networks are constricted such that the changes in weights W do not affect $\hat{J}(t+1)$ very much anyway.

Unfortunately, HDP (and DHP or GDHP) is not a perfect way to capture the potential benefits of a layered state space. If the Critic involves any degree of global generalization, it is difficult to ensure that the weight changes do not affect $\hat{J}(t+1)$ significantly. Also, the layering may not be perfect or exact. As an example, the autolander [53] appears to involve a monotonic sort of progression from start to finish, but the convergence and stability issues are still significant.

There is an alternative way to try to exploit the special properties of layered state spaces. One can simply project the "correct direction" onto the line defined by $\nabla_p E$. (For HDP, this is simply the line defined by $\nabla_p e$.) Thus is the "sailboat method"—named because $\nabla_p E$ acts like the rudder of a boat, defining the line of motion, while the correct gradient acts like the wind, defining the degree of motion along that line. But in this case, the motion may be forwards or backwards. In order to maintain the guarantees of consistency and stability, the change in weights must be allowed to go opposite to $-\nabla_p E$, when the correct gradient so specifies.

A further variation of this is to use a weighted sum of the correct gradient and the sailboat gradient. The weight on each would be simply an adapted learning rate on each, calculated by the Adaptive Learning Rate (ALR) algorithm of [8,ch.3] or something similar. In effect, this variation would adaptively decide what the right combination of methods is for the particular environment or plant under consideration.

The higher-order multiple-model Critic designs discussed in [9,13,46] would naturally tend to create a layered condition within each "decision block" or region. Therefore, the sailboat methods—pure and weighted—could be of great value when combined with that approach. This suggests that true intelligent systems will use a relatively smoother sailing adaptation for lower-level decisions (encased in a layered region) but may have greater difficulties with stability and convergence when dealing with the very highest levels of decisions and emotional priorities. This is consistent with what we see in humans.

The above four methods can be extended to DHP and GDHP. The sailboat versions are all straightforward, based on the above discussions. For the two-sample method, DHP2 is defined by replacing equation 28 by:

$$\lambda_i^*(t) = \frac{\partial U(t)}{\partial R_i} + \frac{1}{1+r} \sum_j \hat{\lambda}_j(t+1) \cdot \frac{\partial f_j(\underline{R}(t), \underline{w}_2(t))}{\partial R_i(t)} \qquad (212)$$

where $\hat{\lambda}_j(t+1)$ is calculated in the usual way (based on a random vector $\underline{w}_1(t)$, explicitly simulated or imputed from observation) but the derivative on the right is calculated for $\underline{f}$ inputting a different random vector, $\underline{w}_2$. For GDHP2, the weights W are adapted in proportion to the following estimate of the gradient of equation 32:

$$\Omega_0 e_0 (\nabla_r e_0') + \underline{e}^T \Omega \nabla_r \underline{e}', \qquad (213)$$

where $e_0$ and $\underline{e}$ are computed in the usual way, and where $e_0'$ and $\underline{e}'$ are computed like $e_0$ and $\underline{e}$ except that they are based on the simulated random vector $\underline{w}_2$ rather than actual observation of $\underline{R}(t+1)$ or $\underline{w}_1$. As in ordinary GDHP, second-order backpropagation is used to calculate this gradient For the direct method, DHP0 is defined by:

$$\lambda_i^*(t) = \frac{\partial U(t)}{\partial R_i} + \frac{1}{1+r} \sum_j \hat{\lambda}_j(t+1) \cdot \frac{\partial f_j'(\underline{R}(t))}{\partial R_i(t)} \qquad (214)$$

where $\hat{\lambda}_j(t+1)$ is again calculated in the usual way, and $\underline{f}'$ is the same auxiliary network discussed above for HDP0. DHP02 also uses equation 214, but adapts $\underline{f}'$ using second-order backpropagation, based on the gradient of E (as defined in equation 27) with respect to the Critic weights: the details follow the discussion of HDP02 exactly, although the calculations are different simply because the calculations for second-order backpropagation are slightly different when applied to this different error function E. GDHP0 and GDHP02 is again based on equation 213, but with a different definition of $e_0'$ and $\underline{e}'$; in this case, these errors are calculated based on $\underline{R}(t+1) = \underline{f}'(\underline{R}(t))$, for the same function $\underline{f}'$ we have discussed for HDP0 and HDP02.

For DHP and GDHP, there are further variants which involve using vectors which represent probability distributions rather than particular states and so on, exactly as discussed for HDP.

For the development of universal adaptive controllers in the linear-quadratic case, the preferred embodiment uses GDHP0 (as an alternative to HDP0). For simplicity, $\Omega_0=0$ and $\Omega=I$ are for now. GDHP0 with $\Omega_0=0$, unlike HDP0, avoids the need to think about the $U_0$ term in the quadratic case. By exploiting symmetry and exploiting additional information, GDHP0 may well permit more rapid adaptation than the alternative methods which have nonlinear, stochastic generalizations.

One application of the above "stable" systems is to hypersonic aircraft. The starting point for this work is a recent design study performed for NASA, in an attempt to assimilate the Ajax design concept developed in Russia, and championed by the Leninetz Holding Company of St. Petersburg. In order to achieve the very high performance needed to stretch the envelope here, and survive the many non-linearities of this regime, an integrated approach, incorporating advanced control, is by far the most likely path to success. The elastic fuzzy logic disclosure described a possible flight application in detail. That system is extended to address additional features. The system utilizes an engine bypass, as described in [83]. In [83], Chase et al propose using a ramjet engine up to Mach 12. This becomes possible using their detailed engine design, if the airstream coming towards the engine is ionized and then slowed down and compressed by the use of an ionizer and big magnets on the vehicle forward from the engine; if the airstream retains its ionization, and if the electrical energy extracted from the front is carried by wire to the magnets towards the back of the engines, then the energy can be inserted back into the airstream through the process of MHD acceleration. This is what allows a ramjet to reach Mach 12, instead of the usual Mach 6.

In a first embodiment of an improved system erosive plasma generators replace the array of ionizers considered in [83]. A wide variety of ionizers have been considered, based on the idea of converting $O_2$ to $O_2^+$ and electrons. There are many ways of doing this, but all of them have serious drawbacks. Fundamentally, from the chemistry, we know that $O_2$ does not want to give up electrons; it wants to eat them. Formally, the ionization potential of oxygen in this setting is high. This results in excess energy consumption during ionization, and—even more important—in excessively high rates of recombination of the plasma, which would imperil the downstream process of MHD acceleration.

As indicated above, the ionizer can be replaced by an erosive plasma generation system from Accurate Automation Corporation (AAC) in Tennessee. The essence of this scheme is that it implicitly seeds the air with positive hydrocarbon ions, instead of $O_2^+$. Appropriate hydrocarbons have a much lower ionization potential than oxygen, and can also more easily entrain and influence the motion of neighboring molecules.

In a second embodiment, a liquid hydrocarbon-based plasma generator is used. In particular, Heberlein of the University of Minnesota has developed a liquid plasma generator for use in spray painting applications. This basic design would be encased in the same kind of standard protective casing used in the AAC design and others, and supplied from a liquid hydrocarbon reserve instead of the solid wax in the AAC design. This would have several benefits when used in the context of the larger design. First, the use of a liquid seeding material should make it much easier to turn around this craft for a new flight; at worst, it would be like filling up a small gas tank. Second, if the aircraft will have appropriate hydrocarbon fuel onboard for other purposes, the seeding material can be supplied by a kind of small secondary tube supplied from that larger tank.

This leads to a second major possible improvement. In the Russian Ajax design, it is proposed that the craft carry a hydrocarbon fuel—such as kerosene—and "reform" it (crack it) to hydrogen on board the craft, as a way of doing something useful with the heat of friction on the leading edges of the craft. In [83], a systems analysis suggests that this concept does not really pay. In fact, for the first initial prototypes of this technology, it will be challenging enough to debug the MHD engine bypass and drag reduction concepts.

In the long-term however, on-board cracking should be performed, but using a different hydrocarbon fuel, such as cubane, for which the cracking is a more strongly endothermic reaction, and the thermodynamic gain is as large as possible. In this case, a mix of partially cracked fuel can also be used to seed the plasma generation.

The management of this cracking system, plus the ordinary thermal protection system for such a vehicle, will require a level of control technology far beyond the present state of the art. By analogy, it is similar to but far more complicated than the control of the original precoolers for the Japanese Atrex engine, which never lived up to its Mach 6 potential, because of the difficulty of control, even using the best standard control technology. Several years ago, David White te of McDonnell-Douglas stated that the weight cost of a conventionally-controlled thermal protection system for an aerospace plane (NASP) would be enough, by itself, to make it impossible to reach the mass ratios necessary for that vehicle to reach escape velocity. As a solution to this problem, neural network components can be used based on "object symmetry" (as described in the 3-brain disclosure) and should make it possible to manage the great complexity of these cooling networks. (The networks are very complex, but they are made up of many simple elementary constituents or objects, such as valves and tubes. This is why the new methods should work, even though the old would not.) Diagnostics of impending hot spots are of course just as important as the control per se; in effect, the control in this case must make heavy use of "nearal" (or adaptive) "observers." Use of this advanced control technology should make it possible to use large numbers of smaller tubes and valves—especially MEMS-style "smart valves"—in order to maximize the efficiency of the cooling and cracking processes.

In a similar vein, the Chase design [83] can be improved based on the conversion of the ramjet to a dual ram/scram. The general approach to this kind of conversion is already well-known, but would be modified to include advanced arrays of MEMS actuators, to control fuel mixing in the scram regime; AAC is already studying such designs, under government contract. Object symmetric neural networks would enable control of the huge number of actuators needed for optimal operation.

One more possible improvement of this design is the use of a maser or laser, on board the craft, to "spark" the excited states of nitrogen—in front of and/or behind the craft—generated as a byproduct of the plasma generation and combustion processes. (As previously noted by Froning, plasma conditions both in front of the craft and behind it can be used to reduce the friction or pressure on the craft.)

First, in the operation of this system, classical set point control—aimed at desired "nominal" points of operation—would be extremely inefficient. It is well-known, for example, that the mixing of fuel and the drag reduction effects all demand something like very high-speed (high-frequency) oscillations or even chaos, to achieve optimal effects. In addition, the nonlinearity of the coupled system here—MEMS actuators, array-controlled magnets, tubes and valves, other vehicle actuators—implies the existence of hysteresis effects, such that oscillatory or chaotic control—in the appropriate mode—is likely to permit significant improvements in efficiency. In a system like this, where mass ratios are very finely tuned, such improvements are critical to the feasibility of the overall vision. The advanced adaptive critic control systems (and hybrid BTT systems) papers provide a fundamentally new approach to control, which makes it possible to realize these potential efficiencies, in a coupled control mode of operation. (Similar benefits would also accrue to related applications, such as the efficient control of "flapping" wings or motors in microfliers, or energy-saving evasive flight patterns for military vehicles.)

Finally, the control techniques are proposed as part of the design methodology itself. The actual implementation of this invention includes, as part of the larger design methodology, the use of computer-based tools to help in the control process. To permit the development of a vehicle which fully exploits the potential of this new vision, new control algorithms (modules) are linked to the CAD systems themselves, at the design stage. These algorithms directly permit the optimization not only of parameters in control circuits but also of physical design parameters in simulation, using the same mathematics. Given a proper utility function input (including terms to represent issues like stability, volumetric efficiency and other figures of merit), and a reasonable representation of the actual anticipated flight regime (such as drag effects influenced by the plasma) new vehicle shapes can be achieved.

For hypersonic controllers, it is possible to use model-based adaptive critics designs (as described in the Handbook of Intelligent Control or in xxx.lanl.gov/adap-org/9810001 on the web) provide such a design methodology. The user may provide a utility function which is the sum of two terms (1) one term which is "zero" (zero COST) in the acceptable region, and rises gently (perhaps ala e**kd, where d is distance from the region, or d*d). outside that region; (2) a kind of energy-of-control cost term. Furthermore, the "weights" in the controller may be chosen to be the weights in a recurrent controller network (capable of generating chaotic behavior) PLUS the actual design parameters of the physical system. In such a case, the advanced adaptive critic control schemes should be able to TRAIN the weights to FIND the minimum-energy stabilizing controller; this would be a chaos controller, if in fact the minimum-energy controller is a chaos controller.

Another important control application is a method for reversing the aging of the brain. The Journal of Neuroscience has reported how to construct a special molecule, based on a hybrid structure of a carrier molecule and of Nerve Growth Factor. This molecule, when injected into a blood vessel, circulates through the blood and crosses the blood-brain barrier, where it can be used in the partial treatment of some special diseases. However, the same procedure can be used to construct the corresponding hybrid molecule combining the same carrier with Epithehal Growth Factor (EGF). This new molecule is a substance of enormous potential value. Inserted by a simple injection into the bloodstream, it will allow EGF to reach the vesicles of the brain. Once there [84], EGF stimulates the production of new neurons, which then migrate throughout the higher centers of the brain. The further details of how to implement this are all straightforward, within the present state of the art in biochemistry.

Previous theories of intelligence in the brain have resisted the idea that such an "injection of intelligence" would be possible. For example, one popular view today is that key aspects of intelligence (such as the structure of language) are hard-wired in advance, based on the genetic code; this is sometimes called the "evolutionary view of intelligence." The proposed injection would not contain the specific kinds of domain knowledge or genetic manipulation needed to enhance intelligence. Many scientists, such as Gould, have strenuously debunked the idea that it matters how large the brain is, or, logically, how many neurons it possesses.

On the other hand, many psychologists and neuroscientists (such as Skinner and Hebb) have accepted the underlying hypothesis that the brain retains a highly general-purpose form of learning throughout life; however, they have argued that an injection of this sort would be of no value in reversing aging, since the natural process of learning continues anyway, even with aging. They point to the continued growth in new synapses throughout life. They argue that the only realistic way to prevent aging of the brain is to maintain a life of constant stimulation and new challenges, in order to permit the natural mechanisms of learning to assert themselves.

Based on the mathematical models described attached here, it does become clear that the number of neurons as such is a crucial constraint limiting the richness of memory and generalization which the system is capable of achieving, with or without a growth of synapses and optimization of the existing neurons. Since the number of neurons does decline over time, in humans, the theory does predict a certain amount of aging over time, even under optimal stimulation. Stimulating experience is still very important, in this view, but it is not enough to maintain optimal functioning of the brain. Restoration of the number of neurons, by exploiting a natural mechanism which permits this, can significantly improve mental functioning in adult humans, according to this understanding. In fact, it may even be of value for relatively young adults, particularly in conjunction with environmental stimulation which encourages them to learn new things—where new, uncommitted neurons might be of great value.

The following references are cited in the above disclosure and are incorporated herein by reference in their entirety.

1. K. Narendra and A. Annaswamy, *Stable Adaptive Systems*, Englewood N.J.: Prentice-Hall. 1989.
2. K. Astrom and B. Wittenmark, *Adaptive Control*, Reading, Mass.: Addison-Wesley, First Edition, 1989.
3. G. C. Goodwin and K. Sin, *Adaptive Filtering, Prediction and Control,*. Englewood N.J.: Prentice-Hall, 1984.
4. A. Bryson & Y. C. Ho, *Applied Optimal Control*, Ginn, 1969.
5. Richard F. Stengel, *Optimal Control and Estimation*, Dover edition, 1994.
6. J. S. Baras and N. S. Patel, Information state for robust control of set-valued discrete time systems, *Proc. 34th Conf. Decision and Control* (CDC), IEEE. 1995. p.2302.
7. Werbos, Neurocontrollers, in J. Webster, ed. *Encyclopedia of Electronics and Electrical Engineering*, Wiley, 1999.
8. White & D. Sofge, eds. *Handbook of Intelligent Control*, Van Nostrand, 1992.
9. P. Werbos, Values, Goals and Utility in an Engineering-Based Theory of Mammalian Intelligence, in Karl H. Pribram, ed., *Brain and Values*, Erlbaum: Hillsdale, N.J., 1998.
10. P. Werbos, Learning in the brain: An engineering interpretation. In K. Pribram and J. King, eds. *Learning as Self-Organization*, Erlbaum 1996.

11. P. Werbos, Self-organization: Re-examining the basics and an alternative to the Big Bang, in K. Pribram, ed, *Origins: Brain and Self-Organization*, Erlbaum (1994).
12. P. Werbos, Optimization: A Foundation for understanding consciousness. In D. Levine & W. Elsberry (eds) *Optimality in Biological and Artificial Networks?*, Erlbaum, 1996.
13. P. Werbos, Multiple Models for Approximate Dynamic Programming and True Intelligent Control: Why and How. In K. Narendra, ed., *Proc. 10th Yale Conf. on Learning and Adaptive Systems*. New Haven: K. Narendra, EE Dept., Yale U., 1998.
14. D. Prokhorov & D. Wunsch, Adaptive critic designs, *IEEE Trans. Neural Networks*, Vol. 8, No. 5, p.997–1007, 1997. See also www.acil.ttu.edu.
15. D. Prokhorov, *Adaptive Critic Design and Their Applications*, Ph.D. thesis. Lubbock, Tex.: Electrical Eng. Dept., Texas Tech U., December 1997.
16. P. Werbos, Solving and optimizing complex systems: lessons from the EIA long-term energy model. In B. Lev, ed., *Energy Models and Studies*, North Holland, 1983.
17. P. Werbos, Consistency of HDP applied to a simple reinforcement learning problem, *Neural Networks*, March 1990.
18. K. S. Narendra & K. Parasarathy, Gradient methods for the optimization of dynamical systems containing neural networks, *IEEE Trans. Neural Networks*, Vol. 2, p.252–262, March 1991.
19. K. S. Narendra & S. Li, Control of nonlinear time-varying systems using neural networks. In K. Narendra, ed., *Proc. 10th Yale Conf. on Learning and Adaptive Systems*. New Haven: K. Narendra, EE Dept., Yale U., 1998.
20. P. Werbos, The elements of intelligence. Cybernetica (Namur), No. 3, 1968.
21. A. Barto, R. Sutton and C. Anderson, Neuronlike adaptive elements that can solve difficult learning control problems, *IEEE Trans. SMC*, Vol. 13, No. 5, 1983, p.834–846.
22. W. T. Miller, R. Sutton & P. Werbos (eds), *Neural Networks for Control*, MIT Press, 1990, now in paper.
23. B. Widrow, N. Gupta & S. Maitra, Punish/reward: learning with a Critic in adaptive threshold systems, *IEEE Trans. SMC*, 1973, Vol. 5, p.455–465.
24. D. P. Bertsekas and J. N. Tsisiklis. *Neuro-Dynamic Programming,*. Belmont, Mass.: Athena Scientific, 1996.
25. P. Werbos, Advanced forecasting for global crisis warning and models of intelligence, *General Systems Yearbook*, 1977 issue.
26. P. Werbos, *The Roots of Backpropagation: From Ordered Derivatives to Neural Networks and Political Forecasting*, Wiley, 1994.
27. D. Zwillinger, *Handbook of Differential Equations*, NY: Academic Press, Second Edition. 1992.
28. R. Howard, *Dynamic Programming and Markhov Processes*, MIT Press, 1960.
29. G. E. P. Box & G. M. Jenkins, *Time-Series Analysis: Forecasting and Control*, Holden-Day, San Francisco, 1970.
30. P. Werbos, Neurocontrol and related techniques. In Maren A ed *Handbook of Neural Computing Applications* Orlando, Fla.: Academic, 1990.
31. L. Feldkamp, Puskorius, Davis and Yuan, Enabling concepts for applications of neuro-control. In K. S. Narendra (ed), *Proc. of 8th Yale Workshop on Adaptive and Learning Systems*. New Haven, Conn.: Prof. Narendra, Dept. of Electrical Eng., Yale U., 1994. See also Unravelling dynamics with recurrent networks: application to engine diagnostics, in *Proc. of 9th Yale . . .* , 1996.
32. X. Z. Pang & P. Werbos, Neural network design for J function approximation in dynamic programming, *Math. Modelling and Scientific Computing* (a Principia Scientia journal), Vol. 5, NO.2/3, 1996 (physically 1998). Available also as adap-org 9806001 from xxx.lanl.gov/form, using the "Other Groups" field set to "nlin-sys."
33. P. Werbos, Optimal neurocontrol: Practical benefits, new results and biological evidence, *Proc. World Cong. on Neural Networks* (WCNN95), Erlbaum, 1995.
34. P. Werbos, Supervised learning: can it escape its local minimum, WCNN93 *Proceedings*, Erlbaum, 1993. Reprinted in V. Roychowdhury et al (eds), *Theoretical Advances in Neural Computation and Learning*, Kluwer, 1994.
35. C. G. Atkeson, A. Moore & S. Schall, Locally weighted learning, *Artificial Intelligence Review*, forthcoming.
36 Karl H. Pribram, ed., *Brain and Values*, Erlbaum: Hillsdale, N.J., 1998.
37. B. Widrow and E. Walach, *Adaptive Inverse Control*, New Jersey: Prentice-Hall, 1994.
38. K. S. Narendra & J. Balakrishnan, Adaptive control using multiple models and switching, *IEEE Trans. Automatic Control*, vol. AC-42, No. 2, p.171–187, Feb. 1997.
39. K. S. Narendra and C. Xiang, Adaptive control of linear discrete-time systems using multiple models. In K. Narendra, ed., *Proc. 10th Yale Conf. on Learning and Adaptive Systems*. New Haven: K. Narendra, EE Dept., Yale U., 1998.
40. F. Yuan, L. Feldkamp, G. Puskorius & L. Davis, A simple solution to the bioreactor benchmark problem by application of Q-learning, *Proc. World Congress on Neural Networks*, Erlbaum, 1995.
41. M. Gupta & N. Sinha, eds, *Intelligent Control Systems*. Piscataway, N.J.: IEEE Press, 1996.
42. K. Astrom, G. Goodwin & P. R. Kumar, eds. *Adaptive Control, Filtering and Signal Processing*. Springer-Verlag, 1995.
43. T. Landelius, *Reinforcement Learning and Distributed Local Model Synthesis*, Ph.D. thesis and Report No. 469, Department of Electrical Engineering, Linkoping U., 58183, Linkoping, Sweden.
44. S. Bradtke, Reinforcement learning applied to linear quadratic regulation. In *Advances in Neural Information Processing Systems 5*. San Mateo, Calif.: Morgan Kaufmann, 1993.
45. K. Astrom and B. Wittenmark, *Adaptive Control*, Reading, Mass.: Addison-Wesley, Second Edition, 1995.
46. M. Karny, K. Warwick and V. Kurkova, eds, *Dealing with Complexity: A Neural Networks Approach*. Springer, London, 1998.
47. P. Lancaster & L. Rodman, *Algebraic Riccati Equations*. Oxford U. Press, 1995.

48. J. Slotine & W. Li, *Applied Nonlinear Control*, Prentice-Hall, N.J., 1991.
49. P. Werbos, New methods for the automatic constriction of Liapunov functions. In K. Pribram, ed., *Origins: Brain and Self-Organization*, Erlbaum, 1994, p.46–52.
50. M. E. Harmon, L. C. Baird & A. H. Klopf, Advantage updating applied to a differential game, unpublished report to NIPS 1994 conference. Available at www.cs.cmu.edu/~baird.
51. L. C. Baird, Residual algorithms: reinforcement learning with function approximation. In A. Prieditis & S. Russell, eds, *Machine Learning: Proc. 12th Int'l Conf.* San Mateo, Calif.: Morgan-Kaufmann, 1995.
52. *World Congress on Neural Networks* (WCNN97), Erlbaum, 1997.
53. L. Dolmatova and P. Werbos, Traps and tricks in standard benchmark problems for neurocontrol. In A. Meystel, ed., *Proc. of 1997 Int'l Conf. on Intelligent Systems and Semiotics*, NIST Special Publication 918. Washington D.C.: GPO, 1997. Expanded version forthcoming in *Problems on Nonlinear Analysis in Engineering Systems* (Kazan journal).
54. D. Han and S. N. Balakrishnan, Adaptive Critic based neural networks for agile missile control, 1998 *AIAA Guidance, Navigation, and Control Conference and Exhibit*, Boston, Mass., Aug. 10–12, 1998, pp. 1803–1812.
55. G. J. Tesauro, Practical issues in temporal difference learning, *Machine Learning*, 1992, 8:p.257–277.
56. R. Santiago & P. Werbos, New progress towards truly brain-like intelligent control, *WCNN94 Proceedings*, Erlbaum,
57. J. Von Neumann and O. Morgenstern, *The Theory of Games and Economic Behavior*, Princeton N.J.: Princeton U. Press, 1953.
58. W. Aspray & A. Burks, eds, *Papers of John Von Neumann on Computing and Computer Theory*, MIT Press, 1987.
59. D. Rumelhart and J. McClelland, *Parallel Distributed Processing*. MIT Press, 1986.
60. E. A. Feigenbaum and J. Feldman, *Computers and Thought*, McGraw-Hill, 1963.
61. Anderson, J., and E. Rosenfeld, eds, *Talking Nets*, MIT Press, 1998.
62. P. Werbos, Applications of advances in nonlinear sensitivity analysis, in R. Drenick & F. Kozin (eds), *System Modeling and Optimization: Proc. IFIP Conf.* (1981), Springer 1992; reprinted in [26].
63. P. Werbos, Changes in global policy analysis procedures suggested by new methods of optimization, *Policy Analysis and Information Systems*, Vol.3, No. 1, June 1979.
64. R. S. Sutton, Learning to predict by the methods of temporal differences, *Machine Learning*, Vol. 3, p.9–44. 1988.
65. P. Werbos, Building and understanding adaptive systems: A statistical/numerical approach to factory automation and brain research, *IEEE Trans. SMC*, January/February 1987.
66. S. LaBerge & Rheingold, *Exploring the World of Lucid Dreaming*. New York: Ballantine, 1990.
67. M. Commons, S. Grossberg & J. Staddon (eds), *Neural Network Models of Conditioning and Action*, Erlbaum, 1991.
68. F. Lewis, Neural networks for feedback control. In J. Webster, ed, *Encyclopedia of Electronics and Electrical Engineering*, Wiley, 1999.
69. H. Berenji, A reinforcement learning-based algorithm for fuzzy logic control, *Int'l J. Approx. Reasoning*, Vol.6, No. 2, February 1992.
70. N. El-Karoui & L. Mazliak, eds, *Backward stochastic differential equations*, Addison-Wesley Longman, 1997.
71. P. Werbos, international patent application #WO 97/46929, filed June 1997, published Dec. 11.
72. S. Grossberg, Nonlinear neural networks: principles, mechanisms and architectures, *Neural Networks*, Vol. 1. No. 1. p. 1761, 1988.
73. J. Tsitsiklis & B. Van Roy, An analysis of temporal-difference learning with function approximation, *IEEE Trans. Auto. Control*, Vol. 42, No. 5, May 1997.
74. P. Werbos, Rational approaches to identifying policy objectives *Energy: The International Journal*, 15 (3/4), 1990, p.171–185.
75. H. Ritter, T. Martinetz, and K. Schulten, *Neural Computation and Self-Organizing Maps*, Addison-Wesley, 1992.
76. M. I. Jordan and R. A. Jacobs, Modular and hierarchical learning systems, in M. A. Arbib *Handbook of Brain Theory and Neural Networks*, MIT Press, 1995, p.579–582.
77. R. Shorten & K. S. Narendra, On the existence of a common Liapunov function for linear stable switching systems. In K. Narendra, ed., *Proc. 10th Yale Conf. on Learning and Adaptive Systems*. New Haven: K. Narendra, EE Dept., Yale U., 1998.
78. P. Werbos, Can 'soliton' attractors exist in realistic 3+1-D conservative systems?. *Chaos, Solitons and Fractals*, forthcoming (circa No. 1, 1999). See also patt-sol 9804003 in xxx.lanl.gov.
79. S. Boyd, L. El-Ghaoui, E. Feron & V. Balakrishnan, *Linear Matrix Inequalities in System and Control Theory*. Philadelphia: Society for Industrial and Applied Mathematics (SIAM), 1994.
80. B. Widrow & M. Hoff, Adaptive switching circuits, 1960 *IRE Wescon Convention Record*, New York: IRE (now IEEE), p.96–104, 1960. Reprinted in J. Anderon & E. Rosenfeld, eds, *Neurocomputing: Foundations of Research*, MIT Press, 1988.
81. M. Marcus & H. Minc, *A Survey of Matrix Theory and Matrix Inequalities*, 1964 (Dover reprint 1992).
82. C. G. Cullen, *Matrices and Linear Transformations*, 2nd Edition 1972 (Dover reprint 1990).
83. R. Chase, R. Boyd, P. Czysz, H. Froning, M. Lewis & L. McKinney, *An Advanced Highly Reusable Space Transportation System Definition and Assessment Study*, Arlington, Va.: ANSER, September 1997. ANSER Technical Report 97-1, Final Report for NASA Cooperative Agreement NCC8-104.
84. Trends in Neuroscience, TINS September 1996, Vol. 19, No. 9, p.387–393, by S. Weiss et al.

What is claimed is:

1. In a computer program product including a computer storage medium, the improvement comprising a computer program code mechanism embedded in the computer storage medium for causing a microprocessor to implement a heuristic dynamic programming controller controlling an external system, the computer program code mechanism comprising:

a first computer code device configured to train a deterministic forecasting model f'(R(t)) to predict the expectation value of R(t+1);

a second computer code device configured to calculate an error function, e, based on sampled value of Ĵ(t+1); and a third computer code device configured to calculate $\nabla_t e'$ by backpropagating through:

$$e'=(\hat{J}(R(t,W)-(\hat{J}(f'(R(t)),W)+U))\text{ such that}$$

$$<\partial_t W>=-<e>\nabla_t e'.$$

2. In the computer program product as claimed in claim 1, the improvement further comprising:

a fourth code device configured to calculate:

$$\Delta W=-2\alpha e(\nabla_t e')=2\alpha e(\nabla \hat{J}(R(t))-(I/(1+r))\nabla \hat{J}(f'(R(t))).$$

3. In a computer program product including a computer storage medium, the improvement comprising a computer program code mechanism embedded in the computer storage medium for causing a microprocessor to implement a heuristic dynamic programming controller controlling an external system, the computer program code mechanism comprising:

a first computer code device configured to train a deterministic forecasting model f'(R(t)) to predict the expectation value of R(t+1);

a second computer code device configured to obtain a value R(t+1) at each time t+1;

a third computer code device configured to backpropagated an error, e, through Ĵ(R(t+1)) back to weights of a critic network;

a fourth computer code device configured to obtain a first set of derivatives, g1, representing a gradient of e with respect to the weights of the critic network;

a fifth computer code device configured to backpropagate e' through Ĵ(f'(R(t)), back to the weights of the Critic network to form a second set of derivatives g2; and a sixth computer code device configured to adapt weights of f' so as to minimize:

$$E_g=|g_1-g_2|^2.$$

4. In the computer program product as claimed in claim 3, wherein the second computer code device further comprises a seventh computer code device configured to obtain R(t+1) by simulating a random vector $\underline{w}$ inserted into a stochastic model $\underline{f}(R(t),\underline{w})$.

5. In the computer program product as claimed in claim 3, wherein the second computer code device further comprises a seventh computer code device configured to obtain R(t+1) by actually observing R(t+1) and estimating $\underline{w}$.

* * * * *